(12) United States Patent
Oge et al.

(10) Patent No.: US 10,659,557 B2
(45) Date of Patent: May 19, 2020

(54) INFORMATION PROCESSING APPARATUS, INFORMATION PROCESSING METHOD, AND COMPUTER PROGRAM PRODUCT

(71) Applicant: Kabushiki Kaisha Toshiba, Minato-ku (JP)

(72) Inventors: Yasin Oge, Sagamihara (JP); Yuta Kobayashi, Kawasaki (JP); Takahiro Yamaura, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 15/911,385

(22) Filed: Mar. 5, 2018

(65) Prior Publication Data
US 2019/0158620 A1    May 23, 2019

(30) Foreign Application Priority Data
Nov. 17, 2017    (JP) .................................. 2017-221998

(51) Int. Cl.
*H04L 29/08*    (2006.01)
*H04L 12/861*    (2013.01)
(Continued)

(52) U.S. Cl.
CPC ...... *H04L 67/2847* (2013.01); *H04L 47/2416* (2013.01); *H04L 47/625* (2013.01);
(Continued)

(58) Field of Classification Search
CPC ............. H04L 43/0852; H04L 47/2416; H04L 47/283; H04L 47/56; H04L 47/6215; H04L 47/625; H04L 47/6275; H04L 67/2847
See application file for complete search history.

(56) References Cited

U.S. PATENT DOCUMENTS

| | | | |
|---|---|---|---|
| 6,470,016 B1 * | 10/2002 | Kalkunte | H04L 47/2433 370/395.41 |
| 6,560,230 B1 * | 5/2003 | Li | H04L 12/5601 370/395.42 |

(Continued)

FOREIGN PATENT DOCUMENTS

| | | | | | |
|---|---|---|---|---|---|
| DE | 602005003386 | * | 1/2008 | ......... | H04L 47/2416 |
| DE | 602005003386 T2 | * | 9/2008 | ......... | H04L 47/2416 |

(Continued)

OTHER PUBLICATIONS

Nasrallah et al., Performance Comparison of IEEE 802.1 TSN Time Aware Shaper (TAS) and Asynchronous Traffic Shaper (ATS), Apr. 15, 2019, IEEE, IEEE Access, DOI:10.1109/ACCESS.2019. 2908613 (Year: 2019).*

(Continued)

*Primary Examiner* — Eric Nowlin
(74) *Attorney, Agent, or Firm* — Oblon, McClelland, Maier & Neustadt, L.L.P.

(57) ABSTRACT

According to an embodiment, an information processing apparatus includes a prefetch unit and a scheduler unit. The prefetch unit is configured to prefetch a scheduling entry corresponding a future time period in advance from scheduling information including one or more entries each of which at least contains a transmission state and interval for each of one or more transmission queues. The scheduler unit configured to determine a starting time of transmission for each frame waiting for transmission in each queue, on the basis of the prefetched entry.

22 Claims, 73 Drawing Sheets

(51) Int. Cl.
  H04L 12/935    (2013.01)
  H04L 12/931    (2013.01)
  H04L 12/853    (2013.01)
  H04L 12/863    (2013.01)

(52) U.S. Cl.
  CPC ........ H04L 49/206 (2013.01); H04L 49/3027 (2013.01); H04L 49/90 (2013.01)

(56) References Cited

U.S. PATENT DOCUMENTS

| | | | | |
|---|---|---|---|---|
| 6,891,835 | B2* | 5/2005 | Kalkunte | H04L 47/2433 370/395.41 |
| 6,952,424 | B1* | 10/2005 | Bass | H04L 49/90 370/412 |
| 7,450,506 | B2* | 11/2008 | Morikawa | H04L 47/2416 370/231 |
| 7,613,114 | B2* | 11/2009 | Iwata | H04L 12/5602 370/235 |
| 7,843,906 | B1* | 11/2010 | Chidambaram | H04L 47/6205 370/386 |
| 9,106,557 | B2* | 8/2015 | Wolcott | H04L 47/12 |
| 9,288,149 | B2* | 3/2016 | Pannell | H04L 47/22 |
| 9,882,823 | B2* | 1/2018 | Pannell | H04L 47/22 |
| 9,960,872 | B2* | 5/2018 | Pannell | H04J 3/0697 |
| 9,998,380 | B2* | 6/2018 | Pannell | H04L 47/22 |
| 10,064,213 | B2* | 8/2018 | Voigt | H04W 72/14 |
| 10,225,203 | B2* | 3/2019 | Wolcott | H04L 47/12 |
| 10,425,321 | B2* | 9/2019 | Joseph | H04J 3/0667 |
| 2002/0089994 | A1* | 7/2002 | Leach, Jr. | H04L 1/08 370/412 |
| 2003/0128707 | A1* | 7/2003 | Kalkunte | H04L 47/2433 370/395.41 |
| 2003/0227933 | A1* | 12/2003 | Eberle | H04L 47/34 370/419 |
| 2004/0114516 | A1* | 6/2004 | Iwata | H04L 12/5602 370/230.1 |
| 2005/0063392 | A1* | 3/2005 | Ofuji | H04L 1/1887 370/395.42 |
| 2005/0083943 | A1* | 4/2005 | Lee | H04L 47/10 370/395.4 |
| 2005/0141416 | A1* | 6/2005 | Kobayashi | H04L 47/10 370/229 |
| 2005/0232155 | A1 | 10/2005 | Morikawa et al. | |
| 2008/0082717 | A1* | 4/2008 | Okuma | G06F 13/387 710/313 |
| 2010/0017523 | A1* | 1/2010 | Yoshiuchi | H04N 21/2407 709/228 |
| 2011/0087774 | A1* | 4/2011 | Pope | G06F 9/4856 709/224 |
| 2011/0305145 | A1* | 12/2011 | Odlyzko | H04W 72/1263 370/252 |
| 2012/0039339 | A1* | 2/2012 | Kurita | H04L 45/00 370/400 |
| 2013/0201831 | A1* | 8/2013 | Tal | H04L 47/625 370/235 |
| 2013/0219446 | A1* | 8/2013 | Hefeeda | H04L 65/605 725/116 |
| 2013/0286988 | A1* | 10/2013 | Zhang | H04L 47/12 370/329 |
| 2013/0336250 | A1* | 12/2013 | Park | H04W 72/12 370/329 |
| 2014/0071823 | A1* | 3/2014 | Pannell | H04L 47/22 370/230.1 |
| 2014/0269270 | A1* | 9/2014 | Wolcott | H04L 47/12 370/230 |
| 2015/0365337 | A1* | 12/2015 | Pannell | H04J 3/0697 370/503 |
| 2015/0365338 | A1* | 12/2015 | Pannell | H04L 47/56 370/412 |
| 2016/0065485 | A1* | 3/2016 | Wolcott | H04L 47/12 370/230 |
| 2016/0164789 | A1* | 6/2016 | Pannell | H04L 47/22 370/230.1 |
| 2017/0019918 | A1* | 1/2017 | Voigt | H04W 72/14 |
| 2018/0302331 | A1* | 10/2018 | Bush | H04L 47/28 |
| 2018/0309655 | A1* | 10/2018 | Joseph | H04J 3/0667 |
| 2018/0309656 | A1* | 10/2018 | Regev | H04J 3/0667 |
| 2019/0007344 | A1* | 1/2019 | Mangin | H04L 49/351 |
| 2019/0104055 | A1* | 4/2019 | Craciunas | H04L 45/14 |
| 2019/0104073 | A1* | 4/2019 | Choi | H04L 47/245 |
| 2019/0121781 | A1* | 4/2019 | Kasichainula | G06F 15/17331 |
| 2019/0166061 | A1* | 5/2019 | Farkas | H04L 47/621 |
| 2019/0215832 | A1* | 7/2019 | Nishimura | H04L 12/44 |
| 2019/0289616 | A1* | 9/2019 | Hampel | H04W 72/10 |
| 2019/0306075 | A1* | 10/2019 | Nishimura | H04L 49/254 |

FOREIGN PATENT DOCUMENTS

| | | | | |
|---|---|---|---|---|
| EP | 1578072 A1 * | 9/2005 | ......... | H04L 47/2416 |
| EP | 1578072 B1 * | 11/2007 | ......... | H04L 47/2416 |
| JP | 2002-124985 | 4/2002 | | |
| JP | 2005-260780 | 9/2005 | | |
| JP | 2006-245882 | 9/2006 | | |
| JP | 2011-24027 | 2/2011 | | |
| WO | WO-2007001145 A1 * | 1/2007 | ............ | H04W 28/14 |

OTHER PUBLICATIONS

Oliver et al., IEEE 802.1Qbv Gate Control List Synthesis Using Array Theory Encoding, Apr. 13, 2018, IEEE, 2018 IEEE Real-Time and Embedded Technology and Applications Symposium (RTAS), DOI: 10.1109/RTAS.2018.00008 (Year: 2018).*

Farzaneh et al., Time-sensitive networking (TSN): An experimental setup, Nov. 29, 2017, 2017 IEEE Vehicular Networking Conference (VNC), DOI: 10.1109/VNC.2017.8275648 (Year: 2017).*

Boiger, Time Aware Shaper, Sep. 2012, Deggendorf University of Applied Science, http://www.ieee802.org/1/files/public/docs2012/bv-boiger-time-aware-shaper-0912-v02.pdf (accessed Jan. 28, 2019) (Year: 2012).*

Boiger, Gates vs. Windows and Scheduled Traffic, Jan. 2013, Deggendorf University of Applied Science, http://www.ieee802.org/1/files/public/docs2013/bv-boiger-gates-vs-windows-scheduled-traffic-0113.pdf (accessed Jan. 28, 2019) (Year: 2013).*

Nfinn, 802.1Qav + P802.1Qbv Time-gated Shapers, Nov. 5, 2014, Cisco Systems, http://www.ieee802.org/1/files/public/docs2014/bv-nfinn-time-gated-shapers-1114-v01.pdf (accessed Jan. 28, 2019) (Year: 2014).*

Craciunas et al., Scheduling Real-Time Communication in IEEE 802.1Qbv Time Sensitive Networks, Oct. 21, 2016, TTTech Computertechnik AG, RTNS 2016, http://www.cs.uni-salzburg.at/~scraciunas/pdf/talks/craciunas_rtns2016_talk.pdf (accessed Jan. 28, 2019) (Year: 2016).*

IEEE Computer Society "IEEE Standard for Local and metropolitan area networks—Bridges and Bridged Networks, Amendment 25: Enhancements for Scheduled Traffic," IEEE 802.1Qbv, ISBN 978-1-5044-0722-9, 2015, pp. 57.

Intel Ethernet Controller I210—Revision History—Datasheet,333016-006, 2018, pp. 874.

* cited by examiner

34B GATE CONTROL LIST

| ENTRY | | |
|---|---|---|
| LIST INDEX | GATE STATE | TIME INTERVAL |
| 0 | oCCCCCCC | 2,500 NANOSECONDS |
| 1 | CoCCCCCC | 2,500 NANOSECONDS |
| 2 | CCoCCCCC | 2,500 NANOSECONDS |
| 3 | CCCoCCCC | 2,500 NANOSECONDS |
| 4 | CCCCoCCC | 2,500 NANOSECONDS |
| 5 | CCCCCoCC | 2,500 NANOSECONDS |
| 6 | CCCCCCoC | 2,500 NANOSECONDS |
| 7 | CCCCCCCo | 2,500 NANOSECONDS |

(34D) 34D0, (34D) 34D1, (34D) 34D2, (34D) 34D3, (34D) 34D4, (34D) 34D5, (34D) 34D6, (34D) 34D7

34C

| OTHER PARAMETERS | VALUE |
|---|---|
| GATE CONTROL START TIME | 12:00:00 ON OCTOBER 16, 2017 |
| GATE CONTROL CYCLE TIME | 20 MICROSECONDS |
| NUMBER OF ENTRIES IN GATE CONTROL LIST | 8 |

FIG.23

[STATE IMMEDIATELY AFTER INITIALIZATION]

| CURRENT TIME, FUTURE TIME, TRANSMISSION POSSIBLE TIME, AND REQUIRED TRANSMISSION TIME | VALUE | SCHEDULED FRAME | SCHEDULED TRANSMISSION START TIME | STATE |
|---|---|---|---|---|
| CURRENT TIME | 11:59:59.000000000 ON OCTOBER 16, 2017 | N/A | N/A | N/A |
| FUTURE TIME | 12:00:00.000000000 ON OCTOBER 16, 2017 | | | |
| TIME DIFFERENCE BETWEEN CURRENT TIME AND FUTURE TIME | 1.000000000 SECOND | | | |
| TRANSMISSION POSSIBLE TIME OF TRANSMISSION QUEUE 7 | 0.000002500 SECOND | | | |
| TRANSMISSION POSSIBLE TIME OF TRANSMISSION QUEUE 6 | 0.000000000 SECOND | | | |
| TRANSMISSION POSSIBLE TIME OF TRANSMISSION QUEUE 5 | 0.000000000 SECOND | | | |
| TRANSMISSION POSSIBLE TIME OF TRANSMISSION QUEUE 4 | 0.000000000 SECOND | | | |
| TRANSMISSION POSSIBLE TIME OF TRANSMISSION QUEUE 3 | 0.000000000 SECOND | | | |
| TRANSMISSION POSSIBLE TIME OF TRANSMISSION QUEUE 2 | 0.000000000 SECOND | | | |
| TRANSMISSION POSSIBLE TIME OF TRANSMISSION QUEUE 1 | 0.000000000 SECOND | | | |
| TRANSMISSION POSSIBLE TIME OF TRANSMISSION QUEUE 0 | 0.000000000 SECOND | | | |
| REQUIRED TRANSMISSION TIME OF FRAME TRANSMITTED NEXT FROM TRANSMISSION QUEUE 7 | N/A | | | |
| REQUIRED TRANSMISSION TIME OF FRAME TRANSMITTED NEXT FROM TRANSMISSION QUEUE 6 | N/A | | | |
| REQUIRED TRANSMISSION TIME OF FRAME TRANSMITTED NEXT FROM TRANSMISSION QUEUE 5 | N/A | | | |
| REQUIRED TRANSMISSION TIME OF FRAME TRANSMITTED NEXT FROM TRANSMISSION QUEUE 4 | N/A | | | |
| REQUIRED TRANSMISSION TIME OF FRAME TRANSMITTED NEXT FROM TRANSMISSION QUEUE 3 | N/A | | | |
| REQUIRED TRANSMISSION TIME OF FRAME TRANSMITTED NEXT FROM TRANSMISSION QUEUE 2 | N/A | | | |
| REQUIRED TRANSMISSION TIME OF FRAME TRANSMITTED NEXT FROM TRANSMISSION QUEUE 1 | N/A | | | |
| REQUIRED TRANSMISSION TIME OF FRAME TRANSMITTED NEXT FROM TRANSMISSION QUEUE 0 | N/A | | | |

FIG.25

EXAMPLE OF CASE WHERE FRAME 10 WITH REQUIRED TRANSMISSION TIME OF 1,000 NANOSECONDS IS WRITTEN TO TRANSMISSION QUEUE 7 [STATE AT THE TIME 0.001 SECOND AFTER INITIALIZATION]

| CURRENT TIME, FUTURE TIME, TRANSMISSION POSSIBLE TIME, AND REQUIRED TRANSMISSION TIME | VALUE | SCHEDULED FRAME | SCHEDULED TRANSMISSION START TIME | STATE |
|---|---|---|---|---|
| CURRENT TIME | 11:59:59.001000000 ON OCTOBER 16, 2017 | N/A | N/A | N/A |
| FUTURE TIME | 12:00:00.000000000 ON OCTOBER 16, 2017 | | | |
| TIME DIFFERENCE BETWEEN CURRENT TIME AND FUTURE TIME | 0.999000000 SECOND | | | |
| TRANSMISSION POSSIBLE TIME OF TRANSMISSION QUEUE 7 | 0.000002500 SECOND | | | |
| TRANSMISSION POSSIBLE TIME OF TRANSMISSION QUEUE 6 | 0.000000000 SECOND | | | |
| TRANSMISSION POSSIBLE TIME OF TRANSMISSION QUEUE 5 | 0.000000000 SECOND | | | |
| TRANSMISSION POSSIBLE TIME OF TRANSMISSION QUEUE 4 | 0.000000000 SECOND | | | |
| TRANSMISSION POSSIBLE TIME OF TRANSMISSION QUEUE 3 | 0.000000000 SECOND | | | |
| TRANSMISSION POSSIBLE TIME OF TRANSMISSION QUEUE 2 | 0.000000000 SECOND | | | |
| TRANSMISSION POSSIBLE TIME OF TRANSMISSION QUEUE 1 | 0.000000000 SECOND | | | |
| TRANSMISSION POSSIBLE TIME OF TRANSMISSION QUEUE 0 | 0.000000000 SECOND | | | |
| REQUIRED TRANSMISSION TIME OF FRAME TRANSMITTED NEXT FROM TRANSMISSION QUEUE 7 | 0.000001000 SECOND (FRAME 10) | | | |
| REQUIRED TRANSMISSION TIME OF FRAME TRANSMITTED NEXT FROM TRANSMISSION QUEUE 6 | N/A | | | |
| REQUIRED TRANSMISSION TIME OF FRAME TRANSMITTED NEXT FROM TRANSMISSION QUEUE 5 | N/A | | | |
| REQUIRED TRANSMISSION TIME OF FRAME TRANSMITTED NEXT FROM TRANSMISSION QUEUE 4 | N/A | | | |
| REQUIRED TRANSMISSION TIME OF FRAME TRANSMITTED NEXT FROM TRANSMISSION QUEUE 3 | N/A | | | |
| REQUIRED TRANSMISSION TIME OF FRAME TRANSMITTED NEXT FROM TRANSMISSION QUEUE 2 | N/A | | | |
| REQUIRED TRANSMISSION TIME OF FRAME TRANSMITTED NEXT FROM TRANSMISSION QUEUE 1 | N/A | | | |
| REQUIRED TRANSMISSION TIME OF FRAME TRANSMITTED NEXT FROM TRANSMISSION QUEUE 0 | N/A | | | |

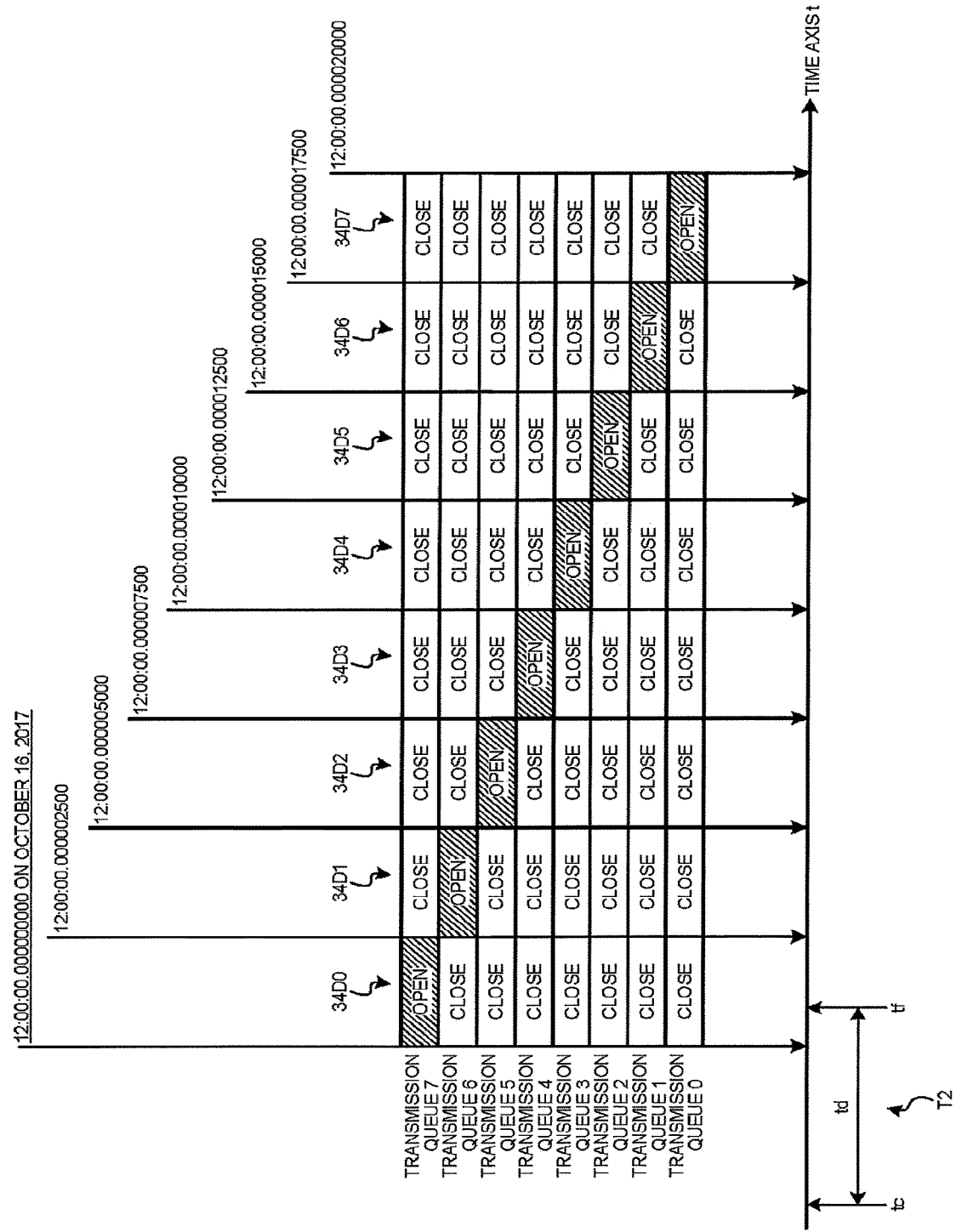

FIG.27

EXAMPLE AFTER FRAME f0 HAS BEEN SCHEDULED [STATE AT THE TIME 0.002 SECOND AFTER INITIALIZATION]

| CURRENT TIME, FUTURE TIME, TRANSMISSION POSSIBLE TIME, AND REQUIRED TRANSMISSION TIME | VALUE |
|---|---|
| CURRENT TIME | 11:59:59.002500000 ON OCTOBER 16, 2017 |
| FUTURE TIME | 12:00:00.000501500 ON OCTOBER 16, 2017 |
| TIME DIFFERENCE BETWEEN CURRENT TIME AND FUTURE TIME | 0.998001000 SECOND |
| TRANSMISSION POSSIBLE TIME OF TRANSMISSION QUEUE 7 | 0.000001500 SECOND |
| TRANSMISSION POSSIBLE TIME OF TRANSMISSION QUEUE 6 | 0.000000000 SECOND |
| TRANSMISSION POSSIBLE TIME OF TRANSMISSION QUEUE 5 | 0.000000000 SECOND |
| TRANSMISSION POSSIBLE TIME OF TRANSMISSION QUEUE 4 | 0.000000000 SECOND |
| TRANSMISSION POSSIBLE TIME OF TRANSMISSION QUEUE 3 | 0.000000000 SECOND |
| TRANSMISSION POSSIBLE TIME OF TRANSMISSION QUEUE 2 | 0.000000000 SECOND |
| TRANSMISSION POSSIBLE TIME OF TRANSMISSION QUEUE 1 | 0.000000000 SECOND |
| TRANSMISSION POSSIBLE TIME OF TRANSMISSION QUEUE 0 | 0.000000000 SECOND |
| REQUIRED TRANSMISSION TIME OF FRAME TRANSMITTED NEXT FROM TRANSMISSION QUEUE 7 | N/A |
| REQUIRED TRANSMISSION TIME OF FRAME TRANSMITTED NEXT FROM TRANSMISSION QUEUE 6 | N/A |
| REQUIRED TRANSMISSION TIME OF FRAME TRANSMITTED NEXT FROM TRANSMISSION QUEUE 5 | N/A |
| REQUIRED TRANSMISSION TIME OF FRAME TRANSMITTED NEXT FROM TRANSMISSION QUEUE 4 | N/A |
| REQUIRED TRANSMISSION TIME OF FRAME TRANSMITTED NEXT FROM TRANSMISSION QUEUE 3 | N/A |
| REQUIRED TRANSMISSION TIME OF FRAME TRANSMITTED NEXT FROM TRANSMISSION QUEUE 2 | N/A |
| REQUIRED TRANSMISSION TIME OF FRAME TRANSMITTED NEXT FROM TRANSMISSION QUEUE 1 | N/A |
| REQUIRED TRANSMISSION TIME OF FRAME TRANSMITTED NEXT FROM TRANSMISSION QUEUE 0 | N/A |

| SCHEDULED FRAME | SCHEDULED TRANSMISSION START TIME | STATE |
|---|---|---|
| FRAME f0 | 12:00:00.000000000 ON OCTOBER 16, 2017 | WAITING FOR TRANSMISSION |

FIG.29

EXAMPLE OF CASE WHERE FRAME f1 WITH REQUIRED TRANSMISSION TIME OF 1,200 NANOSECONDS HAS BEEN WRITTEN TO TRANSMISSION QUEUE 7
[STATE AT THE TIME 0.003 SECOND AFTER INITIALIZATION]

| CURRENT TIME, FUTURE TIME, TRANSMISSION POSSIBLE TIME, AND REQUIRED TRANSMISSION TIME | VALUE |
|---|---|
| CURRENT TIME | 11:59:59.003000000 ON OCTOBER 16, 2017 |
| FUTURE TIME | 12:00:00.000001000 ON OCTOBER 16, 2017 |
| TIME DIFFERENCE BETWEEN CURRENT TIME AND FUTURE TIME | 0.997001000 SECOND |
| TRANSMISSION POSSIBLE TIME OF TRANSMISSION QUEUE 7 | 0.000001500 SECOND |
| TRANSMISSION POSSIBLE TIME OF TRANSMISSION QUEUE 6 | 0.000000000 SECOND |
| TRANSMISSION POSSIBLE TIME OF TRANSMISSION QUEUE 5 | 0.000000000 SECOND |
| TRANSMISSION POSSIBLE TIME OF TRANSMISSION QUEUE 4 | 0.000000000 SECOND |
| TRANSMISSION POSSIBLE TIME OF TRANSMISSION QUEUE 3 | 0.000000000 SECOND |
| TRANSMISSION POSSIBLE TIME OF TRANSMISSION QUEUE 2 | 0.000000000 SECOND |
| TRANSMISSION POSSIBLE TIME OF TRANSMISSION QUEUE 1 | 0.000000000 SECOND |
| TRANSMISSION POSSIBLE TIME OF TRANSMISSION QUEUE 0 | 0.000000000 SECOND |
| REQUIRED TRANSMISSION TIME OF FRAME TRANSMITTED NEXT FROM TRANSMISSION QUEUE 7 | 0.000001200 SECOND (FRAME f1) |
| REQUIRED TRANSMISSION TIME OF FRAME TRANSMITTED NEXT FROM TRANSMISSION QUEUE 6 | N/A |
| REQUIRED TRANSMISSION TIME OF FRAME TRANSMITTED NEXT FROM TRANSMISSION QUEUE 5 | N/A |
| REQUIRED TRANSMISSION TIME OF FRAME TRANSMITTED NEXT FROM TRANSMISSION QUEUE 4 | N/A |
| REQUIRED TRANSMISSION TIME OF FRAME TRANSMITTED NEXT FROM TRANSMISSION QUEUE 3 | N/A |
| REQUIRED TRANSMISSION TIME OF FRAME TRANSMITTED NEXT FROM TRANSMISSION QUEUE 2 | N/A |
| REQUIRED TRANSMISSION TIME OF FRAME TRANSMITTED NEXT FROM TRANSMISSION QUEUE 1 | N/A |
| REQUIRED TRANSMISSION TIME OF FRAME TRANSMITTED NEXT FROM TRANSMISSION QUEUE 0 | N/A |

| SCHEDULED FRAME | SCHEDULED TRANSMISSION START TIME | STATE |
|---|---|---|
| FRAME f0 | 12:00:00.000000000 ON OCTOBER 16, 2017 | WAITING FOR TRANSMISSION |

62

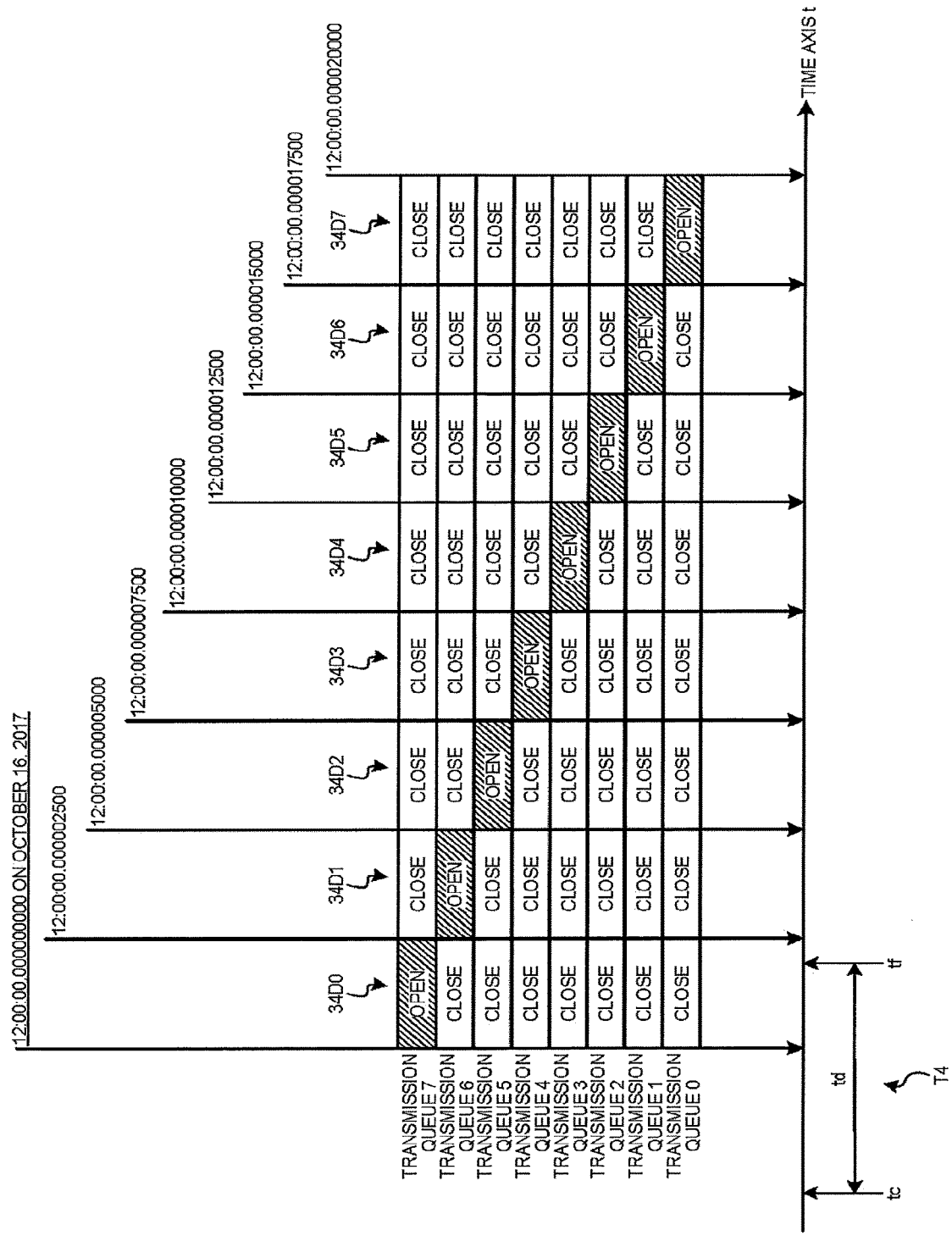

FIG.31

EXAMPLE AFTER FRAME f1 HAS BEEN SCHEDULED [STATE AT THE TIME 0.004 SECOND AFTER INITIALIZATION]

| CURRENT TIME, FUTURE TIME, TRANSMISSION POSSIBLE TIME, AND REQUIRED TRANSMISSION TIME | VALUE |
|---|---|
| CURRENT TIME | 11:59:59.004000000 ON OCTOBER 16, 2017 |
| FUTURE TIME | 12:00:00.000002200 ON OCTOBER 16, 2017 |
| TIME DIFFERENCE BETWEEN CURRENT TIME AND FUTURE TIME | 0.996002200 SECOND |
| TRANSMISSION POSSIBLE TIME OF TRANSMISSION QUEUE 7 | 0.000000300 SECOND |
| TRANSMISSION POSSIBLE TIME OF TRANSMISSION QUEUE 6 | 0.000000000 SECOND |
| TRANSMISSION POSSIBLE TIME OF TRANSMISSION QUEUE 5 | 0.000000000 SECOND |
| TRANSMISSION POSSIBLE TIME OF TRANSMISSION QUEUE 4 | 0.000000000 SECOND |
| TRANSMISSION POSSIBLE TIME OF TRANSMISSION QUEUE 3 | 0.000000000 SECOND |
| TRANSMISSION POSSIBLE TIME OF TRANSMISSION QUEUE 2 | 0.000000000 SECOND |
| TRANSMISSION POSSIBLE TIME OF TRANSMISSION QUEUE 1 | 0.000000000 SECOND |
| TRANSMISSION POSSIBLE TIME OF TRANSMISSION QUEUE 0 | 0.000000000 SECOND |
| REQUIRED TRANSMISSION TIME OF FRAME TRANSMITTED NEXT FROM TRANSMISSION QUEUE 7 | N/A |
| REQUIRED TRANSMISSION TIME OF FRAME TRANSMITTED NEXT FROM TRANSMISSION QUEUE 6 | N/A |
| REQUIRED TRANSMISSION TIME OF FRAME TRANSMITTED NEXT FROM TRANSMISSION QUEUE 5 | N/A |
| REQUIRED TRANSMISSION TIME OF FRAME TRANSMITTED NEXT FROM TRANSMISSION QUEUE 4 | N/A |
| REQUIRED TRANSMISSION TIME OF FRAME TRANSMITTED NEXT FROM TRANSMISSION QUEUE 3 | N/A |
| REQUIRED TRANSMISSION TIME OF FRAME TRANSMITTED NEXT FROM TRANSMISSION QUEUE 2 | N/A |
| REQUIRED TRANSMISSION TIME OF FRAME TRANSMITTED NEXT FROM TRANSMISSION QUEUE 1 | N/A |
| REQUIRED TRANSMISSION TIME OF FRAME TRANSMITTED NEXT FROM TRANSMISSION QUEUE 0 | N/A |

| SCHEDULED FRAME | SCHEDULED TRANSMISSION START TIME | STATE |
|---|---|---|
| FRAME f0 | 12:00:00.000000000 ON OCTOBER 16, 2017 | WAITING FOR TRANSMISSION |
| FRAME f1 | 12:00:00.000001000 ON OCTOBER 16, 2017 | WAITING FOR TRANSMISSION |

FIG.33

EXAMPLE OF CASE WHERE FRAME f2 WITH REQUIRED TRANSMISSION TIME OF 1,500 NANOSECONDS IS WRITTEN TO TRANSMISSION QUEUE 7 [STATE AT THE TIME 0.005 SECOND AFTER INITIALIZATION]

| CURRENT TIME, FUTURE TIME, TRANSMISSION POSSIBLE TIME, AND REQUIRED TRANSMISSION TIME | VALUE |
|---|---|
| CURRENT TIME | 11:59:59.005000000 ON OCTOBER 16, 2017 |
| FUTURE TIME | 12:00:00.000002200 ON OCTOBER 16, 2017 |
| TIME DIFFERENCE BETWEEN CURRENT TIME AND FUTURE TIME | 0.995002200 SECOND |
| TRANSMISSION POSSIBLE TIME OF TRANSMISSION QUEUE 7 | 0.000000300 SECOND |
| TRANSMISSION POSSIBLE TIME OF TRANSMISSION QUEUE 6 | 0.000000000 SECOND |
| TRANSMISSION POSSIBLE TIME OF TRANSMISSION QUEUE 5 | 0.000000000 SECOND |
| TRANSMISSION POSSIBLE TIME OF TRANSMISSION QUEUE 4 | 0.000000000 SECOND |
| TRANSMISSION POSSIBLE TIME OF TRANSMISSION QUEUE 3 | 0.000000000 SECOND |
| TRANSMISSION POSSIBLE TIME OF TRANSMISSION QUEUE 2 | 0.000000000 SECOND |
| TRANSMISSION POSSIBLE TIME OF TRANSMISSION QUEUE 1 | 0.000000000 SECOND |
| TRANSMISSION POSSIBLE TIME OF TRANSMISSION QUEUE 0 | 0.000000000 SECOND |
| REQUIRED TRANSMISSION TIME OF FRAME TRANSMITTED NEXT FROM TRANSMISSION QUEUE 7 | 0.000001500 SECOND (FRAME f2) |
| REQUIRED TRANSMISSION TIME OF FRAME TRANSMITTED NEXT FROM TRANSMISSION QUEUE 6 | N/A |
| REQUIRED TRANSMISSION TIME OF FRAME TRANSMITTED NEXT FROM TRANSMISSION QUEUE 5 | N/A |
| REQUIRED TRANSMISSION TIME OF FRAME TRANSMITTED NEXT FROM TRANSMISSION QUEUE 4 | N/A |
| REQUIRED TRANSMISSION TIME OF FRAME TRANSMITTED NEXT FROM TRANSMISSION QUEUE 3 | N/A |
| REQUIRED TRANSMISSION TIME OF FRAME TRANSMITTED NEXT FROM TRANSMISSION QUEUE 2 | N/A |
| REQUIRED TRANSMISSION TIME OF FRAME TRANSMITTED NEXT FROM TRANSMISSION QUEUE 1 | N/A |
| REQUIRED TRANSMISSION TIME OF FRAME TRANSMITTED NEXT FROM TRANSMISSION QUEUE 0 | N/A |

| SCHEDULED FRAME | SCHEDULED TRANSMISSION START TIME | STATE |
|---|---|---|
| FRAME f0 | 12:00:00.000000000 ON OCTOBER 16, 2017 | WAITING FOR TRANSMISSION |
| FRAME f1 | 12:00:00.000001000 ON OCTOBER 16, 2017 | WAITING FOR TRANSMISSION |

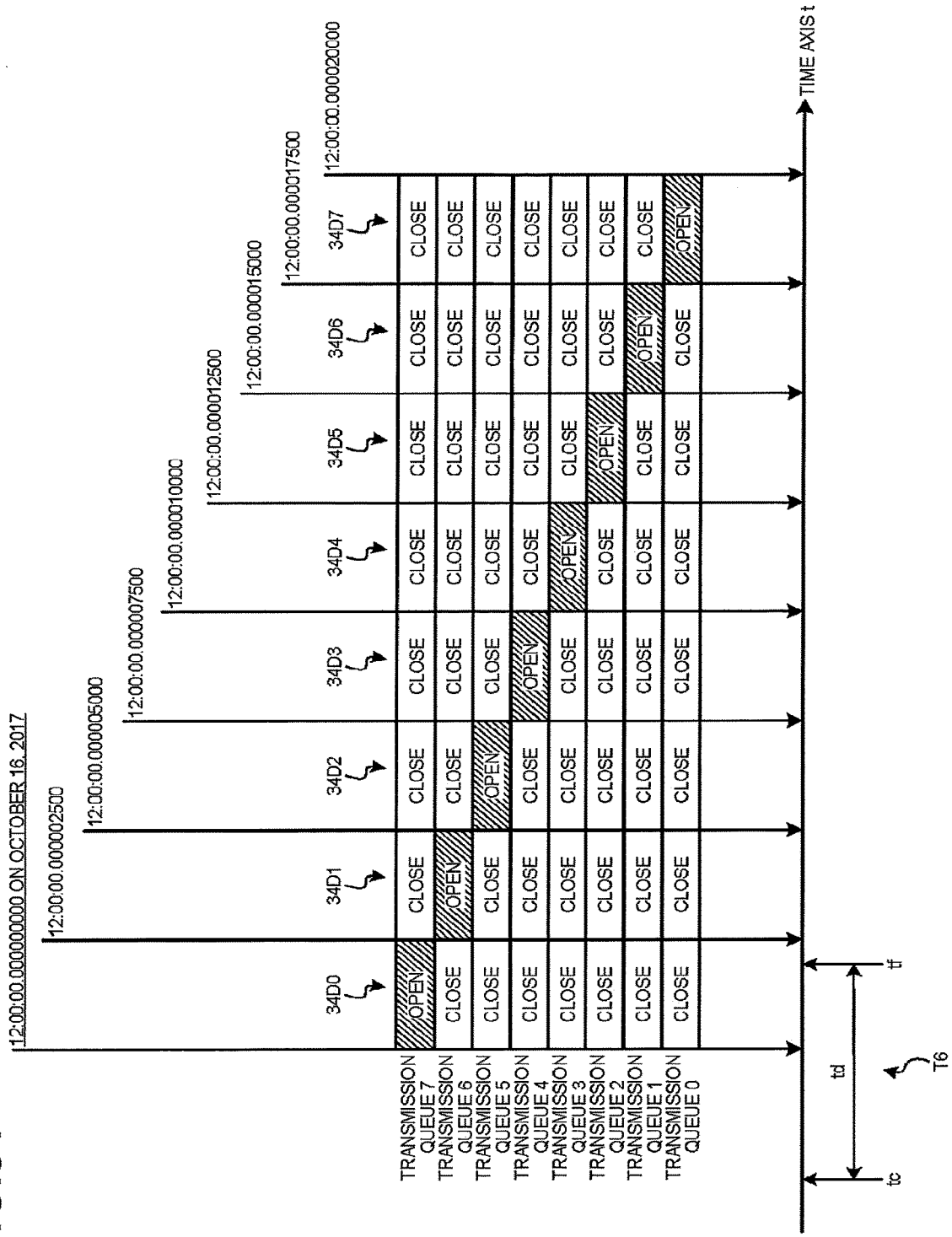

FIG.35

EXAMPLE AFTER TRANSMISSION POSSIBLE TIME OF TRANSMISSION QUEUE 7 HAS BEEN REDUCED TO ZERO
[STATE AT THE TIME 0.006 SECOND AFTER INITIALIZATION]

| CURRENT TIME, FUTURE TIME, TRANSMISSION POSSIBLE TIME, AND REQUIRED TRANSMISSION TIME | VALUE |
|---|---|
| CURRENT TIME | 11:59:59.006000000 ON OCTOBER 16, 2017 |
| FUTURE TIME | 12:00:00.000002200 ON OCTOBER 16, 2017 |
| TIME DIFFERENCE BETWEEN CURRENT TIME AND FUTURE TIME | 0.994002200 SECOND |
| TRANSMISSION POSSIBLE TIME OF TRANSMISSION QUEUE 7 | 0.000000000 SECOND |
| TRANSMISSION POSSIBLE TIME OF TRANSMISSION QUEUE 6 | 0.000000000 SECOND |
| TRANSMISSION POSSIBLE TIME OF TRANSMISSION QUEUE 5 | 0.000000000 SECOND |
| TRANSMISSION POSSIBLE TIME OF TRANSMISSION QUEUE 4 | 0.000000000 SECOND |
| TRANSMISSION POSSIBLE TIME OF TRANSMISSION QUEUE 3 | 0.000000000 SECOND |
| TRANSMISSION POSSIBLE TIME OF TRANSMISSION QUEUE 2 | 0.000000000 SECOND |
| TRANSMISSION POSSIBLE TIME OF TRANSMISSION QUEUE 1 | 0.000000000 SECOND |
| TRANSMISSION POSSIBLE TIME OF TRANSMISSION QUEUE 0 | 0.000000000 SECOND |
| REQUIRED TRANSMISSION TIME OF FRAME TRANSMITTED NEXT FROM TRANSMISSION QUEUE 7 | 0.000001500 SECOND (FRAME f2) |
| REQUIRED TRANSMISSION TIME OF FRAME TRANSMITTED NEXT FROM TRANSMISSION QUEUE 6 | N/A |
| REQUIRED TRANSMISSION TIME OF FRAME TRANSMITTED NEXT FROM TRANSMISSION QUEUE 5 | N/A |
| REQUIRED TRANSMISSION TIME OF FRAME TRANSMITTED NEXT FROM TRANSMISSION QUEUE 4 | N/A |
| REQUIRED TRANSMISSION TIME OF FRAME TRANSMITTED NEXT FROM TRANSMISSION QUEUE 3 | N/A |
| REQUIRED TRANSMISSION TIME OF FRAME TRANSMITTED NEXT FROM TRANSMISSION QUEUE 2 | N/A |
| REQUIRED TRANSMISSION TIME OF FRAME TRANSMITTED NEXT FROM TRANSMISSION QUEUE 1 | N/A |
| REQUIRED TRANSMISSION TIME OF FRAME TRANSMITTED NEXT FROM TRANSMISSION QUEUE 0 | N/A |

| SCHEDULED FRAME | SCHEDULED TRANSMISSION START TIME | STATE |
|---|---|---|
| FRAME f0 | 12:00:00.000000000 ON OCTOBER 16, 2017 | WAITING FOR TRANSMISSION |
| FRAME f1 | 12:00:00.000001000 ON OCTOBER 16, 2017 | WAITING FOR TRANSMISSION |

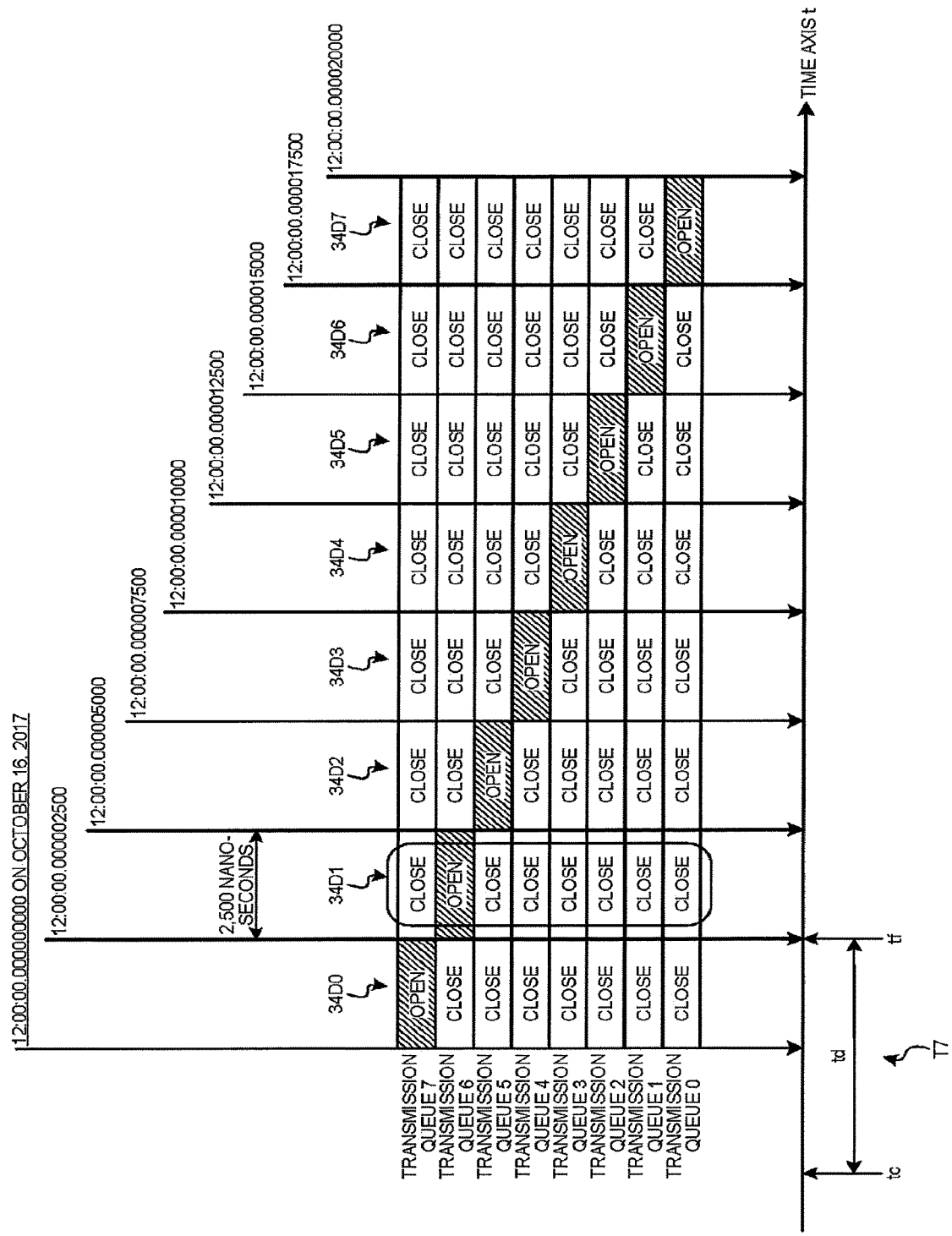

FIG.37

EXAMPLE AFTER ENTRY OF LIST INDEX 1 HAS BEEN PREFETCHED [STATE AT THE TIME 0.007 SECOND AFTER INITIALIZATION]

| CURRENT TIME, FUTURE TIME, TRANSMISSION POSSIBLE TIME, AND REQUIRED TRANSMISSION TIME | VALUE |
|---|---|
| CURRENT TIME | 11:59:59.007000000 ON OCTOBER 16, 2017 |
| FUTURE TIME | 12:00:00.000002500 ON OCTOBER 16, 2017 |
| TIME DIFFERENCE BETWEEN CURRENT TIME AND FUTURE TIME | 0.993002500 SECOND |
| TRANSMISSION POSSIBLE TIME OF TRANSMISSION QUEUE 7 | 0.000000000 SECOND |
| TRANSMISSION POSSIBLE TIME OF TRANSMISSION QUEUE 6 | 0.000002500 SECOND |
| TRANSMISSION POSSIBLE TIME OF TRANSMISSION QUEUE 5 | 0.000000000 SECOND |
| TRANSMISSION POSSIBLE TIME OF TRANSMISSION QUEUE 4 | 0.000000000 SECOND |
| TRANSMISSION POSSIBLE TIME OF TRANSMISSION QUEUE 3 | 0.000000000 SECOND |
| TRANSMISSION POSSIBLE TIME OF TRANSMISSION QUEUE 2 | 0.000000000 SECOND |
| TRANSMISSION POSSIBLE TIME OF TRANSMISSION QUEUE 1 | 0.000000000 SECOND |
| TRANSMISSION POSSIBLE TIME OF TRANSMISSION QUEUE 0 | 0.000000000 SECOND |
| REQUIRED TRANSMISSION TIME OF FRAME TRANSMITTED NEXT FROM TRANSMISSION QUEUE 7 | 0.000001500 SECOND (FRAME f2) |
| REQUIRED TRANSMISSION TIME OF FRAME TRANSMITTED NEXT FROM TRANSMISSION QUEUE 6 | N/A |
| REQUIRED TRANSMISSION TIME OF FRAME TRANSMITTED NEXT FROM TRANSMISSION QUEUE 5 | N/A |
| REQUIRED TRANSMISSION TIME OF FRAME TRANSMITTED NEXT FROM TRANSMISSION QUEUE 4 | N/A |
| REQUIRED TRANSMISSION TIME OF FRAME TRANSMITTED NEXT FROM TRANSMISSION QUEUE 3 | N/A |
| REQUIRED TRANSMISSION TIME OF FRAME TRANSMITTED NEXT FROM TRANSMISSION QUEUE 2 | N/A |
| REQUIRED TRANSMISSION TIME OF FRAME TRANSMITTED NEXT FROM TRANSMISSION QUEUE 1 | N/A |
| REQUIRED TRANSMISSION TIME OF FRAME TRANSMITTED NEXT FROM TRANSMISSION QUEUE 0 | N/A |

| SCHEDULED FRAME | SCHEDULED TRANSMISSION START TIME | STATE |
|---|---|---|
| FRAME f0 | 12:00:00.000000000 ON OCTOBER 16, 2017 | WAITING FOR TRANSMISSION |
| FRAME f1 | 12:00:00.000001000 ON OCTOBER 16, 2017 | WAITING FOR TRANSMISSION |

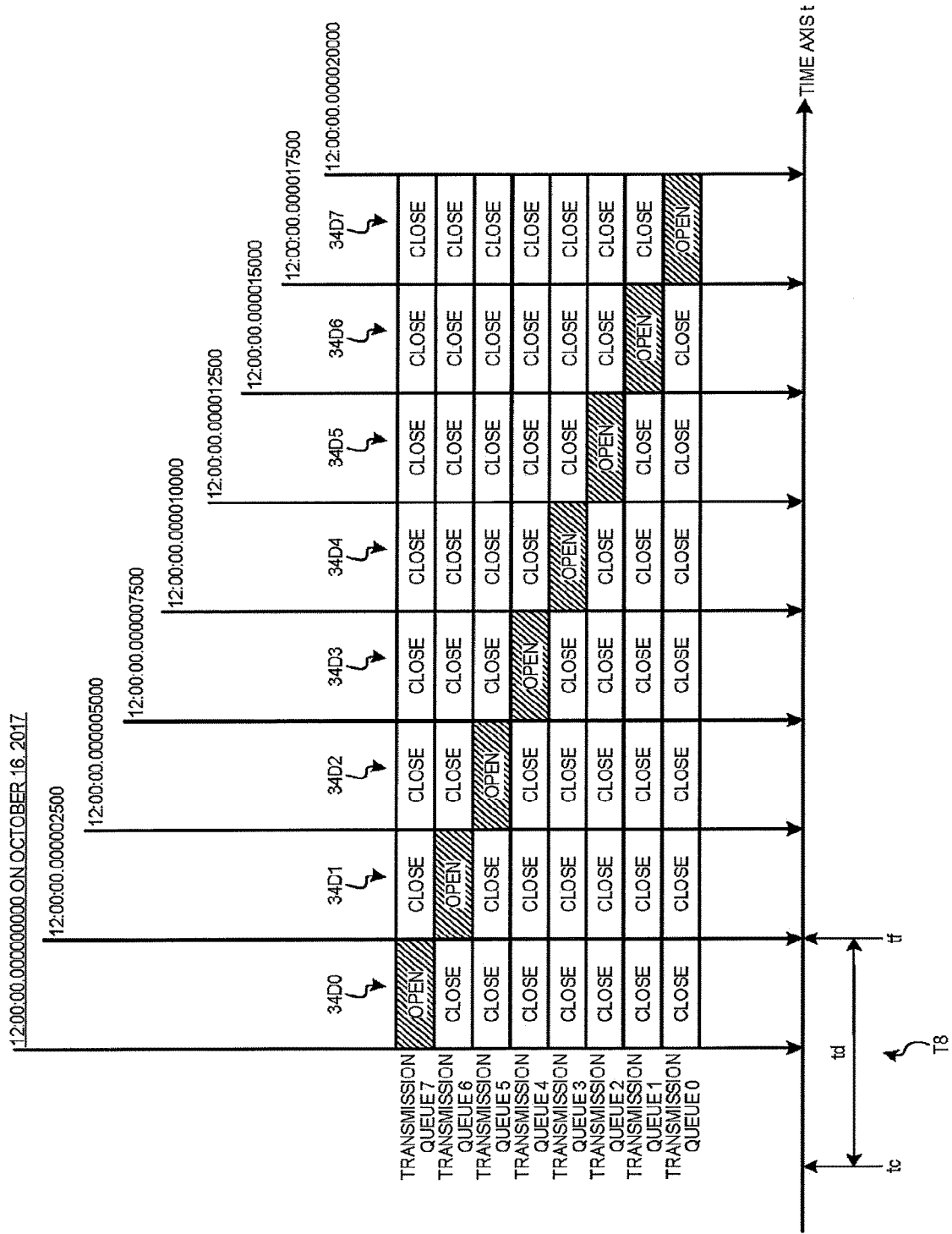

FIG.39

EXAMPLE OF CASE WHERE FRAME f3 WITH REQUIRED TRANSMISSION TIME OF 1,000 NANOSECONDS IS WRITTEN TO TRANSMISSION QUEUE 6 [STATE AT THE TIME 0.008 SECOND AFTER INITIALIZATION]

| CURRENT TIME, FUTURE TIME, TRANSMISSION POSSIBLE TIME, AND REQUIRED TRANSMISSION TIME | VALUE |
|---|---|
| CURRENT TIME | 11:59:59.008000000 ON OCTOBER 16, 2017 |
| FUTURE TIME | 12:00:00.000002500 ON OCTOBER 16, 2017 |
| TIME DIFFERENCE BETWEEN CURRENT TIME AND FUTURE TIME | 0.992002500 SECOND |
| TRANSMISSION POSSIBLE TIME OF TRANSMISSION QUEUE 7 | 0.000000000 SECOND |
| TRANSMISSION POSSIBLE TIME OF TRANSMISSION QUEUE 6 | 0.000002500 SECOND |
| TRANSMISSION POSSIBLE TIME OF TRANSMISSION QUEUE 5 | 0.000000000 SECOND |
| TRANSMISSION POSSIBLE TIME OF TRANSMISSION QUEUE 4 | 0.000000000 SECOND |
| TRANSMISSION POSSIBLE TIME OF TRANSMISSION QUEUE 3 | 0.000000000 SECOND |
| TRANSMISSION POSSIBLE TIME OF TRANSMISSION QUEUE 2 | 0.000000000 SECOND |
| TRANSMISSION POSSIBLE TIME OF TRANSMISSION QUEUE 1 | 0.000000000 SECOND |
| TRANSMISSION POSSIBLE TIME OF TRANSMISSION QUEUE 0 | 0.000000000 SECOND |
| REQUIRED TRANSMISSION TIME OF FRAME TRANSMITTED NEXT FROM TRANSMISSION QUEUE 7 | 0.000001500 SECOND (FRAME f2) |
| REQUIRED TRANSMISSION TIME OF FRAME TRANSMITTED NEXT FROM TRANSMISSION QUEUE 6 | 0.000001000 SECOND (FRAME f3) |
| REQUIRED TRANSMISSION TIME OF FRAME TRANSMITTED NEXT FROM TRANSMISSION QUEUE 5 | N/A |
| REQUIRED TRANSMISSION TIME OF FRAME TRANSMITTED NEXT FROM TRANSMISSION QUEUE 4 | N/A |
| REQUIRED TRANSMISSION TIME OF FRAME TRANSMITTED NEXT FROM TRANSMISSION QUEUE 3 | N/A |
| REQUIRED TRANSMISSION TIME OF FRAME TRANSMITTED NEXT FROM TRANSMISSION QUEUE 2 | N/A |
| REQUIRED TRANSMISSION TIME OF FRAME TRANSMITTED NEXT FROM TRANSMISSION QUEUE 1 | N/A |
| REQUIRED TRANSMISSION TIME OF FRAME TRANSMITTED NEXT FROM TRANSMISSION QUEUE 0 | N/A |

| SCHEDULED FRAME | SCHEDULED TRANSMISSION START TIME | STATE |
|---|---|---|
| FRAME f0 | 12:00:00.000000000 ON OCTOBER 16, 2017 | WAITING FOR TRANSMISSION |
| FRAME f1 | 12:00:00.000001000 ON OCTOBER 16, 2017 | WAITING FOR TRANSMISSION |

FIG.41

EXAMPLE AFTER FRAME f3 HAS BEEN SCHEDULED [STATE AT THE TIME 0.009 SECOND AFTER INITIALIZATION]

| CURRENT TIME, FUTURE TIME, TRANSMISSION POSSIBLE TIME, AND REQUIRED TRANSMISSION TIME | VALUE |
|---|---|
| CURRENT TIME | 11:59:59.009000000 ON OCTOBER 16, 2017 |
| FUTURE TIME | 12:00:00.000003500 ON OCTOBER 16, 2017 |
| TIME DIFFERENCE BETWEEN CURRENT TIME AND FUTURE TIME | 0.991003500 SECOND |
| TRANSMISSION POSSIBLE TIME OF TRANSMISSION QUEUE 7 | 0.000000000 SECOND |
| TRANSMISSION POSSIBLE TIME OF TRANSMISSION QUEUE 6 | 0.000001500 SECOND |
| TRANSMISSION POSSIBLE TIME OF TRANSMISSION QUEUE 5 | 0.000000000 SECOND |
| TRANSMISSION POSSIBLE TIME OF TRANSMISSION QUEUE 4 | 0.000000000 SECOND |
| TRANSMISSION POSSIBLE TIME OF TRANSMISSION QUEUE 3 | 0.000000000 SECOND |
| TRANSMISSION POSSIBLE TIME OF TRANSMISSION QUEUE 2 | 0.000000000 SECOND |
| TRANSMISSION POSSIBLE TIME OF TRANSMISSION QUEUE 1 | 0.000000000 SECOND |
| TRANSMISSION POSSIBLE TIME OF TRANSMISSION QUEUE 0 | 0.000000000 SECOND |
| REQUIRED TRANSMISSION TIME OF FRAME TRANSMITTED NEXT FROM TRANSMISSION QUEUE 7 | 0.000001500 SECOND (FRAME f2) |
| REQUIRED TRANSMISSION TIME OF FRAME TRANSMITTED NEXT FROM TRANSMISSION QUEUE 6 | N/A |
| REQUIRED TRANSMISSION TIME OF FRAME TRANSMITTED NEXT FROM TRANSMISSION QUEUE 5 | N/A |
| REQUIRED TRANSMISSION TIME OF FRAME TRANSMITTED NEXT FROM TRANSMISSION QUEUE 4 | N/A |
| REQUIRED TRANSMISSION TIME OF FRAME TRANSMITTED NEXT FROM TRANSMISSION QUEUE 3 | N/A |
| REQUIRED TRANSMISSION TIME OF FRAME TRANSMITTED NEXT FROM TRANSMISSION QUEUE 2 | N/A |
| REQUIRED TRANSMISSION TIME OF FRAME TRANSMITTED NEXT FROM TRANSMISSION QUEUE 1 | N/A |
| REQUIRED TRANSMISSION TIME OF FRAME TRANSMITTED NEXT FROM TRANSMISSION QUEUE 0 | N/A |

| SCHEDULED FRAME | SCHEDULED TRANSMISSION START TIME | STATE |
|---|---|---|
| FRAME f0 | 12:00:00.000000000 ON OCTOBER 16, 2017 | WAITING FOR TRANSMISSION |
| FRAME f1 | 12:00:00.000001000 ON OCTOBER 16, 2017 | WAITING FOR TRANSMISSION |
| FRAME f3 | 12:00:00.000002500 ON OCTOBER 16, 2017 | WAITING FOR TRANSMISSION |

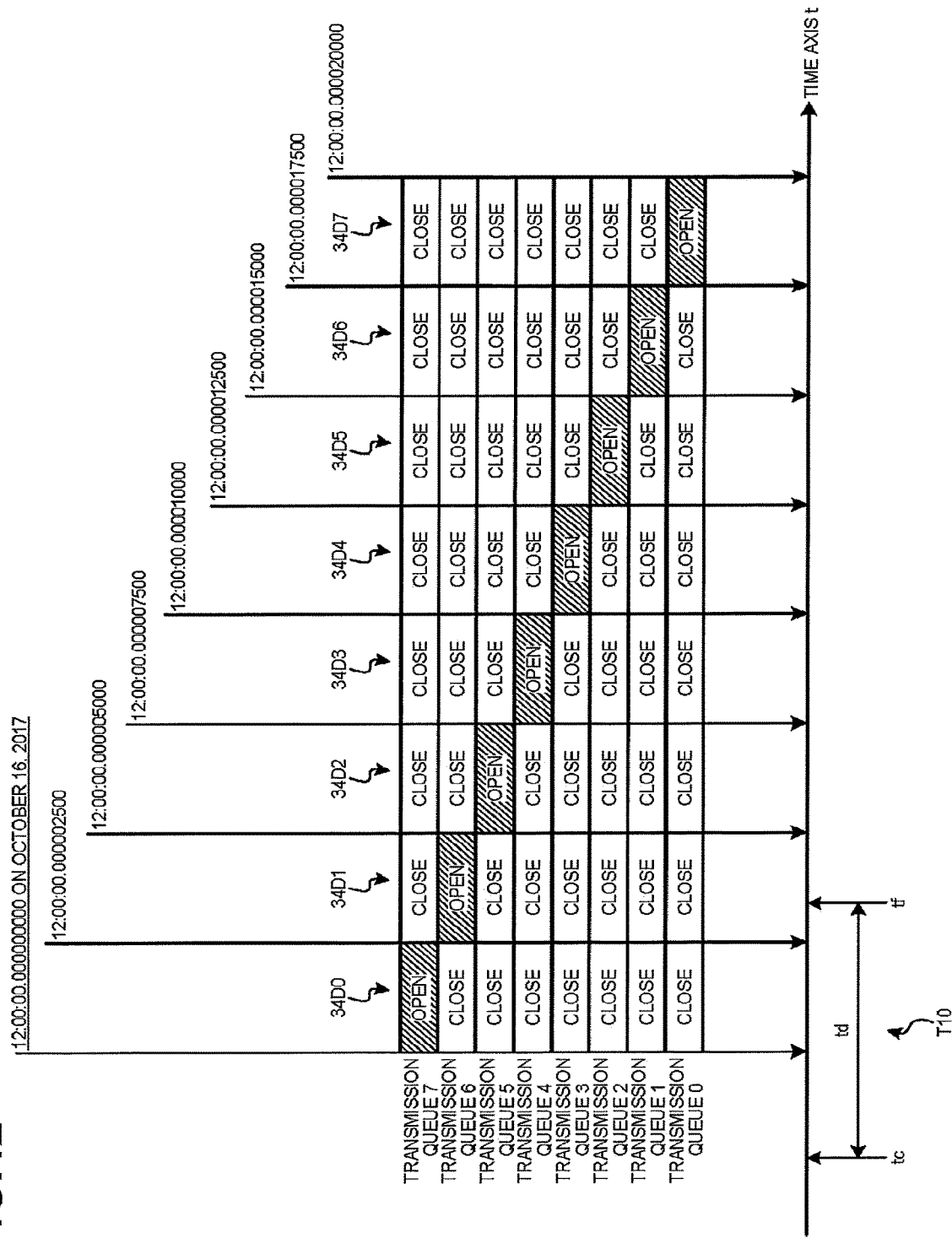

FIG.43

EXAMPLE OF CASE WHERE FRAME f4 WITH REQUIRED TRANSMISSION TIME OF 1,500 NANOSECONDS IS WRITTEN TO TRANSMISSION QUEUE 6
[STATE AT THE TIME 0.010 SECOND AFTER INITIALIZATION]

| CURRENT TIME, FUTURE TIME, TRANSMISSION POSSIBLE TIME, AND REQUIRED TRANSMISSION TIME | VALUE |
|---|---|
| CURRENT TIME | 11:59:59.010000000 ON OCTOBER 16, 2017 |
| FUTURE TIME | 12:00:00.000003500 ON OCTOBER 16, 2017 |
| TIME DIFFERENCE BETWEEN CURRENT TIME AND FUTURE TIME | 0.990003500 SECOND |
| TRANSMISSION POSSIBLE TIME OF TRANSMISSION QUEUE 7 | 0.000000000 SECOND |
| TRANSMISSION POSSIBLE TIME OF TRANSMISSION QUEUE 6 | 0.000001500 SECOND |
| TRANSMISSION POSSIBLE TIME OF TRANSMISSION QUEUE 5 | 0.000000000 SECOND |
| TRANSMISSION POSSIBLE TIME OF TRANSMISSION QUEUE 4 | 0.000000000 SECOND |
| TRANSMISSION POSSIBLE TIME OF TRANSMISSION QUEUE 3 | 0.000000000 SECOND |
| TRANSMISSION POSSIBLE TIME OF TRANSMISSION QUEUE 2 | 0.000000000 SECOND |
| TRANSMISSION POSSIBLE TIME OF TRANSMISSION QUEUE 1 | 0.000000000 SECOND |
| TRANSMISSION POSSIBLE TIME OF TRANSMISSION QUEUE 0 | 0.000000000 SECOND |
| REQUIRED TRANSMISSION TIME OF FRAME TRANSMITTED NEXT FROM TRANSMISSION QUEUE 7 | 0.000001500 SECOND (FRAME f2) |
| REQUIRED TRANSMISSION TIME OF FRAME TRANSMITTED NEXT FROM TRANSMISSION QUEUE 6 | 0.000001500 SECOND (FRAME f4) |
| REQUIRED TRANSMISSION TIME OF FRAME TRANSMITTED NEXT FROM TRANSMISSION QUEUE 5 | N/A |
| REQUIRED TRANSMISSION TIME OF FRAME TRANSMITTED NEXT FROM TRANSMISSION QUEUE 4 | N/A |
| REQUIRED TRANSMISSION TIME OF FRAME TRANSMITTED NEXT FROM TRANSMISSION QUEUE 3 | N/A |
| REQUIRED TRANSMISSION TIME OF FRAME TRANSMITTED NEXT FROM TRANSMISSION QUEUE 2 | N/A |
| REQUIRED TRANSMISSION TIME OF FRAME TRANSMITTED NEXT FROM TRANSMISSION QUEUE 1 | N/A |
| REQUIRED TRANSMISSION TIME OF FRAME TRANSMITTED NEXT FROM TRANSMISSION QUEUE 0 | N/A |

| SCHEDULED FRAME | SCHEDULED TRANSMISSION START TIME | STATE |
|---|---|---|
| FRAME f0 | 12:00:00.000000000 ON OCTOBER 16, 2017 | WAITING FOR TRANSMISSION |
| FRAME f1 | 12:00:00.000001000 ON OCTOBER 16, 2017 | WAITING FOR TRANSMISSION |
| FRAME f3 | 12:00:00.000002500 ON OCTOBER 16, 2017 | WAITING FOR TRANSMISSION |

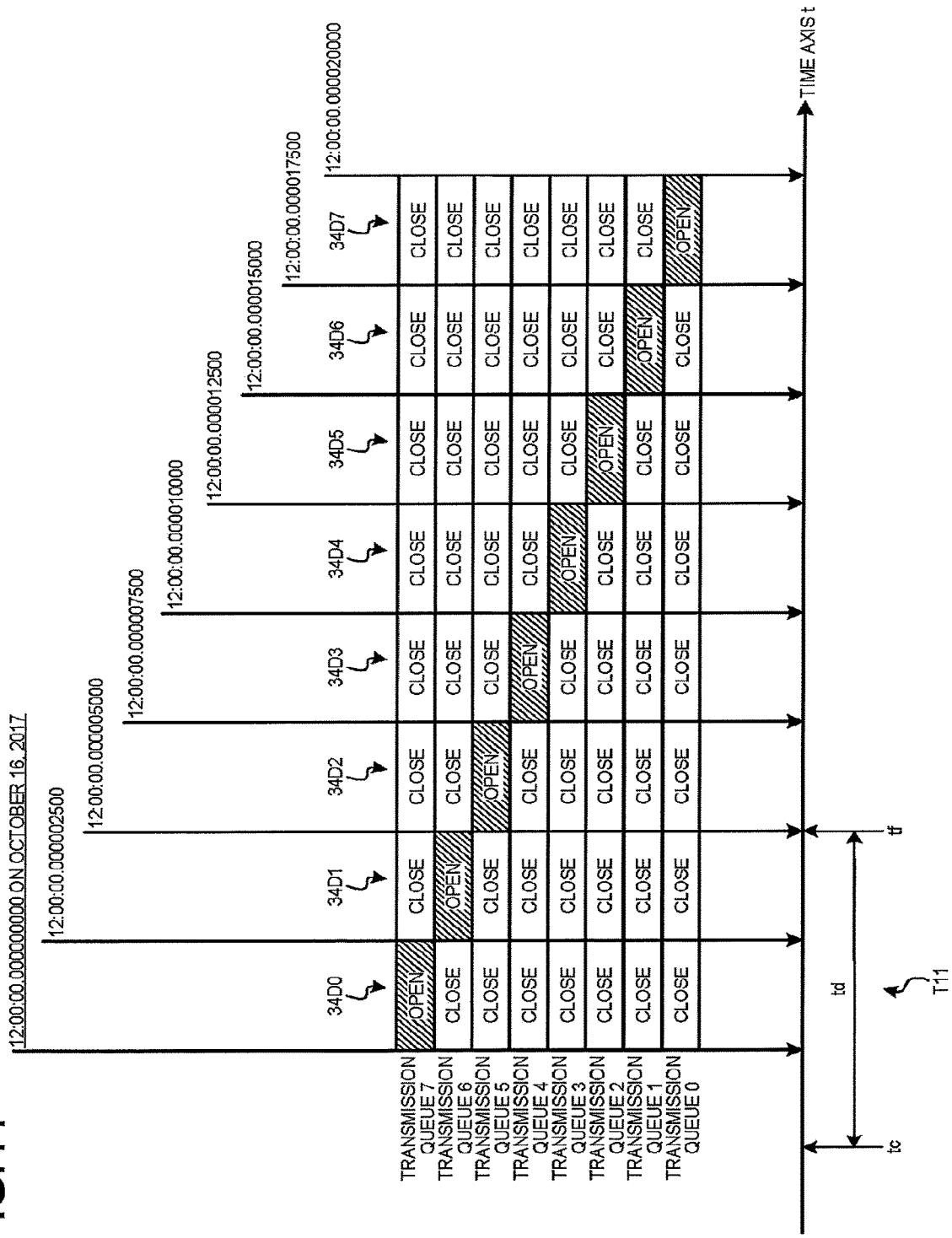

FIG.45

EXAMPLE AFTER FRAME f4 HAS BEEN SCHEDULED [STATE AT THE TIME 0.011 SECOND AFTER INITIALIZATION]

| CURRENT TIME, FUTURE TIME, TRANSMISSION POSSIBLE TIME, AND REQUIRED TRANSMISSION TIME | VALUE |
|---|---|
| CURRENT TIME | 11:59:59.011000000 ON OCTOBER 16, 2017 |
| FUTURE TIME | 12:00:00.000005500 ON OCTOBER 16, 2017 |
| TIME DIFFERENCE BETWEEN CURRENT TIME AND FUTURE TIME | 0.989005500 SECOND |
| TRANSMISSION POSSIBLE TIME OF TRANSMISSION QUEUE 7 | 0.000000000 SECOND |
| TRANSMISSION POSSIBLE TIME OF TRANSMISSION QUEUE 6 | 0.000000000 SECOND |
| TRANSMISSION POSSIBLE TIME OF TRANSMISSION QUEUE 5 | 0.000000000 SECOND |
| TRANSMISSION POSSIBLE TIME OF TRANSMISSION QUEUE 4 | 0.000000000 SECOND |
| TRANSMISSION POSSIBLE TIME OF TRANSMISSION QUEUE 3 | 0.000000000 SECOND |
| TRANSMISSION POSSIBLE TIME OF TRANSMISSION QUEUE 2 | 0.000000000 SECOND |
| TRANSMISSION POSSIBLE TIME OF TRANSMISSION QUEUE 1 | 0.000000000 SECOND |
| TRANSMISSION POSSIBLE TIME OF TRANSMISSION QUEUE 0 | 0.000000000 SECOND |
| REQUIRED TRANSMISSION TIME OF FRAME TRANSMITTED NEXT FROM TRANSMISSION QUEUE 7 | 0.000001500 SECOND (FRAME f2) |
| REQUIRED TRANSMISSION TIME OF FRAME TRANSMITTED NEXT FROM TRANSMISSION QUEUE 6 | N/A |
| REQUIRED TRANSMISSION TIME OF FRAME TRANSMITTED NEXT FROM TRANSMISSION QUEUE 5 | N/A |
| REQUIRED TRANSMISSION TIME OF FRAME TRANSMITTED NEXT FROM TRANSMISSION QUEUE 4 | N/A |
| REQUIRED TRANSMISSION TIME OF FRAME TRANSMITTED NEXT FROM TRANSMISSION QUEUE 3 | N/A |
| REQUIRED TRANSMISSION TIME OF FRAME TRANSMITTED NEXT FROM TRANSMISSION QUEUE 2 | N/A |
| REQUIRED TRANSMISSION TIME OF FRAME TRANSMITTED NEXT FROM TRANSMISSION QUEUE 1 | N/A |
| REQUIRED TRANSMISSION TIME OF FRAME TRANSMITTED NEXT FROM TRANSMISSION QUEUE 0 | N/A |

| SCHEDULED FRAME | SCHEDULED TRANSMISSION START TIME | STATE |
|---|---|---|
| FRAME f0 | 12:00:00.000000000 ON OCTOBER 16, 2017 | WAITING FOR TRANSMISSION |
| FRAME f1 | 12:00:00.000001000 ON OCTOBER 16, 2017 | WAITING FOR TRANSMISSION |
| FRAME f3 | 12:00:00.000002500 ON OCTOBER 16, 2017 | WAITING FOR TRANSMISSION |
| FRAME f4 | 12:00:00.000003500 ON OCTOBER 16, 2017 | WAITING FOR TRANSMISSION |

FIG.47

EXAMPLE AFTER ENTRY OF LIST INDEX 2 HAS BEEN PREFETCHED [STATE AT THE TIME 0.012 SECOND AFTER INITIALIZATION]

| CURRENT TIME, FUTURE TIME, TRANSMISSION POSSIBLE TIME, AND REQUIRED TRANSMISSION TIME | VALUE |
|---|---|
| CURRENT TIME | 11:59:59.012000000 ON OCTOBER 16, 2017 |
| FUTURE TIME | 12:00:00.000005000 ON OCTOBER 16, 2017 |
| TIME DIFFERENCE BETWEEN CURRENT TIME AND FUTURE TIME | 0.988005000 SECOND |
| TRANSMISSION POSSIBLE TIME OF TRANSMISSION QUEUE 7 | 0.000000000 SECOND |
| TRANSMISSION POSSIBLE TIME OF TRANSMISSION QUEUE 6 | 0.000000000 SECOND |
| TRANSMISSION POSSIBLE TIME OF TRANSMISSION QUEUE 5 | 0.000002500 SECOND |
| TRANSMISSION POSSIBLE TIME OF TRANSMISSION QUEUE 4 | 0.000000000 SECOND |
| TRANSMISSION POSSIBLE TIME OF TRANSMISSION QUEUE 3 | 0.000000000 SECOND |
| TRANSMISSION POSSIBLE TIME OF TRANSMISSION QUEUE 2 | 0.000000000 SECOND |
| TRANSMISSION POSSIBLE TIME OF TRANSMISSION QUEUE 1 | 0.000000000 SECOND |
| TRANSMISSION POSSIBLE TIME OF TRANSMISSION QUEUE 0 | 0.000000000 SECOND |
| REQUIRED TRANSMISSION TIME OF FRAME TRANSMITTED NEXT FROM TRANSMISSION QUEUE 7 | 0.000001500 SECOND (FRAME f2) |
| REQUIRED TRANSMISSION TIME OF FRAME TRANSMITTED NEXT FROM TRANSMISSION QUEUE 6 | N/A |
| REQUIRED TRANSMISSION TIME OF FRAME TRANSMITTED NEXT FROM TRANSMISSION QUEUE 5 | N/A |
| REQUIRED TRANSMISSION TIME OF FRAME TRANSMITTED NEXT FROM TRANSMISSION QUEUE 4 | N/A |
| REQUIRED TRANSMISSION TIME OF FRAME TRANSMITTED NEXT FROM TRANSMISSION QUEUE 3 | N/A |
| REQUIRED TRANSMISSION TIME OF FRAME TRANSMITTED NEXT FROM TRANSMISSION QUEUE 2 | N/A |
| REQUIRED TRANSMISSION TIME OF FRAME TRANSMITTED NEXT FROM TRANSMISSION QUEUE 1 | N/A |
| REQUIRED TRANSMISSION TIME OF FRAME TRANSMITTED NEXT FROM TRANSMISSION QUEUE 0 | N/A |

| SCHEDULED FRAME | SCHEDULED TRANSMISSION START TIME | STATE |
|---|---|---|
| FRAME f0 | 12:00:00.000000000 ON OCTOBER 16, 2017 | WAITING FOR TRANSMISSION |
| FRAME f1 | 12:00:00.000001000 ON OCTOBER 16, 2017 | WAITING FOR TRANSMISSION |
| FRAME f3 | 12:00:00.000002500 ON OCTOBER 16, 2017 | WAITING FOR TRANSMISSION |
| FRAME f4 | 12:00:00.000003500 ON OCTOBER 16, 2017 | WAITING FOR TRANSMISSION |

FIG.49

EXAMPLE OF CASE WHERE NO FRAME FOR WHICH SCHEDULING IS POSSIBLE EXISTS [STATE AT THE TIME 0.013 SECOND AFTER INITIALIZATION]

| CURRENT TIME, FUTURE TIME, TRANSMISSION POSSIBLE TIME, AND REQUIRED TRANSMISSION TIME | VALUE |
|---|---|
| CURRENT TIME | 11:59:59.013000000 ON OCTOBER 16, 2017 |
| FUTURE TIME | 12:00:00.000005000 ON OCTOBER 16, 2017 |
| TIME DIFFERENCE BETWEEN CURRENT TIME AND FUTURE TIME | 0.987005000 SECOND |
| TRANSMISSION POSSIBLE TIME OF TRANSMISSION QUEUE 7 | 0.000000000 SECOND |
| TRANSMISSION POSSIBLE TIME OF TRANSMISSION QUEUE 6 | 0.000000000 SECOND |
| TRANSMISSION POSSIBLE TIME OF TRANSMISSION QUEUE 5 | 0.000002500 SECOND |
| TRANSMISSION POSSIBLE TIME OF TRANSMISSION QUEUE 4 | 0.000000000 SECOND |
| TRANSMISSION POSSIBLE TIME OF TRANSMISSION QUEUE 3 | 0.000000000 SECOND |
| TRANSMISSION POSSIBLE TIME OF TRANSMISSION QUEUE 2 | 0.000000000 SECOND |
| TRANSMISSION POSSIBLE TIME OF TRANSMISSION QUEUE 1 | 0.000000000 SECOND |
| TRANSMISSION POSSIBLE TIME OF TRANSMISSION QUEUE 0 | 0.000000000 SECOND |
| REQUIRED TRANSMISSION TIME OF FRAME TRANSMITTED NEXT FROM TRANSMISSION QUEUE 7 | 0.000001500 SECOND (FRAME f2) |
| REQUIRED TRANSMISSION TIME OF FRAME TRANSMITTED NEXT FROM TRANSMISSION QUEUE 6 | N/A |
| REQUIRED TRANSMISSION TIME OF FRAME TRANSMITTED NEXT FROM TRANSMISSION QUEUE 5 | N/A |
| REQUIRED TRANSMISSION TIME OF FRAME TRANSMITTED NEXT FROM TRANSMISSION QUEUE 4 | N/A |
| REQUIRED TRANSMISSION TIME OF FRAME TRANSMITTED NEXT FROM TRANSMISSION QUEUE 3 | N/A |
| REQUIRED TRANSMISSION TIME OF FRAME TRANSMITTED NEXT FROM TRANSMISSION QUEUE 2 | N/A |
| REQUIRED TRANSMISSION TIME OF FRAME TRANSMITTED NEXT FROM TRANSMISSION QUEUE 1 | N/A |
| REQUIRED TRANSMISSION TIME OF FRAME TRANSMITTED NEXT FROM TRANSMISSION QUEUE 0 | N/A |

| SCHEDULED FRAME | SCHEDULED TRANSMISSION START TIME | STATE |
|---|---|---|
| FRAME f0 | 12:00:00.000000000 ON OCTOBER 16, 2017 | WAITING FOR TRANSMISSION |
| FRAME f1 | 12:00:00.000001000 ON OCTOBER 16, 2017 | WAITING FOR TRANSMISSION |
| FRAME f3 | 12:00:00.000002500 ON OCTOBER 16, 2017 | WAITING FOR TRANSMISSION |
| FRAME f4 | 12:00:00.000003500 ON OCTOBER 16, 2017 | WAITING FOR TRANSMISSION |

FIG.51

EXAMPLE IN WHICH UPDATE OF FUTURE TIME IS STOPPED [STATE AT THE TIME 0.014 SECOND AFTER INITIALIZATION]

| CURRENT TIME, FUTURE TIME, TRANSMISSION POSSIBLE TIME, AND REQUIRED TRANSMISSION TIME | VALUE |
|---|---|
| CURRENT TIME | 11:59:59.014000000 ON OCTOBER 16, 2017 |
| FUTURE TIME | 12:00:00.000005000 ON OCTOBER 16, 2017 |
| TIME DIFFERENCE BETWEEN CURRENT TIME AND FUTURE TIME | 0.986005000 SECOND |
| TRANSMISSION POSSIBLE TIME OF TRANSMISSION QUEUE 7 | 0.000000000 SECOND |
| TRANSMISSION POSSIBLE TIME OF TRANSMISSION QUEUE 6 | 0.000000000 SECOND |
| TRANSMISSION POSSIBLE TIME OF TRANSMISSION QUEUE 5 | 0.000002500 SECOND |
| TRANSMISSION POSSIBLE TIME OF TRANSMISSION QUEUE 4 | 0.000000000 SECOND |
| TRANSMISSION POSSIBLE TIME OF TRANSMISSION QUEUE 3 | 0.000000000 SECOND |
| TRANSMISSION POSSIBLE TIME OF TRANSMISSION QUEUE 2 | 0.000000000 SECOND |
| TRANSMISSION POSSIBLE TIME OF TRANSMISSION QUEUE 1 | 0.000000000 SECOND |
| TRANSMISSION POSSIBLE TIME OF TRANSMISSION QUEUE 0 | 0.000000000 SECOND |
| REQUIRED TRANSMISSION TIME OF FRAME TRANSMITTED NEXT FROM TRANSMISSION QUEUE 7 | 0.000001500 SECOND (FRAME f2) |
| REQUIRED TRANSMISSION TIME OF FRAME TRANSMITTED NEXT FROM TRANSMISSION QUEUE 6 | N/A |
| REQUIRED TRANSMISSION TIME OF FRAME TRANSMITTED NEXT FROM TRANSMISSION QUEUE 5 | N/A |
| REQUIRED TRANSMISSION TIME OF FRAME TRANSMITTED NEXT FROM TRANSMISSION QUEUE 4 | N/A |
| REQUIRED TRANSMISSION TIME OF FRAME TRANSMITTED NEXT FROM TRANSMISSION QUEUE 3 | N/A |
| REQUIRED TRANSMISSION TIME OF FRAME TRANSMITTED NEXT FROM TRANSMISSION QUEUE 2 | N/A |
| REQUIRED TRANSMISSION TIME OF FRAME TRANSMITTED NEXT FROM TRANSMISSION QUEUE 1 | N/A |
| REQUIRED TRANSMISSION TIME OF FRAME TRANSMITTED NEXT FROM TRANSMISSION QUEUE 0 | N/A |

| SCHEDULED FRAME | SCHEDULED TRANSMISSION START TIME | STATE |
|---|---|---|
| FRAME f0 | 12:00:00.000000000 ON OCTOBER 16, 2017 | WAITING FOR TRANSMISSION |
| FRAME f1 | 12:00:00.000001000 ON OCTOBER 16, 2017 | WAITING FOR TRANSMISSION |
| FRAME f3 | 12:00:00.000002500 ON OCTOBER 16, 2017 | WAITING FOR TRANSMISSION |
| FRAME f4 | 12:00:00.000003500 ON OCTOBER 16, 2017 | WAITING FOR TRANSMISSION |

FIG.53

EXAMPLE IN WHICH UPDATE OF FUTURE TIME IS STOPPED [STATE AT THE TIME 0.015 SECOND AFTER INITIALIZATION]

| CURRENT TIME, FUTURE TIME, TRANSMISSION POSSIBLE TIME, AND REQUIRED TRANSMISSION TIME | VALUE |
|---|---|
| CURRENT TIME | 11:59:59.015000000 ON OCTOBER 16, 2017 |
| FUTURE TIME | 12:00:00.000005000 ON OCTOBER 16, 2017 |
| TIME DIFFERENCE BETWEEN CURRENT TIME AND FUTURE TIME | 0.985005000 SECOND |
| TRANSMISSION POSSIBLE TIME OF TRANSMISSION QUEUE 7 | 0.000000000 SECOND |
| TRANSMISSION POSSIBLE TIME OF TRANSMISSION QUEUE 6 | 0.000000000 SECOND |
| TRANSMISSION POSSIBLE TIME OF TRANSMISSION QUEUE 5 | 0.000002500 SECOND |
| TRANSMISSION POSSIBLE TIME OF TRANSMISSION QUEUE 4 | 0.000000000 SECOND |
| TRANSMISSION POSSIBLE TIME OF TRANSMISSION QUEUE 3 | 0.000000000 SECOND |
| TRANSMISSION POSSIBLE TIME OF TRANSMISSION QUEUE 2 | 0.000000000 SECOND |
| TRANSMISSION POSSIBLE TIME OF TRANSMISSION QUEUE 1 | 0.000000000 SECOND |
| TRANSMISSION POSSIBLE TIME OF TRANSMISSION QUEUE 0 | 0.000000000 SECOND |
| REQUIRED TRANSMISSION TIME OF FRAME TRANSMITTED NEXT FROM TRANSMISSION QUEUE 7 | 0.000001500 SECOND (FRAME f2) |
| REQUIRED TRANSMISSION TIME OF FRAME TRANSMITTED NEXT FROM TRANSMISSION QUEUE 6 | N/A |
| REQUIRED TRANSMISSION TIME OF FRAME TRANSMITTED NEXT FROM TRANSMISSION QUEUE 5 | N/A |
| REQUIRED TRANSMISSION TIME OF FRAME TRANSMITTED NEXT FROM TRANSMISSION QUEUE 4 | N/A |
| REQUIRED TRANSMISSION TIME OF FRAME TRANSMITTED NEXT FROM TRANSMISSION QUEUE 3 | N/A |
| REQUIRED TRANSMISSION TIME OF FRAME TRANSMITTED NEXT FROM TRANSMISSION QUEUE 2 | N/A |
| REQUIRED TRANSMISSION TIME OF FRAME TRANSMITTED NEXT FROM TRANSMISSION QUEUE 1 | N/A |
| REQUIRED TRANSMISSION TIME OF FRAME TRANSMITTED NEXT FROM TRANSMISSION QUEUE 0 | N/A |

| SCHEDULED FRAME | SCHEDULED TRANSMISSION START TIME | STATE |
|---|---|---|
| FRAME f0 | 12:00:00.000000000 ON OCTOBER 16, 2017 | WAITING FOR TRANSMISSION |
| FRAME f1 | 12:00:00.000001000 ON OCTOBER 16, 2017 | WAITING FOR TRANSMISSION |
| FRAME f3 | 12:00:00.000002500 ON OCTOBER 16, 2017 | WAITING FOR TRANSMISSION |
| FRAME f4 | 12:00:00.000003500 ON OCTOBER 16, 2017 | WAITING FOR TRANSMISSION |

FIG.55

EXAMPLE IN WHICH UPDATE OF FUTURE TIME IS STOPPED [STATE AT THE TIME 0.016 SECOND AFTER INITIALIZATION]

| CURRENT TIME, FUTURE TIME, TRANSMISSION POSSIBLE TIME, AND REQUIRED TRANSMISSION TIME | VALUE |
|---|---|
| CURRENT TIME | 11:59:59.016000000 ON OCTOBER 16, 2017 |
| FUTURE TIME | 12:00:00.000005500 ON OCTOBER 16, 2017 |
| TIME DIFFERENCE BETWEEN CURRENT TIME AND FUTURE TIME | 0.984005500 SECOND |
| TRANSMISSION POSSIBLE TIME OF TRANSMISSION QUEUE 7 | 0.000000000 SECOND |
| TRANSMISSION POSSIBLE TIME OF TRANSMISSION QUEUE 6 | 0.000000000 SECOND |
| TRANSMISSION POSSIBLE TIME OF TRANSMISSION QUEUE 5 | 0.000002500 SECOND |
| TRANSMISSION POSSIBLE TIME OF TRANSMISSION QUEUE 4 | 0.000000000 SECOND |
| TRANSMISSION POSSIBLE TIME OF TRANSMISSION QUEUE 3 | 0.000000000 SECOND |
| TRANSMISSION POSSIBLE TIME OF TRANSMISSION QUEUE 2 | 0.000000000 SECOND |
| TRANSMISSION POSSIBLE TIME OF TRANSMISSION QUEUE 1 | 0.000000000 SECOND |
| TRANSMISSION POSSIBLE TIME OF TRANSMISSION QUEUE 0 | 0.000000000 SECOND |
| REQUIRED TRANSMISSION TIME OF FRAME TRANSMITTED NEXT FROM TRANSMISSION QUEUE 7 | 0.000001500 SECOND (FRAME f2) |
| REQUIRED TRANSMISSION TIME OF FRAME TRANSMITTED NEXT FROM TRANSMISSION QUEUE 6 | N/A |
| REQUIRED TRANSMISSION TIME OF FRAME TRANSMITTED NEXT FROM TRANSMISSION QUEUE 5 | N/A |
| REQUIRED TRANSMISSION TIME OF FRAME TRANSMITTED NEXT FROM TRANSMISSION QUEUE 4 | N/A |
| REQUIRED TRANSMISSION TIME OF FRAME TRANSMITTED NEXT FROM TRANSMISSION QUEUE 3 | N/A |
| REQUIRED TRANSMISSION TIME OF FRAME TRANSMITTED NEXT FROM TRANSMISSION QUEUE 2 | N/A |
| REQUIRED TRANSMISSION TIME OF FRAME TRANSMITTED NEXT FROM TRANSMISSION QUEUE 1 | N/A |
| REQUIRED TRANSMISSION TIME OF FRAME TRANSMITTED NEXT FROM TRANSMISSION QUEUE 0 | N/A |

| SCHEDULED FRAME | SCHEDULED TRANSMISSION START TIME | STATE |
|---|---|---|
| FRAME f0 | 12:00:00.000000000 ON OCTOBER 16, 2017 | WAITING FOR TRANSMISSION |
| FRAME f1 | 12:00:00.000001000 ON OCTOBER 16, 2017 | WAITING FOR TRANSMISSION |
| FRAME f3 | 12:00:00.000002500 ON OCTOBER 16, 2017 | WAITING FOR TRANSMISSION |
| FRAME f4 | 12:00:00.000003500 ON OCTOBER 16, 2017 | WAITING FOR TRANSMISSION |

FIG.57

EXAMPLE IN WHICH UPDATE OF FUTURE TIME IS STOPPED [STATE AT THE TIME 0.017 SECOND AFTER INITIALIZATION]

| CURRENT TIME, FUTURE TIME, TRANSMISSION POSSIBLE TIME, AND REQUIRED TRANSMISSION TIME | VALUE |
|---|---|
| CURRENT TIME | 11:59:59.017000000 ON OCTOBER 16, 2017 |
| FUTURE TIME | 12:00:00.000005000 ON OCTOBER 16, 2017 |
| TIME DIFFERENCE BETWEEN CURRENT TIME AND FUTURE TIME | 0.983005000 SECOND |
| TRANSMISSION POSSIBLE TIME OF TRANSMISSION QUEUE 7 | 0.000000000 SECOND |
| TRANSMISSION POSSIBLE TIME OF TRANSMISSION QUEUE 6 | 0.000000000 SECOND |
| TRANSMISSION POSSIBLE TIME OF TRANSMISSION QUEUE 5 | 0.000002500 SECOND |
| TRANSMISSION POSSIBLE TIME OF TRANSMISSION QUEUE 4 | 0.000000000 SECOND |
| TRANSMISSION POSSIBLE TIME OF TRANSMISSION QUEUE 3 | 0.000000000 SECOND |
| TRANSMISSION POSSIBLE TIME OF TRANSMISSION QUEUE 2 | 0.000000000 SECOND |
| TRANSMISSION POSSIBLE TIME OF TRANSMISSION QUEUE 1 | 0.000000000 SECOND |
| TRANSMISSION POSSIBLE TIME OF TRANSMISSION QUEUE 0 | 0.000000000 SECOND |
| REQUIRED TRANSMISSION TIME OF FRAME TRANSMITTED NEXT FROM TRANSMISSION QUEUE 7 | 0.000001500 SECOND (FRAME f2) |
| REQUIRED TRANSMISSION TIME OF FRAME TRANSMITTED NEXT FROM TRANSMISSION QUEUE 6 | N/A |
| REQUIRED TRANSMISSION TIME OF FRAME TRANSMITTED NEXT FROM TRANSMISSION QUEUE 5 | N/A |
| REQUIRED TRANSMISSION TIME OF FRAME TRANSMITTED NEXT FROM TRANSMISSION QUEUE 4 | N/A |
| REQUIRED TRANSMISSION TIME OF FRAME TRANSMITTED NEXT FROM TRANSMISSION QUEUE 3 | N/A |
| REQUIRED TRANSMISSION TIME OF FRAME TRANSMITTED NEXT FROM TRANSMISSION QUEUE 2 | N/A |
| REQUIRED TRANSMISSION TIME OF FRAME TRANSMITTED NEXT FROM TRANSMISSION QUEUE 1 | N/A |
| REQUIRED TRANSMISSION TIME OF FRAME TRANSMITTED NEXT FROM TRANSMISSION QUEUE 0 | N/A |

| SCHEDULED FRAME | SCHEDULED TRANSMISSION START TIME | STATE |
|---|---|---|
| FRAME f0 | 12:00:00.000000000 ON OCTOBER 16, 2017 | WAITING FOR TRANSMISSION |
| FRAME f1 | 12:00:00.000001000 ON OCTOBER 16, 2017 | WAITING FOR TRANSMISSION |
| FRAME f3 | 12:00:00.000002500 ON OCTOBER 16, 2017 | WAITING FOR TRANSMISSION |
| FRAME f4 | 12:00:00.000003500 ON OCTOBER 16, 2017 | WAITING FOR TRANSMISSION |

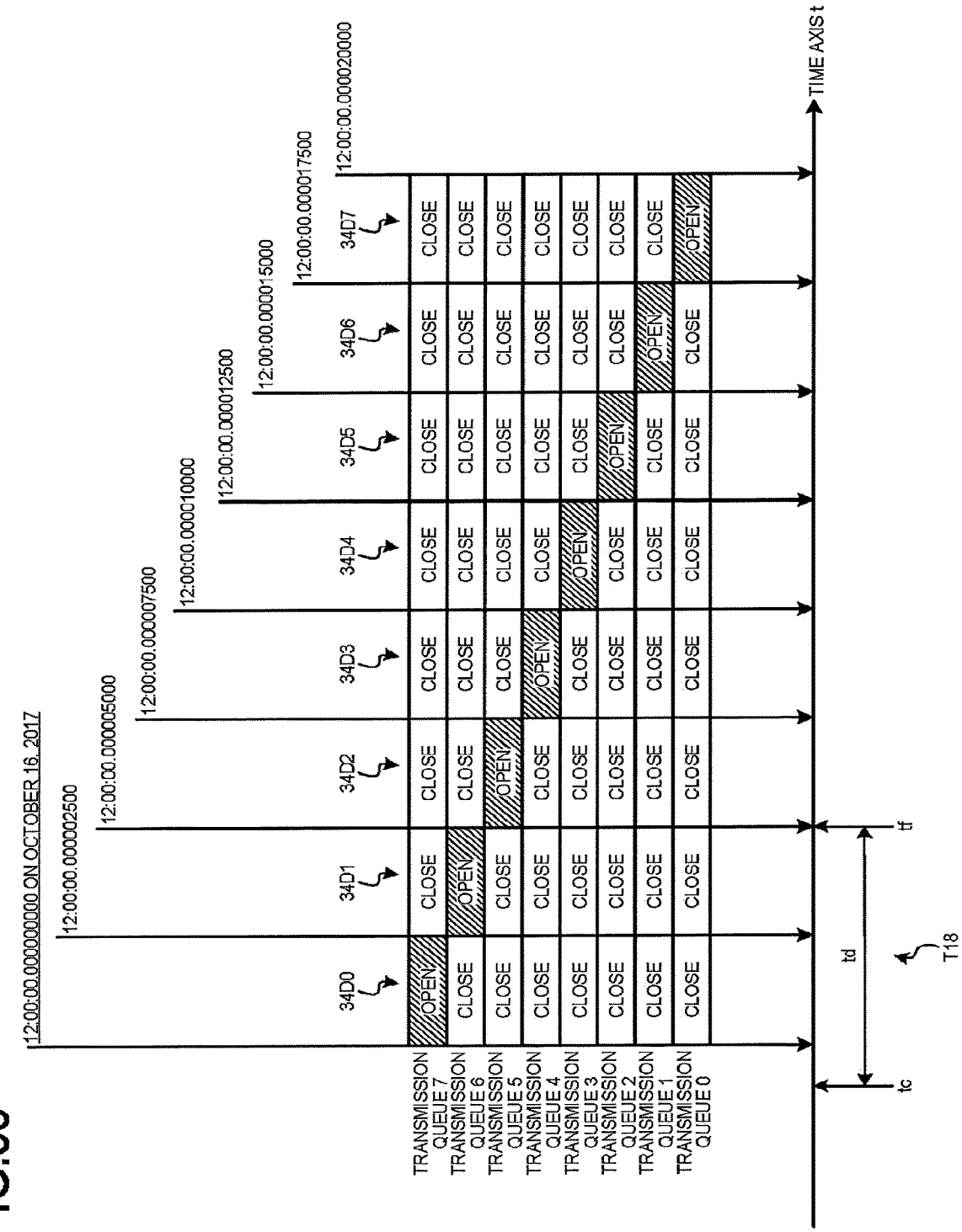

FIG.59

EXAMPLE IN WHICH THRESHOLD OF TIME DIFFERENCE IS 20 MICROSECONDS [STATE AT THE TIME 0.999985 SECOND AFTER INITIALIZATION]

| CURRENT TIME, FUTURE TIME, TRANSMISSION POSSIBLE TIME, AND REQUIRED TRANSMISSION TIME | VALUE |
|---|---|
| CURRENT TIME | 11:59:59.999985000 ON OCTOBER 16, 2017 |
| FUTURE TIME | 12:00:00.000005000 ON OCTOBER 16, 2017 |
| TIME DIFFERENCE BETWEEN CURRENT TIME AND FUTURE TIME | 0.000020000 SECOND |
| TRANSMISSION POSSIBLE TIME OF TRANSMISSION QUEUE 7 | 0.000000000 SECOND |
| TRANSMISSION POSSIBLE TIME OF TRANSMISSION QUEUE 6 | 0.000000000 SECOND |
| TRANSMISSION POSSIBLE TIME OF TRANSMISSION QUEUE 5 | 0.000002500 SECOND |
| TRANSMISSION POSSIBLE TIME OF TRANSMISSION QUEUE 4 | 0.000000000 SECOND |
| TRANSMISSION POSSIBLE TIME OF TRANSMISSION QUEUE 3 | 0.000000000 SECOND |
| TRANSMISSION POSSIBLE TIME OF TRANSMISSION QUEUE 2 | 0.000000000 SECOND |
| TRANSMISSION POSSIBLE TIME OF TRANSMISSION QUEUE 1 | 0.000000000 SECOND |
| TRANSMISSION POSSIBLE TIME OF TRANSMISSION QUEUE 0 | 0.000000000 SECOND |
| REQUIRED TRANSMISSION TIME OF FRAME TRANSMITTED NEXT FROM TRANSMISSION QUEUE 7 | 0.000001500 SECOND (FRAME f2) |
| REQUIRED TRANSMISSION TIME OF FRAME TRANSMITTED NEXT FROM TRANSMISSION QUEUE 6 | N/A |
| REQUIRED TRANSMISSION TIME OF FRAME TRANSMITTED NEXT FROM TRANSMISSION QUEUE 5 | N/A |
| REQUIRED TRANSMISSION TIME OF FRAME TRANSMITTED NEXT FROM TRANSMISSION QUEUE 4 | N/A |
| REQUIRED TRANSMISSION TIME OF FRAME TRANSMITTED NEXT FROM TRANSMISSION QUEUE 3 | N/A |
| REQUIRED TRANSMISSION TIME OF FRAME TRANSMITTED NEXT FROM TRANSMISSION QUEUE 2 | N/A |
| REQUIRED TRANSMISSION TIME OF FRAME TRANSMITTED NEXT FROM TRANSMISSION QUEUE 1 | N/A |
| REQUIRED TRANSMISSION TIME OF FRAME TRANSMITTED NEXT FROM TRANSMISSION QUEUE 0 | N/A |

| SCHEDULED FRAME | SCHEDULED TRANSMISSION START TIME | STATE |
|---|---|---|
| FRAME f0 | 12:00:00.000000000 ON OCTOBER 16, 2017 | WAITING FOR TRANSMISSION |
| FRAME f1 | 12:00:00.000001000 ON OCTOBER 16, 2017 | WAITING FOR TRANSMISSION |
| FRAME f3 | 12:00:00.000002500 ON OCTOBER 16, 2017 | WAITING FOR TRANSMISSION |
| FRAME f4 | 12:00:00.000003500 ON OCTOBER 16, 2017 | WAITING FOR TRANSMISSION |

FIG.61

EXAMPLE OF PROCESSING OF REDUCING TRANSMISSION POSSIBLE TIME OF TRANSMISSION QUEUE 5
[STATE AT THE TIME 0.999986 SECOND AFTER INITIALIZATION]

| CURRENT TIME, FUTURE TIME, TRANSMISSION POSSIBLE TIME, AND REQUIRED TRANSMISSION TIME | VALUE |
|---|---|
| CURRENT TIME | 11:59:59.999986000 ON OCTOBER 16, 2017 |
| FUTURE TIME | 12:00:00.000005000 ON OCTOBER 16, 2017 |
| TIME DIFFERENCE BETWEEN CURRENT TIME AND FUTURE TIME | 0.000019000 SECOND |
| TRANSMISSION POSSIBLE TIME OF TRANSMISSION QUEUE 7 | 0.000000000 SECOND |
| TRANSMISSION POSSIBLE TIME OF TRANSMISSION QUEUE 6 | 0.000000000 SECOND |
| TRANSMISSION POSSIBLE TIME OF TRANSMISSION QUEUE 5 | 0.000001500 SECOND |
| TRANSMISSION POSSIBLE TIME OF TRANSMISSION QUEUE 4 | 0.000000000 SECOND |
| TRANSMISSION POSSIBLE TIME OF TRANSMISSION QUEUE 3 | 0.000000000 SECOND |
| TRANSMISSION POSSIBLE TIME OF TRANSMISSION QUEUE 2 | 0.000000000 SECOND |
| TRANSMISSION POSSIBLE TIME OF TRANSMISSION QUEUE 1 | 0.000000000 SECOND |
| TRANSMISSION POSSIBLE TIME OF TRANSMISSION QUEUE 0 | 0.000000000 SECOND |
| REQUIRED TRANSMISSION TIME OF FRAME TRANSMITTED NEXT FROM TRANSMISSION QUEUE 7 | 0.000001500 SECOND (FRAME f2) |
| REQUIRED TRANSMISSION TIME OF FRAME TRANSMITTED NEXT FROM TRANSMISSION QUEUE 6 | N/A |
| REQUIRED TRANSMISSION TIME OF FRAME TRANSMITTED NEXT FROM TRANSMISSION QUEUE 5 | N/A |
| REQUIRED TRANSMISSION TIME OF FRAME TRANSMITTED NEXT FROM TRANSMISSION QUEUE 4 | N/A |
| REQUIRED TRANSMISSION TIME OF FRAME TRANSMITTED NEXT FROM TRANSMISSION QUEUE 3 | N/A |
| REQUIRED TRANSMISSION TIME OF FRAME TRANSMITTED NEXT FROM TRANSMISSION QUEUE 2 | N/A |
| REQUIRED TRANSMISSION TIME OF FRAME TRANSMITTED NEXT FROM TRANSMISSION QUEUE 1 | N/A |
| REQUIRED TRANSMISSION TIME OF FRAME TRANSMITTED NEXT FROM TRANSMISSION QUEUE 0 | N/A |

| SCHEDULED FRAME | SCHEDULED TRANSMISSION START TIME | STATE |
|---|---|---|
| FRAME f0 | 12:00:00.000000000 ON OCTOBER 16, 2017 | WAITING FOR TRANSMISSION |
| FRAME f1 | 12:00:00.000001000 ON OCTOBER 16, 2017 | WAITING FOR TRANSMISSION |
| FRAME f3 | 12:00:00.000002500 ON OCTOBER 16, 2017 | WAITING FOR TRANSMISSION |
| FRAME f4 | 12:00:00.000003500 ON OCTOBER 16, 2017 | WAITING FOR TRANSMISSION |

FIG.63

EXAMPLE OF PROCESSING OF REDUCING TRANSMISSION POSSIBLE TIME OF TRANSMISSION QUEUE 5
[STATE AT THE TIME 0.999987 SECOND AFTER INITIALIZATION]

| CURRENT TIME, FUTURE TIME, TRANSMISSION POSSIBLE TIME, AND REQUIRED TRANSMISSION TIME | VALUE |
|---|---|
| CURRENT TIME | 11:59:59.999987000 ON OCTOBER 16, 2017 |
| FUTURE TIME | 12:00:00.000005000 ON OCTOBER 16, 2017 |
| TIME DIFFERENCE BETWEEN CURRENT TIME AND FUTURE TIME | 0.000018000 SECOND |
| TRANSMISSION POSSIBLE TIME OF TRANSMISSION QUEUE 7 | 0.000000000 SECOND |
| TRANSMISSION POSSIBLE TIME OF TRANSMISSION QUEUE 6 | 0.000000000 SECOND |
| TRANSMISSION POSSIBLE TIME OF TRANSMISSION QUEUE 5 | 0.000000500 SECOND |
| TRANSMISSION POSSIBLE TIME OF TRANSMISSION QUEUE 4 | 0.000000000 SECOND |
| TRANSMISSION POSSIBLE TIME OF TRANSMISSION QUEUE 3 | 0.000000000 SECOND |
| TRANSMISSION POSSIBLE TIME OF TRANSMISSION QUEUE 2 | 0.000000000 SECOND |
| TRANSMISSION POSSIBLE TIME OF TRANSMISSION QUEUE 1 | 0.000000000 SECOND |
| TRANSMISSION POSSIBLE TIME OF TRANSMISSION QUEUE 0 | 0.000000000 SECOND |
| REQUIRED TRANSMISSION TIME OF FRAME TRANSMITTED NEXT FROM TRANSMISSION QUEUE 7 | 0.000001500 SECOND (FRAME f2) |
| REQUIRED TRANSMISSION TIME OF FRAME TRANSMITTED NEXT FROM TRANSMISSION QUEUE 6 | N/A |
| REQUIRED TRANSMISSION TIME OF FRAME TRANSMITTED NEXT FROM TRANSMISSION QUEUE 5 | N/A |
| REQUIRED TRANSMISSION TIME OF FRAME TRANSMITTED NEXT FROM TRANSMISSION QUEUE 4 | N/A |
| REQUIRED TRANSMISSION TIME OF FRAME TRANSMITTED NEXT FROM TRANSMISSION QUEUE 3 | N/A |
| REQUIRED TRANSMISSION TIME OF FRAME TRANSMITTED NEXT FROM TRANSMISSION QUEUE 2 | N/A |
| REQUIRED TRANSMISSION TIME OF FRAME TRANSMITTED NEXT FROM TRANSMISSION QUEUE 1 | N/A |
| REQUIRED TRANSMISSION TIME OF FRAME TRANSMITTED NEXT FROM TRANSMISSION QUEUE 0 | N/A |

| SCHEDULED FRAME | SCHEDULED TRANSMISSION START TIME | STATE |
|---|---|---|
| FRAME f0 | 12:00:00.000000000 ON OCTOBER 16, 2017 | WAITING FOR TRANSMISSION |
| FRAME f1 | 12:00:00.000001000 ON OCTOBER 16, 2017 | WAITING FOR TRANSMISSION |
| FRAME f3 | 12:00:00.000002500 ON OCTOBER 16, 2017 | WAITING FOR TRANSMISSION |
| FRAME f4 | 12:00:00.000003500 ON OCTOBER 16, 2017 | WAITING FOR TRANSMISSION |

FIG.65

EXAMPLE OF PROCESSING OF REDUCING TRANSMISSION POSSIBLE TIME OF TRANSMISSION QUEUE 5
[STATE AT THE TIME 0.9999875 SECOND AFTER INITIALIZATION]

| CURRENT TIME, FUTURE TIME, TRANSMISSION POSSIBLE TIME, AND REQUIRED TRANSMISSION TIME | VALUE |
|---|---|
| CURRENT TIME | 11:59:59.9999987500 ON OCTOBER 16, 2017 |
| FUTURE TIME | 12:00:00.0000005000 ON OCTOBER 16, 2017 |
| TIME DIFFERENCE BETWEEN CURRENT TIME AND FUTURE TIME | 0.0000017500 SECOND |
| TRANSMISSION POSSIBLE TIME OF TRANSMISSION QUEUE 7 | 0.000000000 SECOND |
| TRANSMISSION POSSIBLE TIME OF TRANSMISSION QUEUE 6 | 0.000000000 SECOND |
| TRANSMISSION POSSIBLE TIME OF TRANSMISSION QUEUE 5 | 0.000000000 SECOND |
| TRANSMISSION POSSIBLE TIME OF TRANSMISSION QUEUE 4 | 0.000000000 SECOND |
| TRANSMISSION POSSIBLE TIME OF TRANSMISSION QUEUE 3 | 0.000000000 SECOND |
| TRANSMISSION POSSIBLE TIME OF TRANSMISSION QUEUE 2 | 0.000000000 SECOND |
| TRANSMISSION POSSIBLE TIME OF TRANSMISSION QUEUE 1 | 0.000000000 SECOND |
| TRANSMISSION POSSIBLE TIME OF TRANSMISSION QUEUE 0 | 0.000000000 SECOND |
| REQUIRED TRANSMISSION TIME OF FRAME TRANSMITTED NEXT FROM TRANSMISSION QUEUE 7 | 0.000001500 SECOND (FRAME f2) |
| REQUIRED TRANSMISSION TIME OF FRAME TRANSMITTED NEXT FROM TRANSMISSION QUEUE 6 | N/A |
| REQUIRED TRANSMISSION TIME OF FRAME TRANSMITTED NEXT FROM TRANSMISSION QUEUE 5 | N/A |
| REQUIRED TRANSMISSION TIME OF FRAME TRANSMITTED NEXT FROM TRANSMISSION QUEUE 4 | N/A |
| REQUIRED TRANSMISSION TIME OF FRAME TRANSMITTED NEXT FROM TRANSMISSION QUEUE 3 | N/A |
| REQUIRED TRANSMISSION TIME OF FRAME TRANSMITTED NEXT FROM TRANSMISSION QUEUE 2 | N/A |
| REQUIRED TRANSMISSION TIME OF FRAME TRANSMITTED NEXT FROM TRANSMISSION QUEUE 1 | N/A |
| REQUIRED TRANSMISSION TIME OF FRAME TRANSMITTED NEXT FROM TRANSMISSION QUEUE 0 | N/A |

| SCHEDULED FRAME | SCHEDULED TRANSMISSION START TIME | STATE |
|---|---|---|
| FRAME f0 | 12:00:00.0000000000 ON OCTOBER 16, 2017 | WAITING FOR TRANSMISSION |
| FRAME f1 | 12:00:00.0000001000 ON OCTOBER 16, 2017 | WAITING FOR TRANSMISSION |
| FRAME f3 | 12:00:00.0000002500 ON OCTOBER 16, 2017 | WAITING FOR TRANSMISSION |
| FRAME f4 | 12:00:00.0000003500 ON OCTOBER 16, 2017 | WAITING FOR TRANSMISSION |

FIG.67

EXAMPLE AFTER TRANSMISSION POSSIBLE TIME OF TRANSMISSION QUEUE 5 HAS BEEN REDUCED TO ZERO
[STATE AT THE TIME 0.999988 SECOND AFTER INITIALIZATION]

| CURRENT TIME, FUTURE TIME, TRANSMISSION POSSIBLE TIME, AND REQUIRED TRANSMISSION TIME | VALUE |
|---|---|
| CURRENT TIME | 11:59:59.999988000 ON OCTOBER 16, 2017 |
| FUTURE TIME | 12:00:00.000005000 ON OCTOBER 16, 2017 |
| TIME DIFFERENCE BETWEEN CURRENT TIME AND FUTURE TIME | 0.000017000 SECOND |
| TRANSMISSION POSSIBLE TIME OF TRANSMISSION QUEUE 7 | 0.000000000 SECOND |
| TRANSMISSION POSSIBLE TIME OF TRANSMISSION QUEUE 6 | 0.000000000 SECOND |
| TRANSMISSION POSSIBLE TIME OF TRANSMISSION QUEUE 5 | 0.000000000 SECOND |
| TRANSMISSION POSSIBLE TIME OF TRANSMISSION QUEUE 4 | 0.000000000 SECOND |
| TRANSMISSION POSSIBLE TIME OF TRANSMISSION QUEUE 3 | 0.000000000 SECOND |
| TRANSMISSION POSSIBLE TIME OF TRANSMISSION QUEUE 2 | 0.000000000 SECOND |
| TRANSMISSION POSSIBLE TIME OF TRANSMISSION QUEUE 1 | 0.000000000 SECOND |
| TRANSMISSION POSSIBLE TIME OF TRANSMISSION QUEUE 0 | 0.000000000 SECOND |
| REQUIRED TRANSMISSION TIME OF FRAME TRANSMITTED NEXT FROM TRANSMISSION QUEUE 7 | 0.000001500 SECOND (FRAME f2) |
| REQUIRED TRANSMISSION TIME OF FRAME TRANSMITTED NEXT FROM TRANSMISSION QUEUE 6 | N/A |
| REQUIRED TRANSMISSION TIME OF FRAME TRANSMITTED NEXT FROM TRANSMISSION QUEUE 5 | N/A |
| REQUIRED TRANSMISSION TIME OF FRAME TRANSMITTED NEXT FROM TRANSMISSION QUEUE 4 | N/A |
| REQUIRED TRANSMISSION TIME OF FRAME TRANSMITTED NEXT FROM TRANSMISSION QUEUE 3 | N/A |
| REQUIRED TRANSMISSION TIME OF FRAME TRANSMITTED NEXT FROM TRANSMISSION QUEUE 2 | N/A |
| REQUIRED TRANSMISSION TIME OF FRAME TRANSMITTED NEXT FROM TRANSMISSION QUEUE 1 | N/A |
| REQUIRED TRANSMISSION TIME OF FRAME TRANSMITTED NEXT FROM TRANSMISSION QUEUE 0 | N/A |

| SCHEDULED FRAME | SCHEDULED TRANSMISSION START TIME | STATE |
|---|---|---|
| FRAME f0 | 12:00:00.000000000 ON OCTOBER 16, 2017 | WAITING FOR TRANSMISSION |
| FRAME f1 | 12:00:00.000001000 ON OCTOBER 16, 2017 | WAITING FOR TRANSMISSION |
| FRAME f3 | 12:00:00.000002500 ON OCTOBER 16, 2017 | WAITING FOR TRANSMISSION |
| FRAME f4 | 12:00:00.000003500 ON OCTOBER 16, 2017 | WAITING FOR TRANSMISSION |

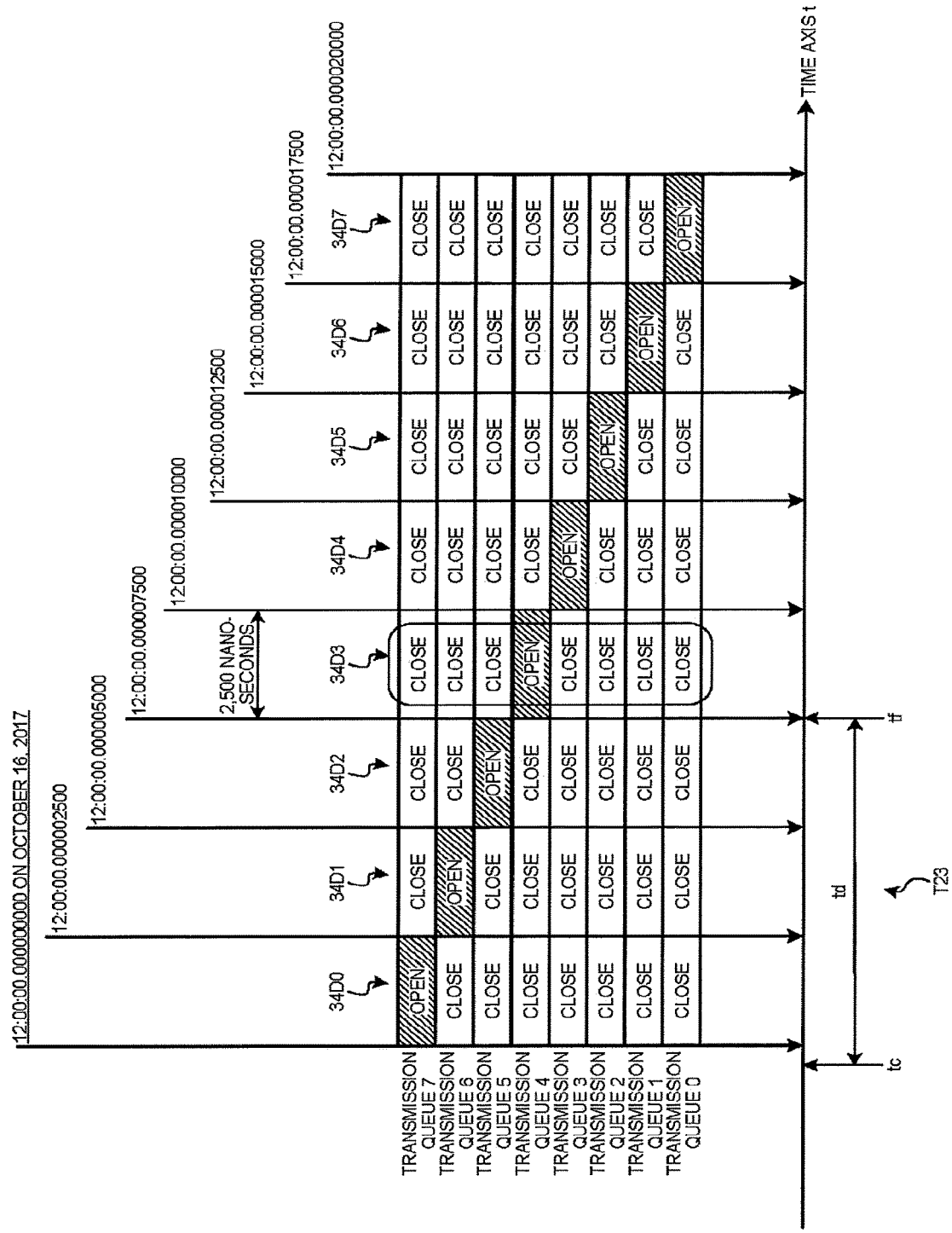

FIG.69

EXAMPLE AFTER ENTRY OF LIST INDEX 3 HAS BEEN PREFETCHED [STATE AT THE TIME 0.9999885 SECOND AFTER INITIALIZATION]

| CURRENT TIME, FUTURE TIME, TRANSMISSION POSSIBLE TIME, AND REQUIRED TRANSMISSION TIME | VALUE |
|---|---|
| CURRENT TIME | 11:59:59.9999988500 ON OCTOBER 16, 2017 |
| FUTURE TIME | 12:00:00.0000007500 ON OCTOBER 16, 2017 |
| TIME DIFFERENCE BETWEEN CURRENT TIME AND FUTURE TIME | 0.000019000 SECOND |
| TRANSMISSION POSSIBLE TIME OF TRANSMISSION QUEUE 7 | 0.000000000 SECOND |
| TRANSMISSION POSSIBLE TIME OF TRANSMISSION QUEUE 6 | 0.000000000 SECOND |
| TRANSMISSION POSSIBLE TIME OF TRANSMISSION QUEUE 5 | 0.000000000 SECOND |
| TRANSMISSION POSSIBLE TIME OF TRANSMISSION QUEUE 4 | 0.000002500 SECOND |
| TRANSMISSION POSSIBLE TIME OF TRANSMISSION QUEUE 3 | 0.000000000 SECOND |
| TRANSMISSION POSSIBLE TIME OF TRANSMISSION QUEUE 2 | 0.000000000 SECOND |
| TRANSMISSION POSSIBLE TIME OF TRANSMISSION QUEUE 1 | 0.000000000 SECOND |
| TRANSMISSION POSSIBLE TIME OF TRANSMISSION QUEUE 0 | 0.000000000 SECOND |
| REQUIRED TRANSMISSION TIME OF FRAME TRANSMITTED NEXT FROM TRANSMISSION QUEUE 7 | 0.000001500 SECOND (FRAME f2) |
| REQUIRED TRANSMISSION TIME OF FRAME TRANSMITTED NEXT FROM TRANSMISSION QUEUE 6 | N/A |
| REQUIRED TRANSMISSION TIME OF FRAME TRANSMITTED NEXT FROM TRANSMISSION QUEUE 5 | N/A |
| REQUIRED TRANSMISSION TIME OF FRAME TRANSMITTED NEXT FROM TRANSMISSION QUEUE 4 | N/A |
| REQUIRED TRANSMISSION TIME OF FRAME TRANSMITTED NEXT FROM TRANSMISSION QUEUE 3 | N/A |
| REQUIRED TRANSMISSION TIME OF FRAME TRANSMITTED NEXT FROM TRANSMISSION QUEUE 2 | N/A |
| REQUIRED TRANSMISSION TIME OF FRAME TRANSMITTED NEXT FROM TRANSMISSION QUEUE 1 | N/A |
| REQUIRED TRANSMISSION TIME OF FRAME TRANSMITTED NEXT FROM TRANSMISSION QUEUE 0 | N/A |

| SCHEDULED FRAME | SCHEDULED TRANSMISSION START TIME | STATE |
|---|---|---|
| FRAME f0 | 12:00:00.000000000 ON OCTOBER 16, 2017 | WAITING FOR TRANSMISSION |
| FRAME f1 | 12:00:00.000001000 ON OCTOBER 16, 2017 | WAITING FOR TRANSMISSION |
| FRAME f3 | 12:00:00.000002500 ON OCTOBER 16, 2017 | WAITING FOR TRANSMISSION |
| FRAME f4 | 12:00:00.000003500 ON OCTOBER 16, 2017 | WAITING FOR TRANSMISSION |

FIG.71

EXAMPLE OF CASE WHERE FRAME f5 WITH REQUIRED TRANSMISSION TIME OF 1,000 NANOSECONDS IS WRITTEN TO TRANSMISSION QUEUE 4
[STATE AT THE TIME 0.999989 SECOND AFTER INITIALIZATION]

| CURRENT TIME, FUTURE TIME, TRANSMISSION POSSIBLE TIME AND REQUIRED TRANSMISSION TIME | VALUE |
|---|---|
| CURRENT TIME | 11:59:59.999989000 ON OCTOBER 16, 2017 |
| FUTURE TIME | 12:00:00.000007500 ON OCTOBER 16, 2017 |
| TIME DIFFERENCE BETWEEN CURRENT TIME AND FUTURE TIME | 0.000018500 SECOND |
| TRANSMISSION POSSIBLE TIME OF TRANSMISSION QUEUE 7 | 0.000000000 SECOND |
| TRANSMISSION POSSIBLE TIME OF TRANSMISSION QUEUE 6 | 0.000000000 SECOND |
| TRANSMISSION POSSIBLE TIME OF TRANSMISSION QUEUE 5 | 0.000000000 SECOND |
| TRANSMISSION POSSIBLE TIME OF TRANSMISSION QUEUE 4 | 0.000003200 SECOND |
| TRANSMISSION POSSIBLE TIME OF TRANSMISSION QUEUE 3 | 0.000000000 SECOND |
| TRANSMISSION POSSIBLE TIME OF TRANSMISSION QUEUE 2 | 0.000000000 SECOND |
| TRANSMISSION POSSIBLE TIME OF TRANSMISSION QUEUE 1 | 0.000000000 SECOND |
| TRANSMISSION POSSIBLE TIME OF TRANSMISSION QUEUE 0 | 0.000000000 SECOND |
| REQUIRED TRANSMISSION TIME OF FRAME TRANSMITTED NEXT FROM TRANSMISSION QUEUE 7 | 0.000001500 SECOND (FRAME f2) |
| REQUIRED TRANSMISSION TIME OF FRAME TRANSMITTED NEXT FROM TRANSMISSION QUEUE 6 | N/A |
| REQUIRED TRANSMISSION TIME OF FRAME TRANSMITTED NEXT FROM TRANSMISSION QUEUE 5 | N/A |
| REQUIRED TRANSMISSION TIME OF FRAME TRANSMITTED NEXT FROM TRANSMISSION QUEUE 4 | 0.000001000 SECOND (FRAME f5) |
| REQUIRED TRANSMISSION TIME OF FRAME TRANSMITTED NEXT FROM TRANSMISSION QUEUE 3 | N/A |
| REQUIRED TRANSMISSION TIME OF FRAME TRANSMITTED NEXT FROM TRANSMISSION QUEUE 2 | N/A |
| REQUIRED TRANSMISSION TIME OF FRAME TRANSMITTED NEXT FROM TRANSMISSION QUEUE 1 | N/A |
| REQUIRED TRANSMISSION TIME OF FRAME TRANSMITTED NEXT FROM TRANSMISSION QUEUE 0 | N/A |

| SCHEDULED FRAME | SCHEDULED TRANSMISSION START TIME | STATE |
|---|---|---|
| FRAME f0 | 12:00:00.000000000 ON OCTOBER 16, 2017 | WAITING FOR TRANSMISSION |
| FRAME f1 | 12:00:00.000001000 ON OCTOBER 16, 2017 | WAITING FOR TRANSMISSION |
| FRAME f3 | 12:00:00.000002500 ON OCTOBER 16, 2017 | WAITING FOR TRANSMISSION |
| FRAME f4 | 12:00:00.000003500 ON OCTOBER 16, 2017 | WAITING FOR TRANSMISSION |

FIG.73

EXAMPLE AFTER FRAME f5 HAS BEEN SCHEDULED [STATE AT THE TIME 0.9999895 SECOND AFTER INITIALIZATION]

| CURRENT TIME, FUTURE TIME, TRANSMISSION POSSIBLE TIME, AND REQUIRED TRANSMISSION TIME | VALUE |
|---|---|
| CURRENT TIME | 11:59:59.9999989500 ON OCTOBER 16, 2017 |
| FUTURE TIME | 12:00:00.0000008500 ON OCTOBER 16, 2017 |
| TIME DIFFERENCE BETWEEN CURRENT TIME AND FUTURE TIME | 0.000019000 SECOND |
| TRANSMISSION POSSIBLE TIME OF TRANSMISSION QUEUE 7 | 0.000000000 SECOND |
| TRANSMISSION POSSIBLE TIME OF TRANSMISSION QUEUE 6 | 0.000000000 SECOND |
| TRANSMISSION POSSIBLE TIME OF TRANSMISSION QUEUE 5 | 0.000000000 SECOND |
| TRANSMISSION POSSIBLE TIME OF TRANSMISSION QUEUE 4 | 0.000001000 SECOND |
| TRANSMISSION POSSIBLE TIME OF TRANSMISSION QUEUE 3 | 0.000000000 SECOND |
| TRANSMISSION POSSIBLE TIME OF TRANSMISSION QUEUE 2 | 0.000000000 SECOND |
| TRANSMISSION POSSIBLE TIME OF TRANSMISSION QUEUE 1 | 0.000000000 SECOND |
| TRANSMISSION POSSIBLE TIME OF TRANSMISSION QUEUE 0 | 0.000000000 SECOND |
| REQUIRED TRANSMISSION TIME OF FRAME TRANSMITTED NEXT FROM TRANSMISSION QUEUE 7 | 0.000001500 SECOND (FRAME f2) |
| REQUIRED TRANSMISSION TIME OF FRAME TRANSMITTED NEXT FROM TRANSMISSION QUEUE 6 | N/A |
| REQUIRED TRANSMISSION TIME OF FRAME TRANSMITTED NEXT FROM TRANSMISSION QUEUE 5 | N/A |
| REQUIRED TRANSMISSION TIME OF FRAME TRANSMITTED NEXT FROM TRANSMISSION QUEUE 4 | N/A |
| REQUIRED TRANSMISSION TIME OF FRAME TRANSMITTED NEXT FROM TRANSMISSION QUEUE 3 | N/A |
| REQUIRED TRANSMISSION TIME OF FRAME TRANSMITTED NEXT FROM TRANSMISSION QUEUE 2 | N/A |
| REQUIRED TRANSMISSION TIME OF FRAME TRANSMITTED NEXT FROM TRANSMISSION QUEUE 1 | N/A |
| REQUIRED TRANSMISSION TIME OF FRAME TRANSMITTED NEXT FROM TRANSMISSION QUEUE 0 | N/A |

| SCHEDULED FRAME | SCHEDULED TRANSMISSION START TIME | STATE |
|---|---|---|
| FRAME f0 | 12:00:00.0000000000 ON OCTOBER 16, 2017 | WAITING FOR TRANSMISSION |
| FRAME f1 | 12:00:00.0000001000 ON OCTOBER 16, 2017 | WAITING FOR TRANSMISSION |
| FRAME f3 | 12:00:00.0000002500 ON OCTOBER 16, 2017 | WAITING FOR TRANSMISSION |
| FRAME f4 | 12:00:00.0000003500 ON OCTOBER 16, 2017 | WAITING FOR TRANSMISSION |
| FRAME f5 | 12:00:00.0000007500 ON OCTOBER 16, 2017 | WAITING FOR TRANSMISSION |

INFORMATION PROCESSING APPARATUS, INFORMATION PROCESSING METHOD, AND COMPUTER PROGRAM PRODUCT

CROSS-REFERENCE TO RELATED APPLICATIONS

This application is based upon and claims the benefit of priority from Japanese Patent Application No. 2017-221998, filed on Nov. 17, 2017; the entire contents of which are incorporated herein by reference.

FIELD

Embodiments described herein relate generally to an information processing apparatus, an information processing method, and a computer program product.

BACKGROUND

In the fields of industrial networks connecting industrial apparatuses in a factory, in-vehicle networks connecting a controller in the vehicle, and the like, high real-time performance is required. In recent years, Ethernet (registered trademark) has been used increasingly in industrial networks, in-vehicle networks, and the like, and various real-time Ethernet standards have been proposed. For example, a technique has been disclosed. In the technique, transmission control is performed on the basis of the priority, the guaranteed bandwidth, the transmission cycle or the transmission interval of the frame, and the like.

However, conventional art has difficulty in performing scheduling to perform strict transmission timing control in the unit of frames within the range of the transmission possible time dynamically changing on the basis of transmission scheduling information assigned in advance to the transmission queue. Specifically, conventional art has difficulty in performing scheduling to perform transmission timing control with high accuracy.

BRIEF DESCRIPTION OF THE DRAWINGS

FIG. 2 is a schematic diagram illustrating a data configuration of transmission scheduling information;

FIG. 23 is a diagram illustrating the state immediately after initialization;

FIG. 25 is a diagram illustrating a state at the time 0.001 second after initialization;

FIG. 26 is a diagram illustrating a state at the time 0.002 second after initialization;

FIG. 27 is a diagram illustrating a state at the time 0.002 second after initialization;

FIG. 29 is a diagram illustrating a state at the time 0.003 second after initialization;

FIG. 30 is a diagram illustrating a state at the time 0.004 second after initialization;

FIG. 31 is a diagram illustrating a state at the time 0.004 second after initialization;

FIG. 33 is a diagram illustrating a state at the time 0.005 second after initialization;

FIG. 34 is a diagram illustrating a state at the time 0.006 second after initialization;

FIG. 35 is a diagram illustrating a state at the time 0.006 second after initialization;

FIG. 36 is a diagram illustrating a state at the time 0.007 second after initialization;

FIG. 37 is a diagram illustrating a state at the time 0.007 second after initialization;

FIG. 38 is a diagram illustrating a state at the time 0.008 second after initialization;

FIG. 39 is a diagram illustrating a state at the time 0.008 second after initialization;

FIG. 41 is a diagram illustrating a state at the time 0.009 second after initialization;

FIG. 42 is a diagram illustrating a state at the time 0.010 second after initialization;

FIG. 43 is a diagram illustrating a state at the time 0.010 second after initialization;

FIG. 44 is a diagram illustrating a state at the time 0.011 second after initialization;

FIG. 45 is a diagram illustrating a state at the time 0.011 second after initialization;

FIG. 47 is a diagram illustrating a state at the time 0.012 second after initialization;

FIG. 49 is a diagram illustrating a state at the time 0.013 second after initialization;

FIG. 51 is a diagram illustrating a state at the time 0.014 second after initialization;

FIG. 53 is a diagram illustrating a state at the time 0.015 second after initialization;

FIG. 55 is a diagram illustrating a state at the time 0.016 second after initialization;

FIG. 57 is a diagram illustrating a state at the time 0.017 second after initialization;

FIG. 58 is a diagram illustrating a state at the time 0.99998.5 second after initialization;

FIG. 59 is a diagram illustrating a state at the time 0.999985 second after initialization;

FIG. 61 is a diagram illustrating a state at the time 0.999986 second after initialization;

FIG. 63 is a diagram illustrating a state at the time 0.999987 second after initialization;

FIG. 65 is a diagram illustrating a state at the time 0.9999875 second after initialization;

FIG. 67 is a diagram illustrating a state at the time 0.999988 second after initialization;

FIG. 68 is a diagram illustrating a state at the time 0.9999885 second after initialization;

FIG. 69 is a diagram illustrating a state at the time 0.9999885 second after initialization;

FIG. 71 is a diagram illustrating a state at the time 0.999989 second after initialization;

FIG. 73 is a diagram illustrating a state at the time 0.9999895 second after initialization.

DETAILED DESCRIPTION

Figure 1:
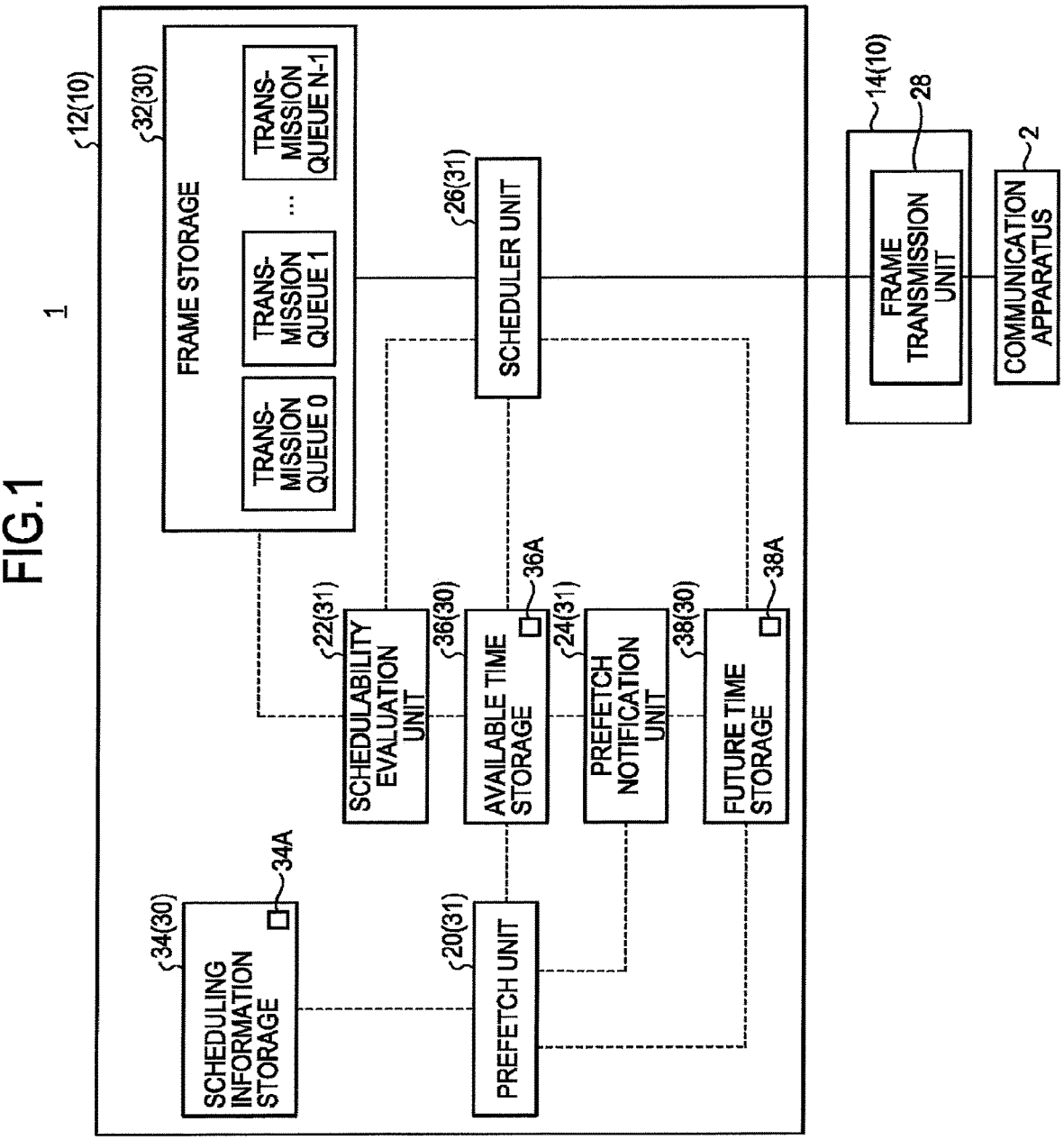
FIG. 1 is a diagram illustrating a functional configuration of an information processing system.

According to an embodiment, an information processing apparatus includes a prefetch unit and a scheduler unit. The prefetch unit is configured to prefetch a scheduling entry corresponding a future time period in advance from scheduling information including one or more entries each of which at least contains a transmission state and interval for each of one or more transmission queues. The scheduler unit configured to determine a starting time of transmission for each frame waiting for transmission in each queue, on the basis of the prefetched entry.

The following is a detailed explanation of an information processing apparatus, an information processing method, and a computer program product, with reference to the attached drawings. The information processing apparatus according to the present embodiment is suitably applied to, in particular, fields requiring high real-time performance.

First, the following is an explanation of an example of the standard used in fields requiring high real-time performance. The term "high real-time performance" means, for example, low delay performance and high time synchronization accuracy. Examples of the fields requiring high real-time performance include industrial networks and in-vehicle networks.

For example, as a standard achieving real-time performance on Ethernet (registered trademark), standardization of Time-Sensitive Networking (TSN being made progress with IEEE 802.1 TSN Task. TSN is formed of a plurality of standards. TSN is a standard obtained by expanding Audio/Video bridging (AVB) achieving low delay performance used in pro-audios. TSN is a standard aimed at achieving high reliability, in addition to real-time performance higher than AVB, to enable application to industrial networks and in-vehicle networks.

IEEE 802.1Qbv serving as a TSN standard is a communication standard to control the transmission queues of an end node or a relay node (switch), on the basis of a predetermined schedule. Specifically, IEEE 802.1Qbv controls the timing of frame transmission from each of transmission queues, by separately and properly switching each of transmission queues assigned to the respective traffic classes to a valid (open) or invalid (close) state.

The IEEE 802.1Qbv standard provides controlling each of the states of transmission queues using transmission scheduling information referred to as a gate control list. The gate control list is formed of gate control entries including gate states and time intervals. The gate state includes a transmission possible/impossible state of each of the transmission queues. The transmission possible/impossible state is indicated with "valid" (open) indicating that transmission is possible, or "invalid" (close) indicating that transmission is impossible. The time interval indicates the time for which the corresponding gate state is maintained. The gate control list is set in advance, in accordance with the application of the upper layer and/or the communication requirements of the whole network.

A plurality of transmission queues and open/close processing of the gates corresponding to the respective transmission queues are controlled, at the timing set in the gate control list. In this manner, the transmission timing from each of the transmission queues is controlled, at the timing scheduled on the basis of the gate control list. For example, this structure enables control of the transmission possible/impossible state of each of the transmission queues changing with lapse of time, on the basis of the predetermined schedule, at each of nodes on the network. This structure enable reduction in network delay and/or jitter in data transmission requiring high real-time performance, by strictly controlling timing to permit frame transmission from each of the transmission queues.

Accurate control of the time intervals with the order of several nanoseconds to several microseconds is required, to cause a transmission control method provided with the IEEE 802.1Qbv standard to function effectively. However, conventional art has difficulty in achieving such accuracy required, and performing scheduling for transmission timing control with high accuracy.

Accordingly, the information processing apparatus according to the present embodiment adopts the following configuration, to achieve scheduling for transmission timing control with high accuracy.

The information processing apparatus according to the present embodiment performs transmission timing control of frames transmitted from the transmission queues, on the basis of transmission schedule information. The present embodiment illustrates the case of using IEEE 802.1Qbv as the standard used for transmission control, as an example. However, the standard used with the information processing apparatus of the present embodiment for transmission control is not limited to IEEE 802.1Qbv.

Example of Functional Configuration

The following is a specific explanation of the information processing apparatus 10 according to the present embodiment.

FIG. 1 is a diagram illustrating an example of a functional configuration of an information processing system 1 according to the present embodiment. The information processing system 1 includes the information processing apparatus 10, and a communication apparatus 2. The information processing apparatus 10 outputs frames to the communication apparatus 2 through a network or the like.

In the present embodiment, the information processing apparatus 10 includes a host 12 and a transmission device 14. The host 12 and the transmission device 14 are connected with each other through, for example, a PCI Express and a bus.

The communication apparatus 2 is an apparatus connected with the transmission device 14. The communication apparatus 2 is, for example, a communication apparatus. The connection method of the transmission device 14 and the communication apparatus 2 may be a wireless method, or a wired method. The number of the communication apparatus 2 connected with the transmission device 14 is not limited to one, but may be two or more.

The information processing apparatus 10 may be formed of only the host 12. Specifically, the information processing apparatus 10 may have a structure in which no transmission device 14 is included. As another example, the information processing apparatus 10 may be formed of only the transmission device 14. In such a case, it suffices that the transmission device 14 is equipped with functional units of the host 12 described later. The present embodiment illustrates the case where the information processing apparatus 10 includes the host 12 and the transmission device 14, as an example.

The host 12 includes a processor 31 and a storage unit 30. The processor 31 and the storage unit 30 are connected with each other to mutually transmit and receive data and/or signals.

The processor 31 controls the whole host 12. Specifically, the processor 31 schedules the scheduled transmission start time for the frame (details thereof will be described later).

The processor 31 may have any specific form. The processor 31 is, for example, software, a personal computer, a server device, a dedicated large-scale integration (LSI), or a field programmable gate array (FPGA). When the processor 31 is achieved with software, the processor 31 is achieved by causing, for example, a central processing unit (CPU), or a micro-processing unit (MPU) to execute the software.

The specific application serving as a target of control with the processor 31 may be any application. Examples of the specific application include an in-vehicle system and a factory automation system. In an in-vehicle system, for example, the processor 31 controls communications requiring real-time performance, such as communications relating to various controls of automated driving. In a factory automation system, the processor 31 controls communications requiring real-time performance, such as communications of control signals of various control devices, such as a programmable logic controller (PLC) and I/O devices.

The storage unit 30 stores various types of data therein. The storage unit 30 may have any specific form. The storage unit 30 is a storage device, such as a static random access memory (SRAM), a synchronous dynamic random access memory (SDRAM), a solid state drive (SSD), a hard disk drive (HDD), and a SD card.

In the present embodiment, the storage unit 30 includes a frame storage 32, a scheduling information storage 34, an available time storage 36, and a future time storage 38.

The frame storage 32, the scheduling information storage 34, the available time storage 36, and the future time storage 38 may be formed of a plurality of physically different storage devices. As another example, the frame storage 32, the scheduling information storage 34, the available time storage 36, and the future time storage 38 may be achieved by logically dividing an area of the same storage device.

As another example, at least part of the storage unit 30 and the processor 31 may be formed as physically divided separate units. For example, the storage unit 30 may be stored in a server device connected to the network. For example, at least part of information stored in the storage unit 30 may be stored in the server device.

The frame storage 32 includes one or more transmission queues. The present embodiment illustrates the case where the frame storage 32 includes N (N is an integer of 2 or more) transmission queues (transmission queue 0 to transmission queue N−1), as an example. Each of the transmission queues stores frames therein. The frames are, for example, traffic data requiring real-time performance. The frames are transmitted to the communication apparatus by processing described later.

The frame storage 32 stores frames in one of transmission queue 0 to transmission queue N−1, on the basis of the traffic class to which the frame belongs. For example, an application of the upper layer writes a new frame to the transmission queue at any desired timing.

The scheduling information storage 34 stores transmission scheduling information 34A therein. The transmission scheduling information 34A includes information required to strictly control the timing to permit frame transmission from the transmission queue.

The transmission scheduling information 34A indicates the timing to permit frame transmission from the transmission queue, and whether frame transmission actually occurs is determined on the basis of whether the frame has been written to the transmission queue. Specifically, whether transmission of the frame actually occurs is determined on the basis of operation, and the like, of the application located in the upper layer.

Specifically, the transmission scheduling information 34A includes one or more entries. The present embodiment illustrates the case where the transmission scheduling information 34A includes a plurality of entries, as an example.

An entry at least contains a transmission state and interval for each of one or more transmission queues. In other words, an entry provides the transmission possible/impossible state of each of one or more transmission queues, and the maintaining timing of the transmission possible/impossible state. For example, an entry corresponds to a gate control entry provided in the IEEE 802.1Qbv standard.

The transmission possible/impossible state is indicated with "valid" (open) indicating that transmission is possible, or "invalid" (close) indicating that transmission is impossible. For example, the transmission possible/impossible state corresponds to a gate state provided in the IEEE 802.1Qbv standard.

The maintaining timing of the transmission possible/impossible state indicates the timing to maintain the corresponding transmission possible/impossible state. Specifically, the future time period is specified with a starting time and an end time of a period for which the corresponding transmission state is valid, or a starting time and a specific amount of time for which the corresponding transmission state is valid. In other words, the maintaining timing is specified with the start time and the end time of the period for which the corresponding transmission possible/impossible state is maintained, or the period for which the corresponding transmission possible/impossible state is maintained and the start time of the period. The period for which the corresponding transmission possible/impossible state is maintained corresponds to the time interval provided in the IEEE 802.1Qbv standard. The start time of the period corresponds to the gate control start time provided in the IEEE 802.1Qbv standard.

The present embodiment illustrates the case where the transmission scheduling information 34A includes information provided in the IEEE 802.1Qbv standard, as an example. Specifically, the present embodiment illustrates the case where the transmission scheduling information 34A includes a gate control list and other parameters, such as the gate control start time, as an example. In the following explanation, the transmission possible/impossible state may also be referred to as a gate state, and the period for which the transmission possible/impossible state is maintained may also be referred to as a time interval.

FIG. 2 is a schematic diagram illustrating an example of a data configuration of the transmission scheduling information 34A.

In the present embodiment, the transmission scheduling information 34A includes a gate control list 34B and other parameters 34C.

The gate control list 34B includes a plurality of entries 34D. Each of the entries 34D includes a list index, a gate state, and a time interval. The list index is information indicating the index of the entry 34D. FIG. 2 illustrates the case where eight entries 34D (entry 34D0 to entry 34D7) are registered in the gate control list 34B, as an example.

Each of the entries 34D includes a list index, a gate state, and a time interval. As described above, the gate state indicating the transmission possible/impossible state indicates the transmission possible/impossible state for each of the transmission queues assigned to the respective traffic classes. In FIG. 2, the mark "o" expressed in the gate state indicates "valid" (open) indicating that transmission is possible, and the mark "C" indicates "invalid" (close) indicating that transmission is impossible.

Specifically, for example, the gate state "CCCCCCCo" of the entry 34D7 with the list index "7" in FIG. 2 indicates the transmission possible/impossible state (open or close) of each of the transmission queues in the frame storage 32. As described above, the present embodiment illustrates the case where the frame storage 32 includes eight transmission queues (transmission queue 0 to transmission queue 7). Accordingly, the gate state "CCCCCCCo" of the entry 3407 with the list index "7" indicates that transmission queue 1 to transmission queue 7 are invalid (close), and transmission queue 0 is valid (open). The corresponding interval "2,500 nanoseconds" indicates that the period for which the transmission queue 0 is made valid is 2,500 nanoseconds.

The other parameters 34C include, for example, the gate control start time, the gate control cycle time, and the number of entries in the gate control list 340. The gate control cycle time indicates the time for one cycle indicated in the gate control list 340. For example, the total value of the time intervals in the gate control list 340 may be set as the gate control cycle time.

The explanation will be continued, with reference to FIG. 1 again. The future time storage 38 stores future time information 38A therein. The available time storage 36 stores transmission possible time information 36A therein.

Figure 3:
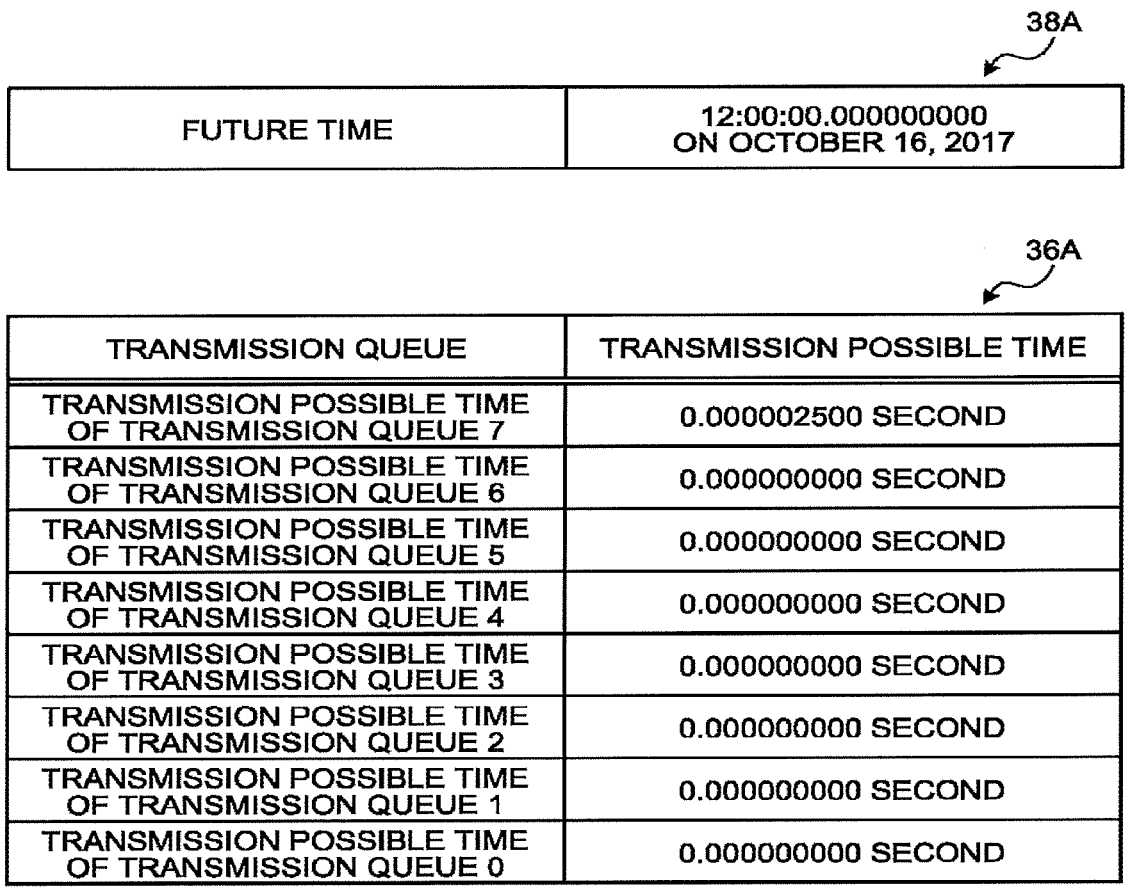
FIG. 3 is a schematic diagram illustrating future time information and transmission possible time information.

FIG. 3 is a diagram illustrating an example of the future time information 38A and the transmission possible time information 36A.

The future time information 38A is information indicating the future time.

The future time is time serving as a candidate for the next scheduled transmission start time, and future (coming) time of the current time. The scheduled transmission start time is scheduled time at which frame transmission is started, and scheduled by processing performed with the processor 31 described later (details of the processing will be described later). The next scheduled transmission start time is time serving as a candidate for the scheduled transmission start time for the frame to be scheduled next with the scheduler unit 26 described later.

A local clock of the information processing apparatus 10 may be used as the current time. The current time may be the time synchronized between the information processing apparatus 10 and the other apparatuses, or the time synchronized in the network.

The future time is used when the scheduled transmission start time for the next frame is scheduled (details thereof will be described later).

The future time information 38A indicates one future time. Specifically, the term "future time" in the present embodiment indicates one future time stored in the future time storage 38. The future time is updated by processing performed with the processor 31 described later (details of the processing will be described later).

The transmission possible time information 36A is information indicating the transmission possible time for each of the transmission queues. In more detail, the transmission possible time indicates the remaining time for which the frame can be transmitted from the corresponding transmission queue. The transmission possible time is assigned to each of the transmission queues, and the value thereof changes together with change of the current time and the future time. Specifically, the transmission possible time of each of the transmission queues is updated by the processing performed with the processor 31 described later (details of the processing will be described later).

The explanation will be continued, with reference to FIG. 1 again. The following is an explanation of the processor 31. The processor 31 includes a prefetch unit 20, a schedulability evaluation unit 22, a prefetch notification unit 24, and a scheduler unit 26.

The prefetch unit 20 is configured to prefetch a scheduling entry corresponding a future time period in advance from scheduling information including one or more entries. In other words, the prefetch unit 20 prefetches the entry 34D corresponding to the future maintaining timing coming after the current time, in the transmission scheduling information 34A. In other words, the prefetch unit 20 prefetches the entry 34D serving as a target of transmission control in the future timing coming after the current time. The term "prefetching" means reading the entry 34D serving as a target of transmission control at the future time coming after the current time, in advance before the future time.

In the present embodiment, the prefetch unit 20 is configured to prefetch the next entry 34D, when the prefetch unit 20 receives a notification from the prefetch notification unit 24. IN other words, the prefetch unit 20 prefetches the next entry 34D from the scheduling information storage 34, when the prefetch unit 20 receives a prefetching instruction from the prefetch notification unit 24.

The prefetch unit 20 is configured to update a future time, which is a prospective time to schedule future transmission, and an available time for transmission for each queue at the future time, on the basis of the prefetched entry. In other words, on the basis of the prefetched next entry 34D, the prefetch unit 20 updates the future time serving as a candidate for the scheduled transmission start time of the frame to be scheduled next with the scheduler unit 26 described later, and the transmission possible time assigned to the transmission queue at the future time.

For example, the prefetch unit 20 assigns the value of the time interval included in the prefetched entry 34D, as the transmission possible time, to the transmission queue included in the prefetched entry 34D with the gate state being the valid (open) state.

There are cases where "valid" (open) indicating that transmission is possible is successively set for the same transmission queue in a plurality of entries 34D in the gate control list 348. In such cases, the prefetch unit 20 prefetches these entries 34D. Accordingly, in such cases, the prefetch unit 20 assigns the total value of the time intervals included in the prefetched entries 34D, as the transmission possible time of the transmission queue.

The prefetch notification unit 24 is configured to notify the prefetch unit 20 to prefetch a next entry from the scheduling information. In other words, the prefetch notification unit 24 notifies the prefetch unit 20 of the prefetching instruction.

For example, the prefetch notification unit 24 is configured to send notification to the prefetch unit 20, on the basis of an available time for transmission for each and every queue at a future time, which is a prospective time to schedule future transmission. In other words, the prefetch notification unit 24 notifies the prefetch unit 20 of the prefetching instruction, on the basis of the transmission possible time assigned to the transmission queue at the future time.

Specifically, for example, the prefetch notification unit 24 notifies the prefetch unit 20 of the prefetching instruction, when all the values of the transmission possible time assigned to the respective transmission queues stored in the available time storage 36 are "0" at the future time stored in the future time storage 30.

In addition, the prefetch notification unit 24 may notify the prefetch unit 20 of the prefetching instruction, when the schedulability evaluation unit 22 described later determines that scheduling of each of the transmission queues is impossible.

The prefetch notification unit 24 may be configured to send notification to the prefetch unit 20, on the basis of the available time of each queue at the future time, and a time difference between a current time and the future time. In other words, the prefetch notification unit 24 may notify the prefetch unit 20 of the prefetching instruction, on the basis of the transmission possible time of each of the transmission queues, and a time difference between the future time and the current time.

Specifically, the prefetch notification unit 24 presets a threshold of the time difference between the future time and the current time. When the time difference between the future time and the current time is equal to or smaller than the threshold, the prefetch notification unit 24 notifies the prefetch unit 20 of the prefetching instruction.

As another example, the prefetch notification unit 24 may update the transmission possible time of each of the transmission queues, on the basis of the time difference between the future time and the current time, and notify the prefetch unit 20 of the prefetching instruction.

In this case, the prefetch notification unit 24 is configured to update the available time of each queue, on the basis of a time difference between a current time and the future time. In other words, the prefetch notification unit 24 updates the values of the transmission possible time to be assigned to the respective transmission queues at the future time, on the basis of the time difference between the future time and the current time. For example, when any frame for which scheduling is possible exists, the update processing is executed as post processing after the scheduling processing is executed with the scheduler unit 26 described later. In the following explanation, the update processing performed with the prefetch notification unit 24 may be referred to as second post processing.

For example, the prefetch notification unit 24 reduces the values of the transmission possible time corresponding to the respective transmission queues in the transmission possible time information 36A, when the time difference between the future time stored in the future time storage 38 and the current time is equal to or smaller than the threshold, and the time difference is smaller than the value calculated in the previous iteration. For example, the prefetch notification unit 24 reduces the transmission possible time, by subtracting a predetermined value from each of the values of the transmission possible time in the transmission possible time information 36A. The value used for subtraction may be any value satisfying the condition that the transmission possible time of each of the transmission queues is reduced to zero before the current time reaches the future time. Specifically, a predetermined fixed value max be used as the value used for the subtraction in the second post processing. As another example, a plurality of fixed values may be set in advance, and the value used for the subtraction may be dynamically selected therefrom, in accordance with the value of the time difference. As another example, the value itself used for the subtraction may be dynamically calculated. As an example, the transmission possible time may be reduced, in accordance with a difference between the threshold and the time difference.

The prefetch notification unit 24 may notify the prefetch unit 20 of the prefetching instruction, when all the values of the transmission possible time of the respective transmission queues indicated in the transmission possible time information 36A after subtraction by the second post processing becomes "0".

The following is an explanation schedulability evaluation unit 22.

The schedulability evaluation unit 22 is configured to evaluate each frame waiting for transmission in each queue and determine one or more schedulable frames, if any exist. In other words, the schedulability evaluation unit 22 determines a frame for which so ling of the scheduled transmission start time is possible, among the frames retained in the transmission queue and waiting for transmission.

For example, the schedulability evaluation unit 22 is configured to determine whether or not each frame waiting for transmission can be schedulable, which means each frame can be transmitted within the available time of each corresponding queue at the future time. In other words, the schedulability evaluation unit 22 determines a frame with the required transmission time smaller than the transmission possible time assigned to the transmission queue at the future time serving as a candidate for the next scheduled transmission start time, among the frames retained in the transmission queue and waiting for transmission, as the frame for which scheduling of the scheduled transmission start time is possible.

The required transmission time is time required for transmission of the frame from a frame transmission unit 23 to the communication apparatus 2. It suffices that the schedulability evaluation unit 22 reads parameters used for calculation of the required transmission time from the frame storage 32, and calculates the required transmission time for each of the frames stored in the frame storage 32. Examples of the parameters used for calculation of the required transmission time include a frame size, presence/absence of retransmission, and/or the number and intervals of transmission retrials.

The schedulability evaluation unit 22 may determine a frame with the required transmission time smaller than the transmission possible time assigned to the transmission queue at the future time, among the frames retained in the transmission queue and in "transmission possible state", instead of frames waiting for transmission, as the frame for which scheduling is possible. For example, any traffic shaping algorithm may be applied to a specific transmission queue, and a frame, transmission of which is permitted as a result of the application, may be regarded as a frame in "transmission possible state". For example, Credit Eased Shaper provided in the IEEE 802.1Qav standard may be used, as a specific example of the traffic shaping algorithm. However, the traffic shaping algorithm is not limited to IEEE 802.1Qav.

The following is an explanation of the scheduler unit 26.

The scheduler unit 26 is configured to determine a starting time of transmission for each frame waiting for transmission in each queue, on the basis of the prefetched entry. In other words, the scheduler unit 26 schedules the scheduled transmission start time for the frame retained in the transmission queue and waiting for transmission, on the basis of the entry 34D prefetched with the prefetch unit 20.

Specifically, the scheduler unit 26 is configured to schedule a starting time of transmission for a predetermined schedulable frame. In other words, the scheduler unit 26 schedules scheduled transmission start time of the frame determined with the schedulability evaluation unit 22 as a frame for which scheduling is possible. More specifically, the scheduler unit 26 reads a frame determined with the schedulability evaluation unit 22 as a frame for which scheduling is possible, from the frame storage 32. Thereafter, the scheduler unit 26 schedules the scheduled transmission start time of the read frame.

In the present embodiment, the scheduler unit 26 selects a frame serving as a scheduling target, from the frame determined with the schedulability evaluation unit 22 as a frame for which scheduling is possible. When a plurality of frames exists as frames determined as frames for which scheduling is possible, the scheduler unit 26 can select frames of the number equal to the number of frame transmission units 28 provided in the information processing apparatus 10. The present embodiment illustrates an example in which the information processing apparatus 10 includes one frame transmission unit 28. Accordingly, in the present embodiment, the scheduler unit 26 selects one frame as a scheduling target, from the frames determined with the schedulability evaluation unit 22 as frames for which scheduling is possible. The algorithm used in the selection may be any algorithm. As specific examples of the selection algorithm, for example, a fixed-priority algorithm or a round-robin algorithm may be used. However, the algorithm is not limited thereto.

Thereafter, the scheduler unit 26 schedules the scheduled transmission start time for the selected frame.

For example, the scheduler unit 26 schedules the future time stored in the future time storage 38, as the scheduled transmission start time of the selected frame. Specifically, the scheduler unit 26 schedules the future time set or updated with the prefetch unit 20 on the basis of the prefetched entry 34D, or updated by the first post processing (details thereof will be described later) after the previous scheduling processing, as the scheduled transmission start time of the selected frame.

As described above, the scheduler unit 26 is capable of scheduling the scheduled transmission start time of each of the frames, within the range satisfying the restriction defined with the transmission scheduling information 34A.

In addition, as described above, the scheduler unit 26 schedules the scheduled transmission start time of the frame, on the basis of the entry 34D prefetched with the prefetch unit 20. With this structure, the scheduler unit 26 is capable scheduling the scheduled transmission start time for transmission timing control with high accuracy.

The scheduler unit 26 is configured to update the future time and the available time of each queue, using a required amount of time to transmit a scheduled frame. In other words, when the scheduler unit 26 schedules the scheduled transmission start time of the frame determined as a frame for which scheduling is possible, the scheduler unit 26 performs first post processing, as post processing.

The first post processing is processing of updating the future time serving as a candidate for the next scheduled transmission start time, and the values of the transmission possible time assigned to the respective transmission queues at the future time, using the required transmission time of the scheduled frame, after scheduling.

For example, the scheduler unit 26 calculates the time obtained by adding the required transmission time of the frame for which the scheduled transmission start time has been scheduled to the future time stored in the future time storage 38, as the updated future time.

In addition, for example, the scheduler unit 26 calculates the time obtained by subtracting the required transmission time of the frame for which the scheduled transmission start time has been scheduled from each of the values of the transmission possible time assigned to the respective transmission queues stored in the available time storage 36, as the updated values of the transmission possible time.

Thereafter, the scheduler unit 26 updates the values of the transmission possible time and the future time stored in the available time storage 36 and the future time storage 38, respectively, to the calculated updated values of the transmission possible time and the updated future time. As described above, the scheduler unit 26 performs the first post processing, after scheduling the scheduled transmission start time.

The following is an explanation of the transmission device 14.

The transmission device 14 is, for example, a Network Interface Card (NIC). The transmission device 14 includes the frame transmission unit 28.

The frame transmission unit 28 is configured to start transmission of a frame, on the basis of a predetermined starting time of transmission. In other words, the frame transmission unit 28 starts transmission of the frame, on the basis of the scheduled transmission start time scheduled with the scheduler unit 26. In the present embodiment, the frame transmission unit 28 transmits the frame to the communication apparatus 2.

The frame transmission unit 28 starts transmission of the frame, when the transmission start condition is satisfied for the frame with the scheduled transmission start time scheduled with the scheduler unit 26.

The transmission start condition is, for example, a condition that the current time agrees with the scheduled transmission start time, a condition that the time difference between the current time and the scheduled transmission start time becomes smaller than the predetermined threshold, or a condition that the time difference between the current time and the scheduled transmission start time falls within a range of the predetermined threshold and the current time has passed the scheduled transmission start time. The following explanation illustrates the case where the transmission start condition is a condition that the current time agrees with the scheduled transmission start time, as an example.

Specifically, in the present embodiment, the frame transmission unit 28 performs transmission of the frame to the communication apparatus 2 when the scheduled transmission start time scheduled for the frame with the scheduler unit 26 agrees with the current time. In other words, the frame transmission unit 28 starts transmission of the frame for which the scheduled transmission start time has been scheduled when the scheduled transmission start time agrees with the current time.

The scheduler unit 26 and the frame transmission unit 28 may include areas in which the scheduler unit 26 and the frame transmission unit 28 can buffer the frame temporarily.

As described above, the frame transmission unit 28 starts transmission of the frame for which the scheduled transmission start time has been scheduled, on the basis of the scheduled transmission start time scheduled with the scheduler unit 26. With this structure, the information processing apparatus 10 is capable of transmitting each of the frames to the communication apparatus 2 at the scheduled transmission start time that has been scheduled. Specifically, the information processing apparatus 10 according to the present embodiment is capable of guaranteeing the transmission timing of data requiring real-time communication.

The following is an explanation of an example of a process of information processing performed with the information processing apparatus 10.

Information Processing

Figure 4:
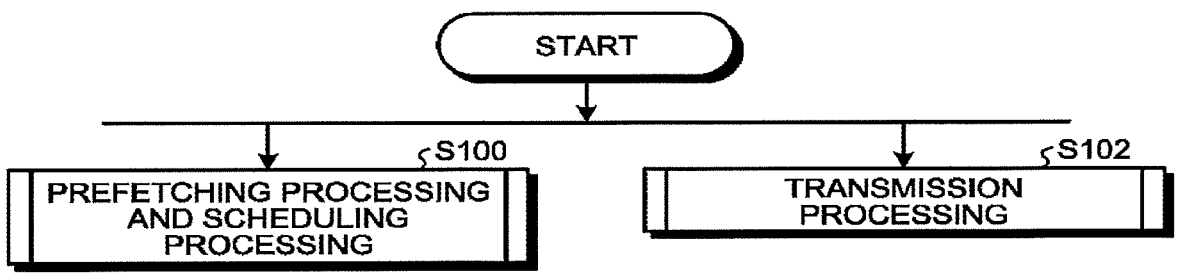
FIG. 4 is a flowchart illustrating a process of information processing.

FIG. 4 is a flowchart illustrating an example of a process of information processing performed with the information processing apparatus 10 according to the present embodiment. The information processing apparatus 10 performs prefetching processing and scheduling processing (Step S100) performed with the processor 31 and transmission processing (Step S102) performed with the frame transmission unit 28 simultaneously in parallel.

Prefetching Processing and Scheduling Processing

Figure 5:
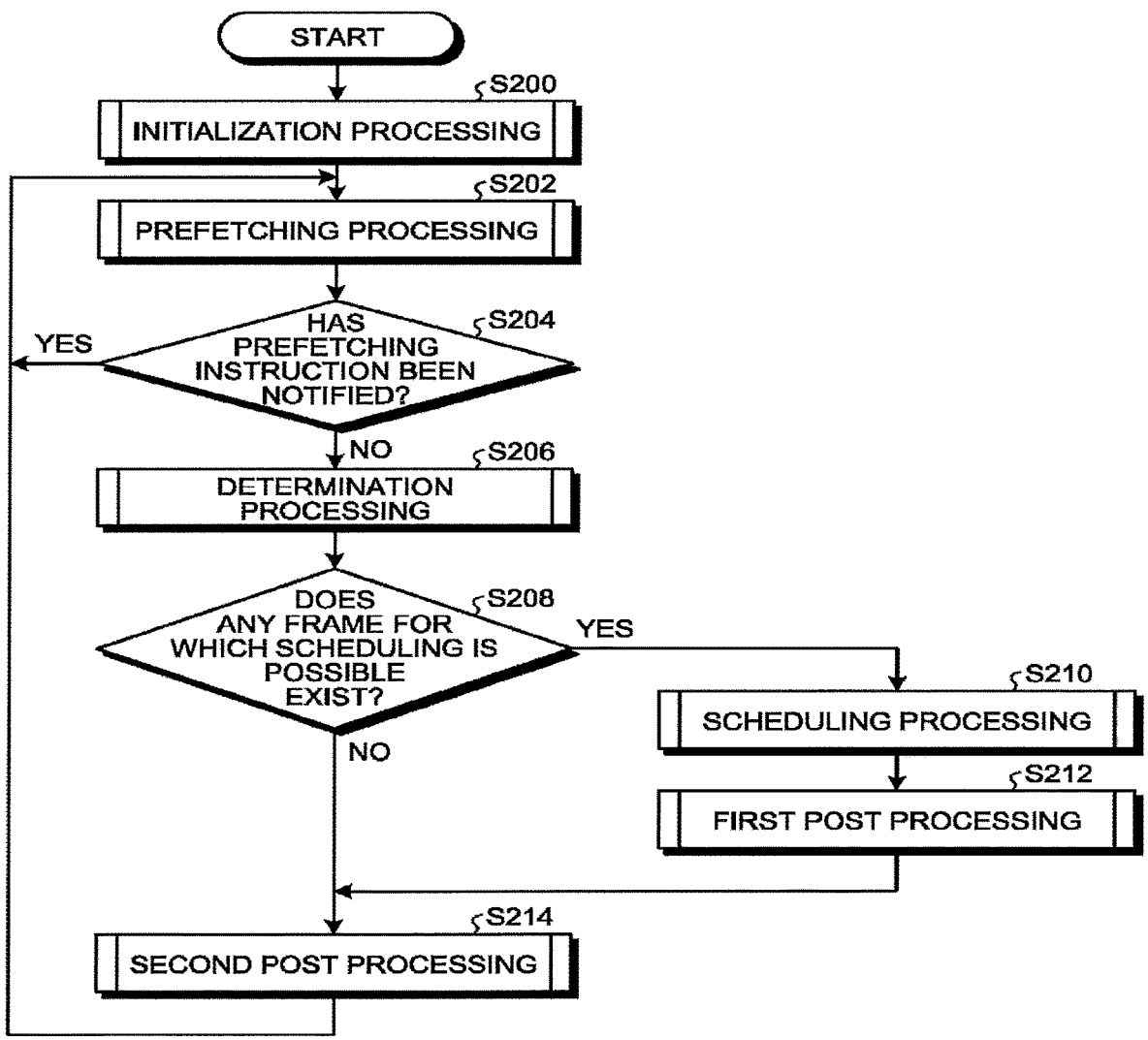
FIG. 5 is a detailed flowchart of prefetching processing and scheduling processing.

FIG. 5 is a detailed flowchart of the processing at Step S100 (see FIG. 4). As illustrated in FIG. 5, first, the prefetch unit 20 performs initialization processing (Step S200). At Step S200, the prefetch unit 20 calculates the transmission possible time and the future time to be used as initial values. The detailed flowchart of the initialization processing at Step S200 will be described later.

Thereafter, the prefetch unit 20 performs prefetching processing (Step S202). By the processing at Step S202, the prefetch-unit 20 prefetches the next entry 34D, and updates the transmission possible time and the future time. The detailed flowchart of the prefetching processing at Step S202 will be described later.

Thereafter, in prefetching processing at Step S202, it is determined whether a prefetching instruction has been notified from the prefetch notification unit 24 (Step S204). When it is determined that the prefetching instruction has been notified (Yes at Step S204), the process returns to Step S202.

The case where affirmative determination (Yes at Step S204) is made at Step S204 is the case where, for example, "valid" (open) indicating that transmission is possible is successively set for the same transmission queue in a plurality of entries 34D in the gate control list 34B. In such a case, the prefetch unit 20 prefetches these entries 34D, by repeating the prefetching processing at Step S202.

By contrast, when it is determined that no prefetching instruction has been notified (No at Step S204), the process proceeds to Step S206. At Step S206, the schedulability evaluation unit 22 performs determination processing (Step S206). By the determination processing at Step S206, the schedulability evaluation unit 22 determines whether any frame for which scheduling is possible exists. The detailed flowchart of the determination processing at Step S206 will be described later.

When it is determined that no frame for which scheduling is possible exists (No at Step S208) by the determination processing at Step S206, the process proceeds to Step S214 described later. By contrast, when it is determined that any frame for which scheduling is possible exists (Yes at Step S208) by the determination processing at Step S206, the process proceeds to Step S210.

At Step S210, the scheduler unit 26 performs scheduling processing (Step S210). By the processing at Step S210, the scheduler unit 26 schedules the scheduled transmission start time for the frame. The detailed flowchart of the scheduling processing at Step S210 will be described later.

Thereafter, the scheduler unit 26 performs the first post processing (Step S212). By the processing at Step S212, the scheduler unit 26 updates the future time serving as candidate for the next scheduled transmission start time, and the values of the transmission possible time assigned to the respective transmission queues at the future time, using the required transmission time of the frame scheduled at Step S210. The detailed flowchart of the first post processing at Step S212 will be described later. Thereafter, the process proceeds to Step S214.

At Step S214, the prefetch notification unit 24 performs the second post processing (Step S214). By the processing at Step S214, the prefetch notification unit 24 updates the transmission possible time assigned to the transmission queue at the future time, on the basis of the time difference between the future time and the current time. The detailed flowchart of the second post processing at Step S214 will be described later.

By the processing at Step S214, the process for one loop relating to the prefetching processing and the scheduling processing in the flowchart of FIG. 5 is ended. Thereafter, the process returns to Step S202 described above, and the information processing apparatus 10 repeatedly performs the above process. With the process, the information processing apparatus 10 is capable of continuously performing the prefetching processing and the scheduling processing.

Initialization Processing

Figure 6:
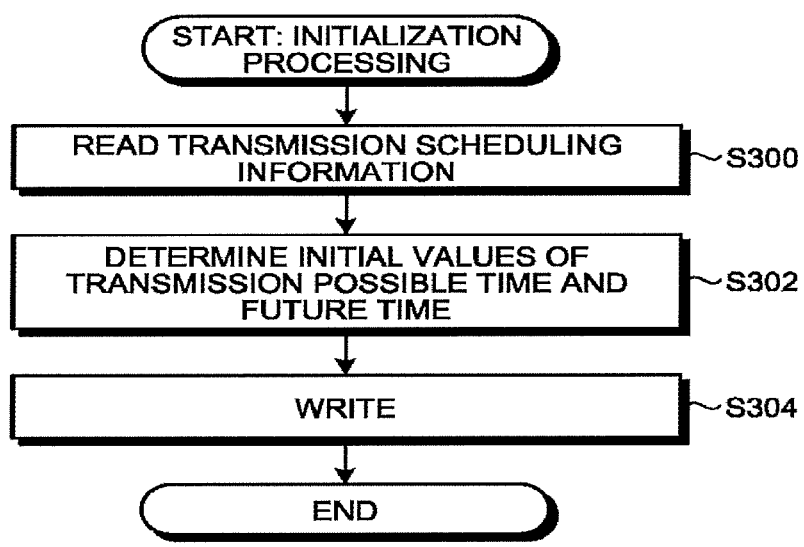
FIG. 6 is a detailed flowchart of initialization processing.
Figure 7:
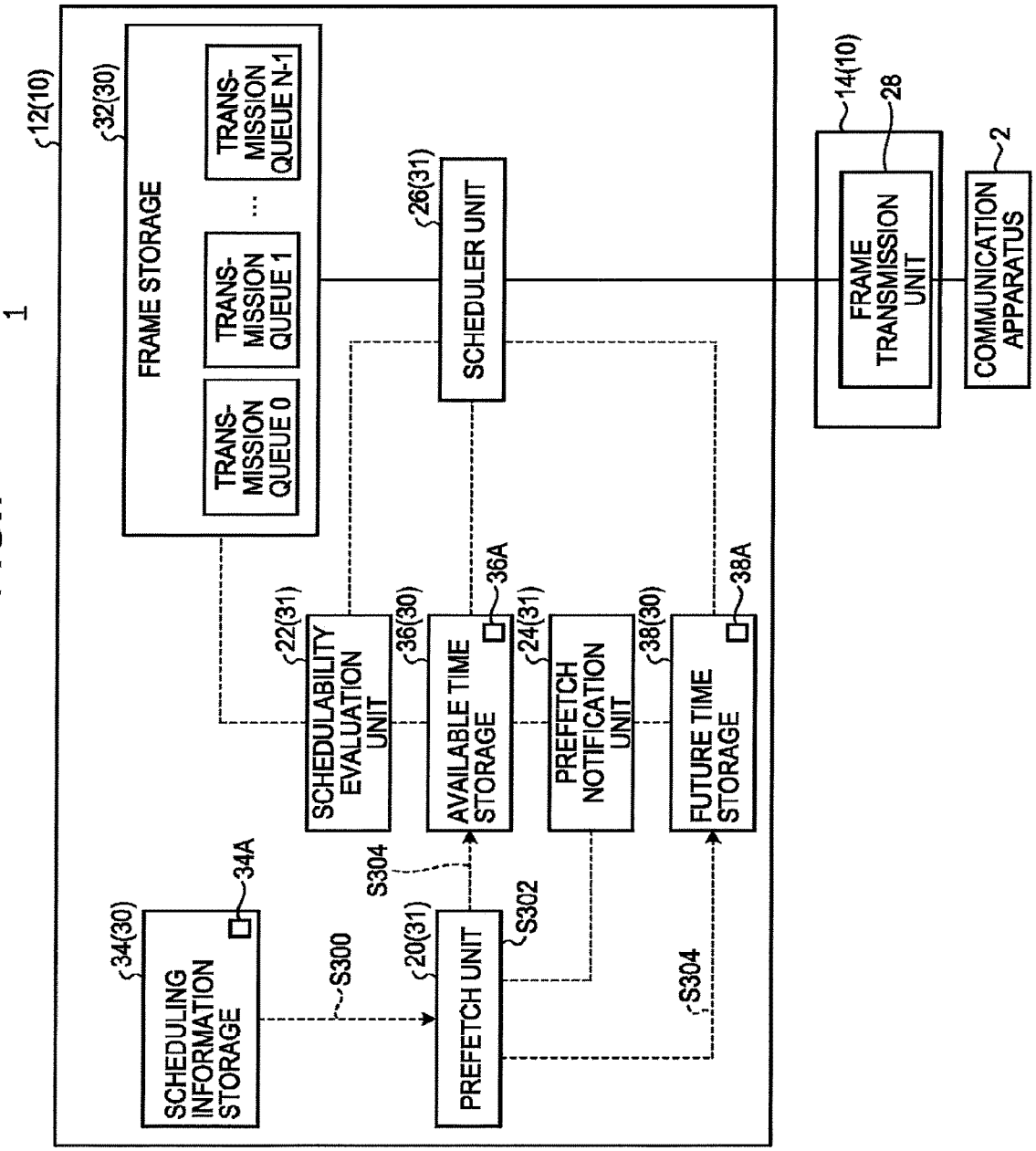
FIG. 7 is a schematic diagram illustrating a flow of the initialization processing.

FIG. 6 is a detailed flowchart of the initialization processing at Step S200 (see FIG. 5). FIG. 7 is a schematic diagram illustrating a flow of the initialization processing.

First, the prefetch unit 20 reads the transmission scheduling information 34A from the scheduling information storage 34 (Step S300). In more detail, the prefetch unit 20 reads the transmission scheduling information 34A including the gate control list 34B and the other parameters 34C (see FIG. 2).

Thereafter, the prefetch unit 20 determines the initial values of the transmission possible time and the future time using the transmission scheduling information 34A read at Step S300 (Step S302).

For example, the prefetch unit 20 sets the gate control start time (see FIG. 2) included in the other parameters 34C, as the initial value of the future time.

In addition, for example, the prefetch unit 20 sets the values of the transmission possible time assigned to the respective transmission queues at the future time, on the basis of the gate state of the queues and the time interval included in the entry 34D.

Specifically, for example, the prefetch unit 20 specifies the entry 34D (for example, entry 34D0) on which transmission control is performed first in the gate control list 34B (see also FIG. 2). Thereafter, the prefetch unit 20 determines the time interval (for example, 2,500 nanoseconds) indicated in the entry 34D0, as the initial value of the transmission possible time, for the transmission queue (for example, transmission queue 7) for which the "valid" (open) is set in the gate state of the entry 34D0.

In addition, for example, the prefetch unit 20 sets the value "0", as the initial value of the transmission possible time, for each of the transmission queues (for example, transmission queue 6 to transmission queue 0) other than the transmission queue for which "valid" (open) is set, in the gate state of the entry 34D on which transmission control is performed first.

Thereafter, the prefetch unit 20 writes the initial values of the transmission possible time and the future time determined at Step S302, to the transmission possible time information 36A and the future time information 38A, respectively (Step S304). Thereafter, the present routine is ended.

Prefetching Processing

Figure 8:
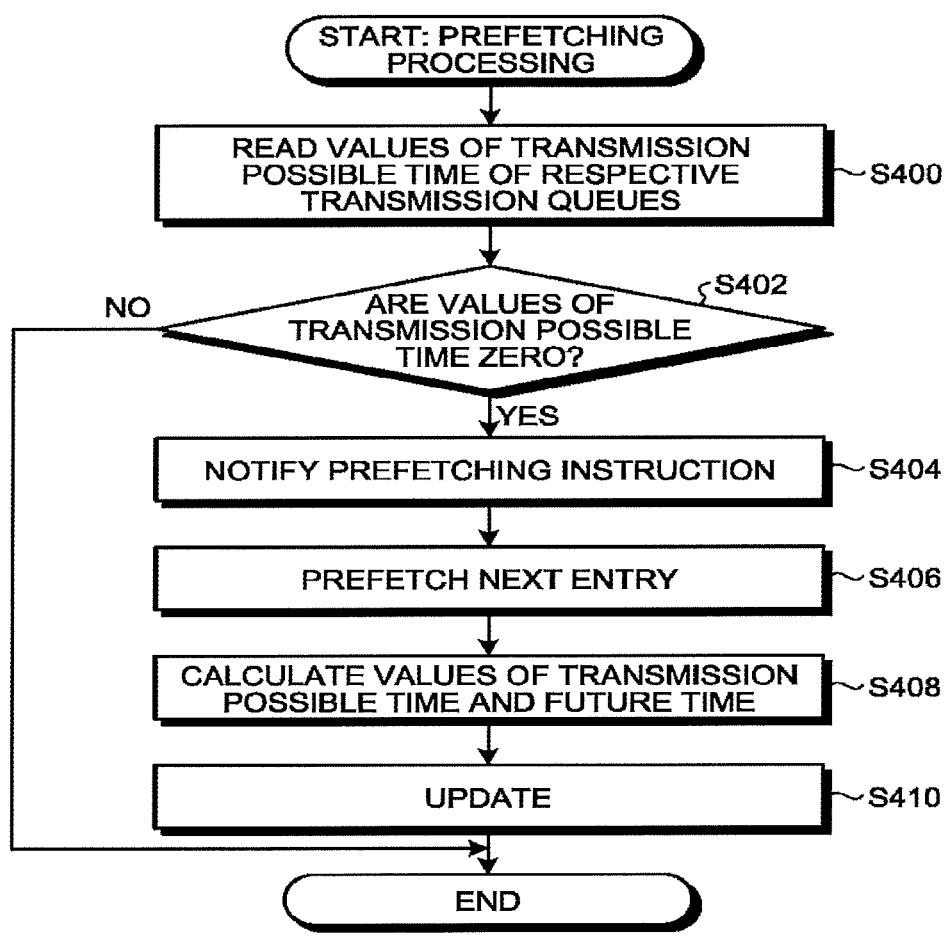
FIG. 8 is a detailed flowchart of the prefetching processing.
Figure 9:
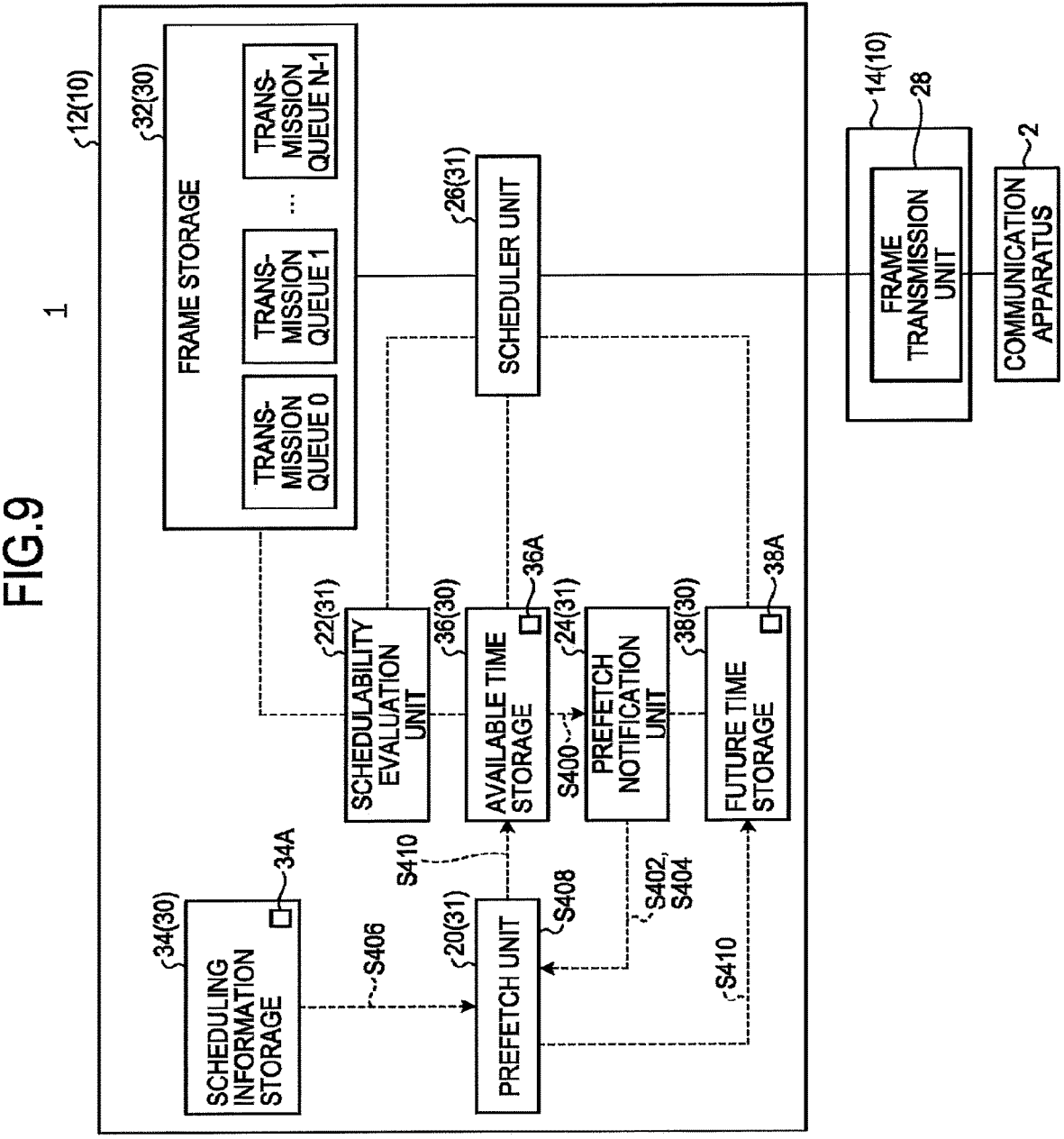
FIG. 9 is a schematic diagram illustrating a flow of the prefetching processing.

FIG. 8 is a detailed flowchart of the prefetching processing at Step S202 (see FIG. 5). FIG. 9 is a schematic diagram illustrating a flow of the prefetching processing.

First, the prefetch notification unit 24 reads the values of the transmission possible time assigned to the respective transmission queues from the available time storage 36 (Step 2400).

Thereafter, the prefetch notification unit 24 determines whither the values of the transmission possible time read at Step S400 are "0" (Step S402). Specifically, the prefetch notification unit 24 determines whether the remaining time for which the frame can be transmitted is zero for each of the transmission queues. The expression that the remaining time is zero means that no remaining time is left.

When the prefetch notification unit 24 determines that the transmission possible time remains for any of the transmission queues (No at Step S402), the present routine is ended. By contrast, when the prefetch notification unit 24 determines that the transmission possible time is zero for all the transmission queues (Yes at Step S402), the process proceeds to Step S404.

The present embodiment illustrates the case where the value "0" is set, as the transmission possible time, for the transmission queues other than the transmission queue for which "valid" (open) is set. Specifically, the transmission possible time of each of the transmission queues set to "invalid" (close) is "0". Accordingly, when the prefetch notification unit 24 determines that all the values of the transmission possible time assigned to all the respective transmission queues registered in the transmission possible time information 36A are "0", the prefetch notification unit 24 makes affirmative determination (Yes at Step S402) at Step S402.

At Step S404, the prefetch notification unit 24 notifies the prefetch unit 20 of a prefetching instruction (Step S404). Specifically, the prefetch notification unit 24 notifies the prefetch unit 20 of the prefetching instruction, when no transmission possible time remains for the transmission queues at the future time stored in the available time storage 36.

The prefetch unit 20 that has received the prefetching instruction prefetches the next entry 34D from the scheduling information storage 34 (Step S406). The next entry 34D is the entry 34D following the entry 34D processed immediately before, in the gate control list 34B. The order of the prefetching processing is indicated, for example, with the values expressed in the list index. In the initial state, it suffices that the prefetch unit 20 prefetches the entry 34D (for example, entry 34D0 in FIG. 2) listed first in the list index.

Thereafter, the prefetch unit 20 calculates the future time serving as a candidate for the scheduled transmission start time of the frame to be scheduled next, and the transmission possible time assigned to the transmission queue at the future time (Step S408), on the basis of the next entry 34D prefetched at Step S404 (Step S408).

For example, the prefetch unit 20 may calculates the start time of the entry 34D prefetched at Step S406, as the updated future time to be stored in the future time storage 38.

In addition, for example, the prefetch unit 20 calculates the value of the time interval included in the entry 34D prefetched at Step S406, as the transmission possible time to be assigned to the transmission queue for which "valid" (open) is set, indicated in the gate state of the entry 34D. When the prefetch unit 20 prefetches a plurality of entries 34D, it suffices that the prefetch unit 20 calculates the total value of the time intervals included in the respective prefetched entries 34D, as the transmission possible time.

Thereafter, the prefetch unit 20 writes the transmission possible time and the future time calculated at Step S408 to the transmission possible time information 36A and the future time information 38A, respectively. By the writing, the prefetch unit 20 updates the transmission possible time and the future time in the transmission possible time information 36A and the future time information 38A (Step S410).

Specifically, the prefetch unit 20 updates the future time, by writing the future time calculated at Step S408 over the future time information 38A of the future time storage 38. The prefetch unit 20 also assigns the transmission possible time calculated at Step S408 to the transmission queue corresponding to the transmission possible time. Thereafter, the present routine is ended.

Determination Processing

Figure 10:
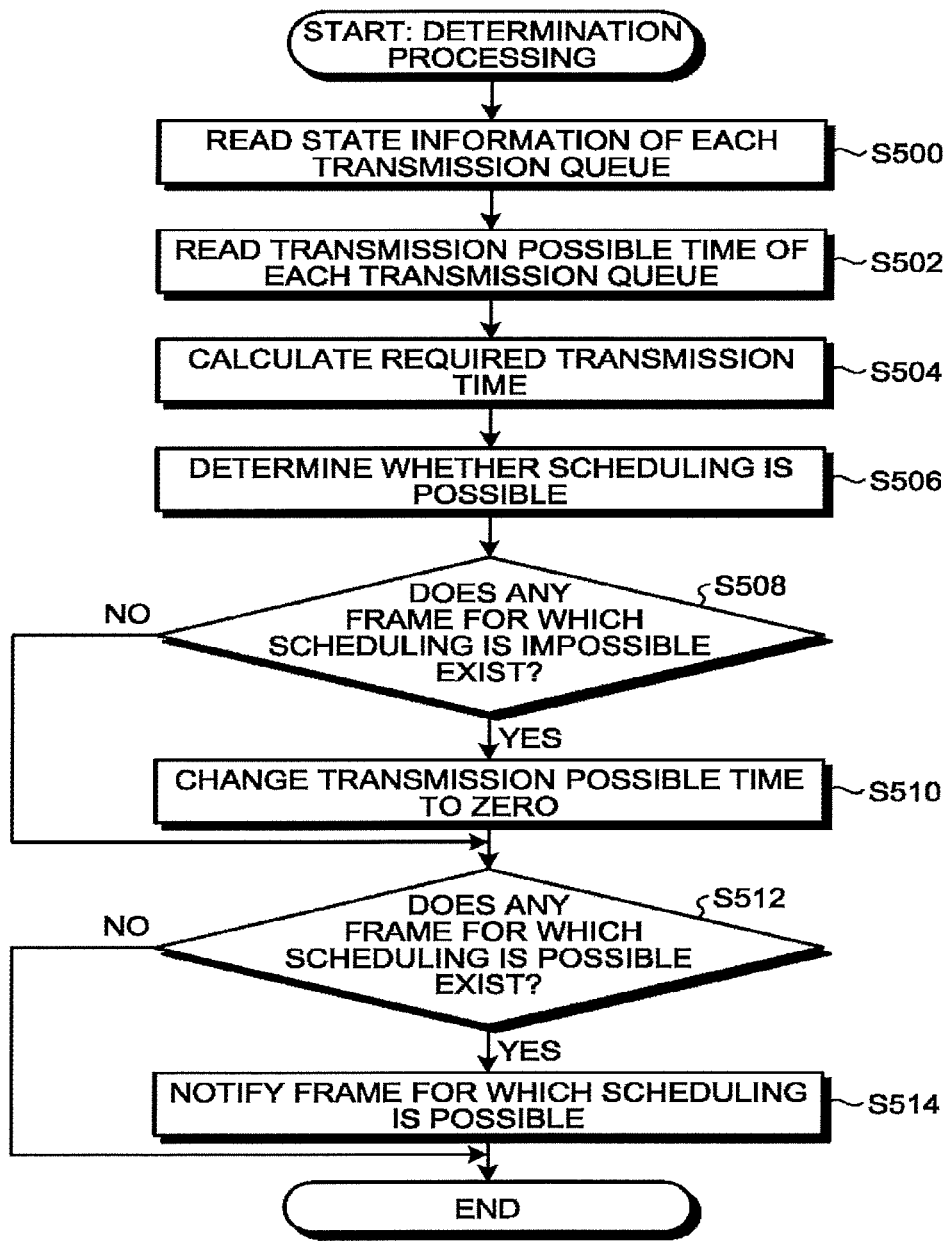
FIG. 10 is a detailed flowchart of determination processing.
Figure 11:
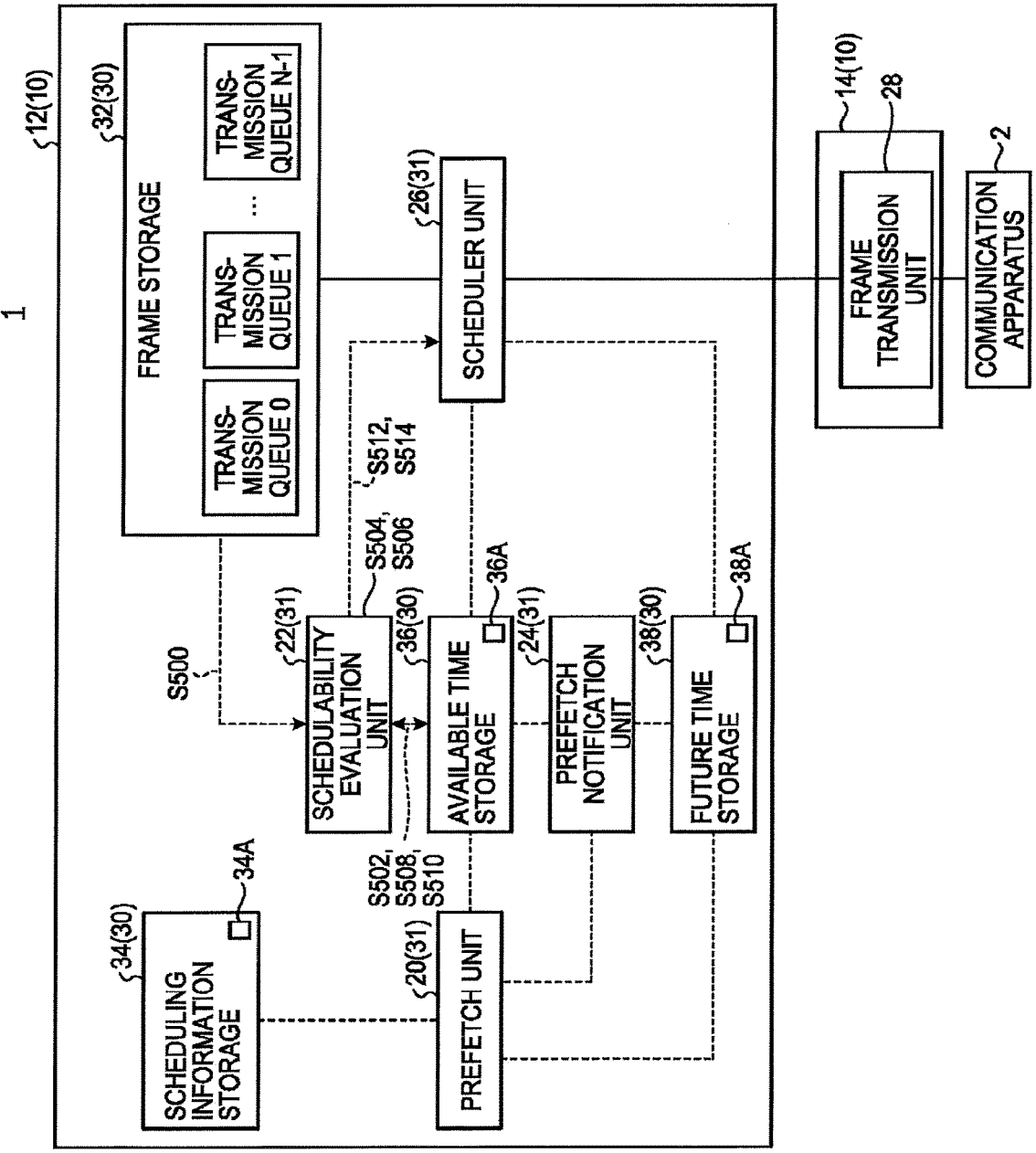
FIG. 11 is a schematic diagram illustrating a flow of the determination processing.

FIG. 10 is a detailed flowchart of the determination processing at Step S206 (see FIG. 5). FIG. 11 is a schematic diagram illustrating a flow of the determination processing.

First, the schedulability evaluation unit 22 reads state information of each of the transmission queues from the frame storage 32 (Step S500).

The state information is parameters used for determination of presence/absence of the frame retained in the transmission queue and waiting for transmission, and calculation of the required transmission time of the frame retained in each of the transmission queues. Examples of the state information include a frame size, presence/absence of retransmission, and/or the number and intervals of transmission retrials.

The schedulability evaluation unit 22 may read state information further including information used for determination of priorities of the respective transmission queues, in preparation for the case where a plurality of frames for which scheduling of the scheduled transmission tart time is possible exist. The information used for determination of priorities of the respective transmission queues may be, for example, preset fixed values, or dynamically changing values. Specifically, the information used for determination of priorities of the respective transmission queues may be values corresponding to traffic classes of the respective transmission queues indicated in the IEEE 802.1Qbv standard.

Thereafter, the schedulability evaluation unit 22 reads the values of the transmission possible time assigned to the respective transmission queues from the available time storage 36 (Step S502). Specifically, the schedulability evaluation unit 22 reads the values of the transmission possible time assigned to the respective transmission queues at the future time stored in the future time storage 38, from the available time storage 36.

Thereafter, the schedulability evaluation unit 22 calculates the required transmission time for each of the frames retained in each of the transmission queues using the state information read at Step S500 (Step S504).

Thereafter, the schedulability evaluation unit 22 determines whether scheduling of the scheduled transmission start time is possible, for each of the frames retained in the transmission queue and waiting for transmission (Step S506). For example, the schedulability evaluation unit 22 determines a frame with the required transmission time that is calculated at Step S504 and is smaller than the transmission possible time read at Step S502, among the frames retained in the transmission queue and waiting for transmission, as a frame for which scheduling of the scheduled transmission start time is possible. Specifically, when the required transmission time of the frame is equal to or smaller than the transmission possible time assigned to the transmission queue, the schedulability evaluation unit 22 determines the frame as a frame for which scheduling is possible.

Thereafter, the schedulability evaluation unit 22 determines whether any frame for which scheduling is impossible exists (Step S508). The schedulability evaluation unit 22 performs determination at Step S508, by determining whether the determination result at Step S506 includes a frame for which scheduling is impossible.

When the schedulability evaluation unit 22 determines that no frame for which scheduling is impossible exists (No at Step S508), the process proceeds to Step S512.

By contrast, when the schedulability evaluation unit 22 determines that any frame for which scheduling is impossible exists (Yes at Step S508), the process proceeds to Step S510. At Step S510, the schedulability evaluation unit 22 charges the transmission possible time assigned to the transmission queue retaining the frame for which it is determined that scheduling of the frame is impossible to "0", in the transmission possible time information 36A (see FIG. 3) (Step S510).

Specifically, the processing at Step S510 is performed, when the required transmission time exceeds the transmission possible time assigned to the transmission queue. With this structure, the schedulability evaluation unit 22 is capable of suppressing scheduling of the erroneous scheduled transmission start time for the frame, transmission of which is not completed within the transmission possible time. This structure enables the information processing apparatus 10 to perform transmission control satisfying, for example, restriction of the guard band defined in the IEEE 802.1Qbv standard.

Thereafter, the schedulability evaluation unit 22 determines whether any frame for which scheduling is possible exists (Step S512 The schedulability evaluation unit 22 performs determination at Step S512, by determining whether the determination result at Step S506 includes a frame for which scheduling is possible.

When the schedulability evaluation unit 22 determines that no frame for which scheduling is possible exists (No at Step S512), the present routine is ended. By contrast, when the schedulability evaluation unit 22 determines that any frame for which scheduling is possible exists (Yes at Step S512), the process proceeds to Step S514.

At Step S514, the schedulability evaluation unit 22 notifies the scheduler unit 26 of the frame for which it is determined that scheduling for the frame is possible (Step S514). Thereafter, the present routine is ended.

Scheduling Processing

Figure 12:
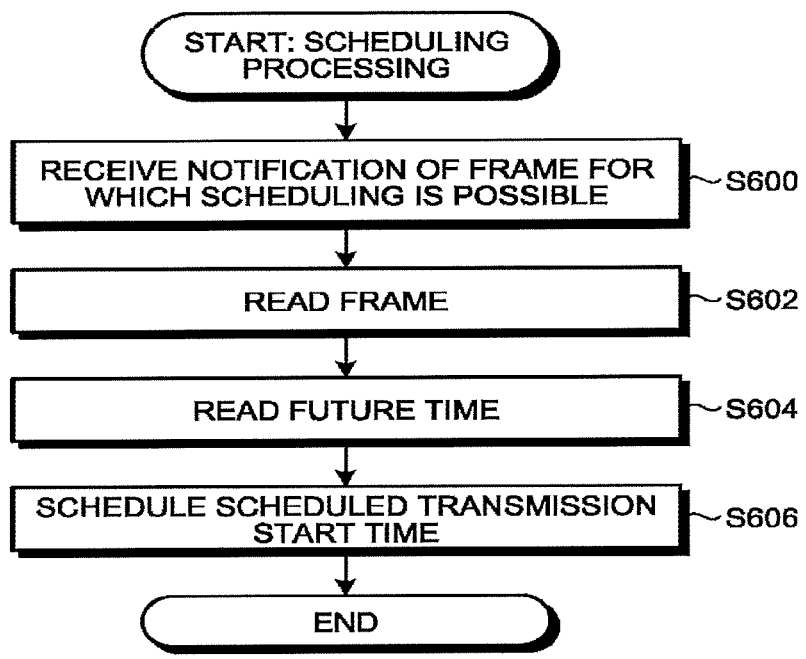
FIG. 12 is a detailed flowchart of the scheduling processing.
Figure 13:
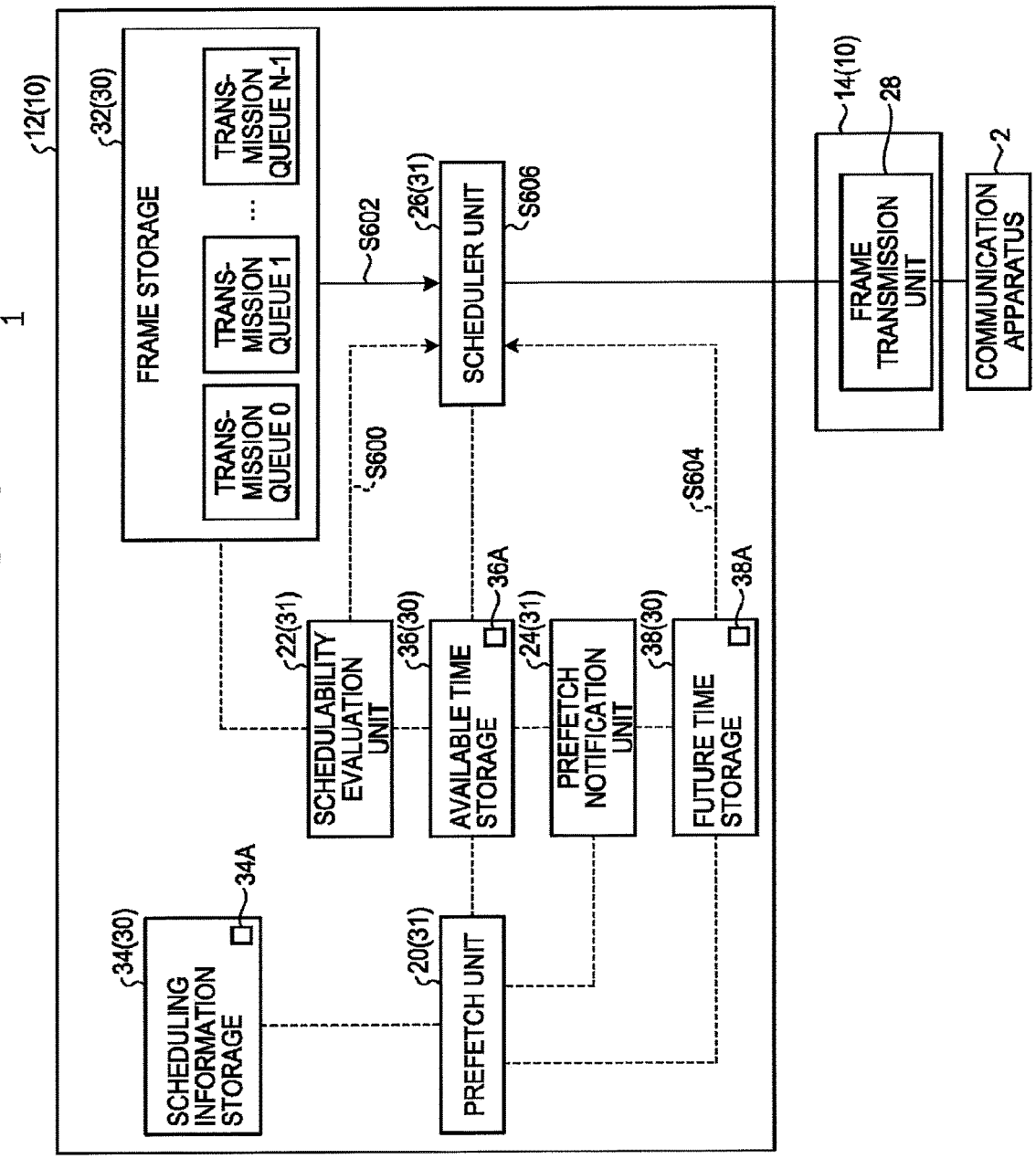
FIG. 13 is a schematic diagram illustrating a flow of the scheduling processing.

FIG. 12 is a detailed flowchart of the scheduling processing at Step S210 (see FIG. 5). FIG. 13 is a schematic diagram illustrating a flow of the scheduling processing.

The scheduler unit 26 receives a notification of the frame for which scheduling is possible from the schedulability evaluation unit 22 (Step S600).

Specifically, the scheduler unit 26 receives information, such as the transmission queue retaining the frame for which scheduling is possible, the address retaining the frame, and the frame size, from the schedulability evaluation unit 22. At this step, the scheduler unit 26 may further receive the required transmission time of the frame calculated with the schedulability evaluation unit 22. When there are a plurality of frames for which scheduling is possible, the scheduler unit 26 may receive a notification of each of the frames from the schedulability evaluation unit 22. The scheduler unit 26 may further receive information relating to the priorities of the transmission queues retaining the respective frames, from the schedulability evaluation unit 22.

Thereafter, the scheduler unit 26 reads the frame for which scheduling is possible and received at Step S600 from the frame storage 32 (Step S602). There are cases where a plurality of frames for which scheduling is possible are notified. In such cases, the scheduler unit 26 may be configured to select a schedulable frame from one or more schedulable frames, and schedule a starting time of transmission for the selected frame. In other words, the scheduler unit 26 may select the frame to be read, or select the frame in accordance with an instruction received from the schedulability evaluation unit 22.

Thereafter, the scheduler unit 26 reads the future time from the future time storage 38 (Step S604).

Thereafter, the scheduler unit 26 schedules the scheduled transmission start time of the frame read at Step S602, on the basis of the future time read at Step S604 (Step S606). As described above, for example, the scheduler unit 26 schedules the future time read at Step S604, as the scheduled transmission start time of the frame read at Step S602. Thereafter, the present routine is ended.

First Post Processing

Figure 14:
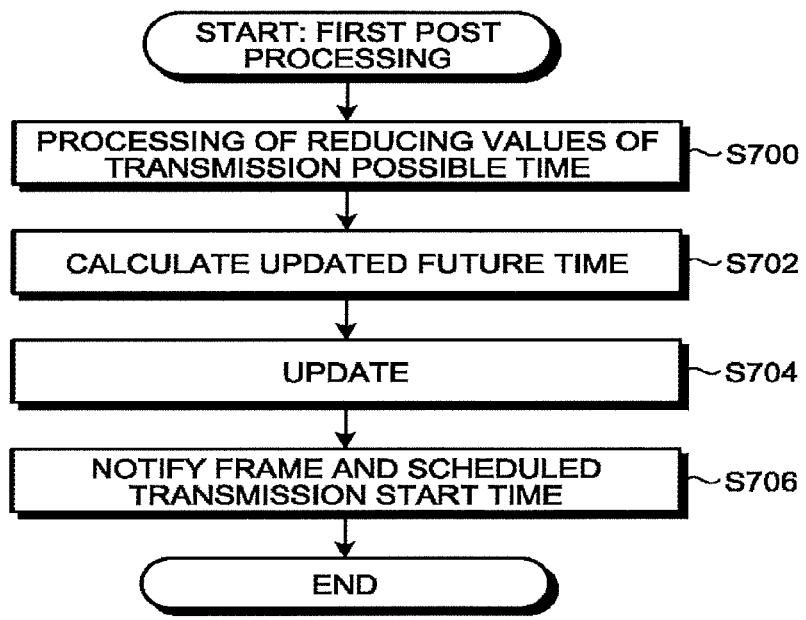
FIG. 14 is a detailed flowchart of first post processing.
Figure 15:
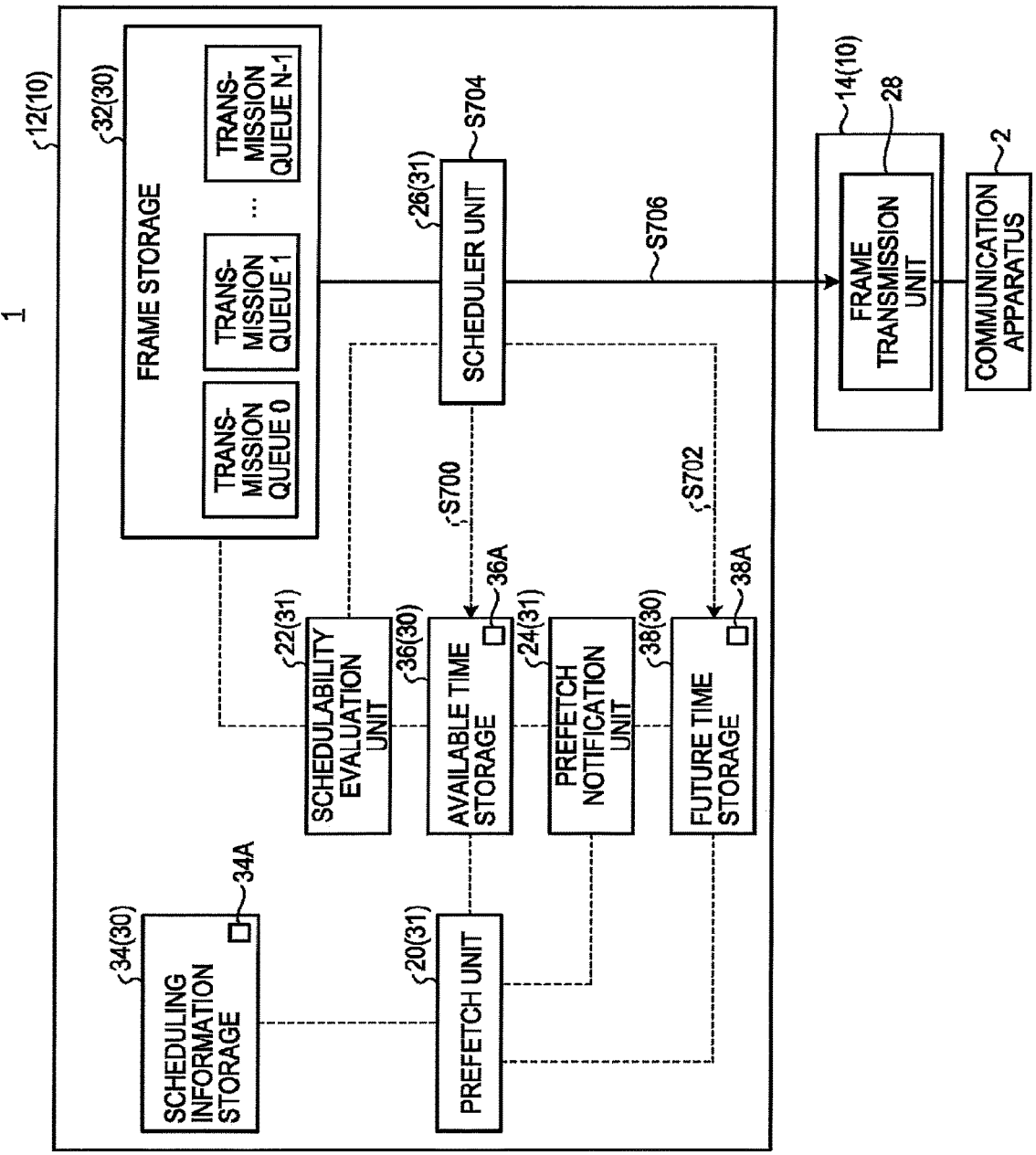
FIG. 15 is a schematic diagram illustrating a flow of the first post processing.

FIG. 14 is a detailed flowchart of the first post processing at Step S212 (see FIG. 5). FIG. 15 is a schematic diagram illustrating a flow of the first post processing.

First, the scheduler unit 26 executes processing of reducing the values of the transmission possible time assigned to the respective transmission queues retained in the available time storage 36 (Step S700).

For example, the scheduler unit 26 calculates the time obtained by subtracting the required transmission time of the frame for which the scheduled transmission start time is scheduled by the scheduling processing performed immediately before from each of the values of the transmission possible time assigned to the respective transmission queues stored in the available time storage 36.

The value subtracted from the transmission possible time before update is not limited to the required transmission time. For example, the scheduler unit 26 may use a value corresponding to the required transmission time as the value to be subtracted. For example, the scheduler unit 26 may adjust the value to be subtracted, on the basis of the overhead caused by the frame transmission unit 26 and the protocol processing of the physical layer, and the like. The overhead is, for example, a preamble in transmitting Ethernet frames, or an interframe gap. The scheduler unit 26 may adjust the reduction value, for the purpose of providing safety margin.

Thereafter, the scheduler unit 26 calculates the updated future time (Step S702). Specifically, the scheduler unit 26 calculates the updated future time, to update the future time stored in the future time storage 38 to the time further advanced to the future.

For example, the scheduler unit 26 calculates the time obtained by adding the required transmission time of the frame scheduled by the scheduling processing performed immediately before to the future time stored in the future time storage 38, as the updated future time.

The value to be added to the future time before update is not limited to the required transmission time. For example, the scheduler unit 26 may use a value corresponding to the required transmission time, as the value to be added. As another example, the scheduler unit 6 may calculate the time obtained by adding the required transmission time of the frame to the scheduled transmission start time of the frame scheduled by the scheduling processing performed immediately before, as updated future time.

As another example, the scheduler unit 26 may adjust the updated future time, on the basis of the overhead caused by the frame transmission unit 28 and the protocol processing of the physical layer, and the like.

The scheduler unit 26 writes the values of the transmission possible time calculated at Step S700 and the future time calculated at Step S702 to the transmission possible time information 36A and the future time information 38A, respectively. By the processing, the scheduler unit 26 updates the values of the transmission possible time and the future time (Step S704).

Thereafter, the scheduler unit 26 notifies the frame transmission unit 28 of the frame for which the scheduled transmission start time has been scheduled by the scheduling processing performed immediately before and the scheduled transmission start time scheduled for the frame (Step S706). Thereafter, the present routine is ended.

Second Post Processing

Figure 16:
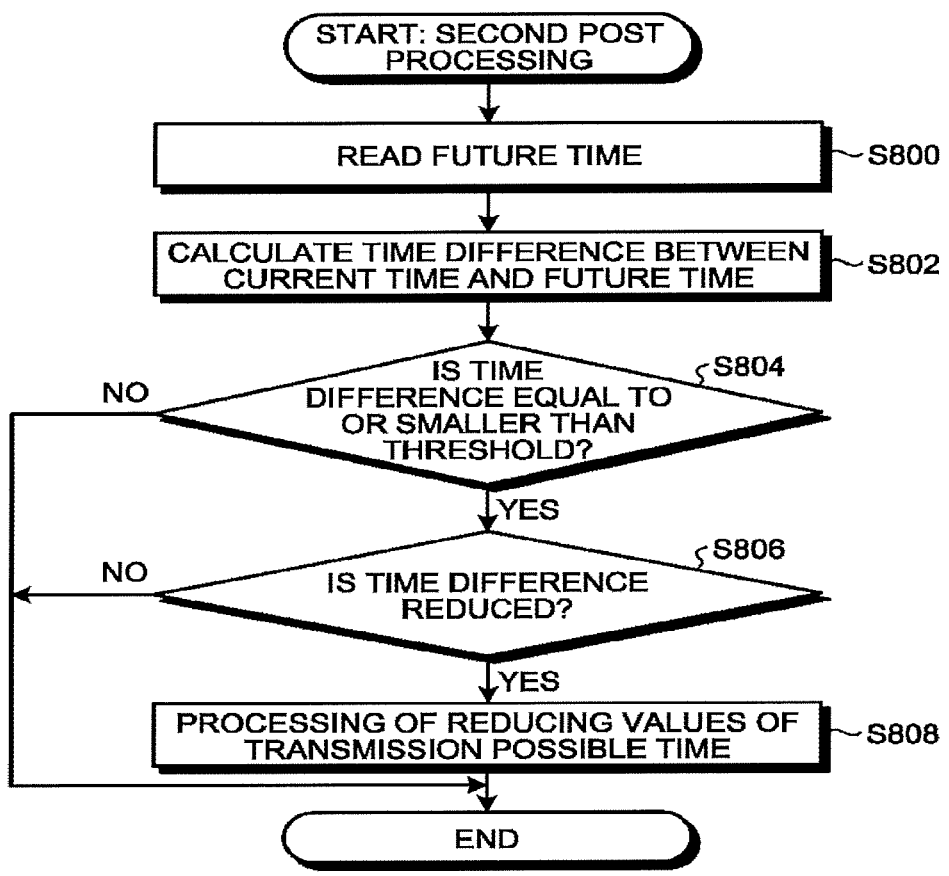
FIG. 16 is a detailed flowchart of second post processing.
Figure 17:
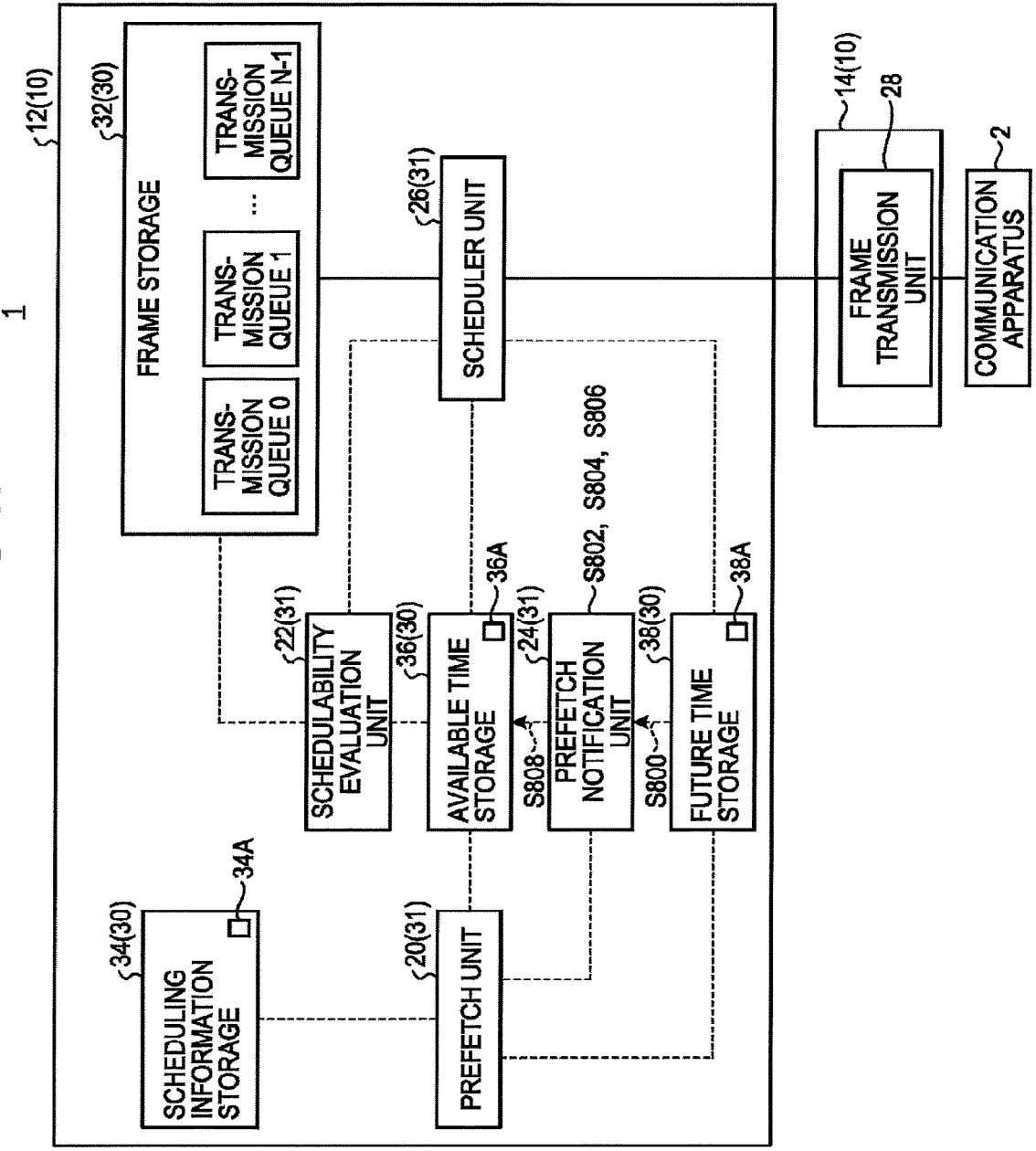
FIG. 17 is a schematic diagram illustrating a flow of the second post processing.

FIG. 16 is a detailed flowchart of the second post processing at Step S214 (see FIG. 5). FIG. 17 is a schematic diagram illustrating a flow of the second post processing.

First, the prefetch notification unit 24 reads the future time from the future time storage 38 (Step S800). Thereafter, the prefetch notification unit 24 calculates the time difference between the future time read at Step S800 and the current time (Step S802).

Thereafter, the prefetch notification unit 24 determines whether the time difference calculated at Step S802 is equal to or smaller than the threshold (Step S804). For example, a predetermined fixed value may be used as the threshold, or a value dynamically changing in execution may be used. As another example, a plurality of thresholds may be set. Even when any threshold is set, the time difference decreases as the current time becomes closer to the future time, and the time difference becomes equal to or smaller than the threshold, at the time when the current time exceeds a certain time.

When the time difference is larger than the threshold (No at Step S804), the present routine is ended. By contrast, when the time difference is equal to or smaller than the threshold (Yes at Step S804), the process proceeds to Step S806.

At Step S806, the prefetch notification unit 24 determines whether the time difference calculated at Step S802 is smaller than the value calculated in the previous iteration. Specifically, the prefetch notification unit 24 determines whether the time difference has been reduced (Step S806). When the time difference has not been reduced (No at Step S806), the present routine is ended. By contrast, when the time difference has been reduced (Yes at Step S806), the process proceeds to Step S808.

At Step S808, the prefetch notification unit 24 reduces the values of the transmission possible time corresponding to the respective transmission queues in the transmission possible time information 36A (Step S808). Thereafter, the present routine is ended.

As described above, the future time is updated to a proper value, when scheduling of a new frame is performed or prefetching of the entry 34D in the transmission scheduling information 34A is performed. Accordingly, when a state in which neither scheduling nor prefetching is performed is continued, update of the future time is stopped. By contrast, the current time gradually becomes closer to the future time, as the time lapses. In this manner, there are cases where the time difference between the current time and the future time becomes equal to or smaller than the threshold used for determination at Step S804. Accordingly, in the present embodiment, the prefetch notification unit 24 forcibly reduces the values of the transmission possible time of the respective transmission queues registered in the transmission possible time information 36A, as described above (see Step S808 described above).

The processing reduces the values of the transmission possible time of the respective transmission queues, before the current time reaches the future time, even in the case where the schedulability evaluation unit 22 determines that no frame for which scheduling is possible exists.

As described above, when the transmission possible time of each of the transmission queues becomes "0", the prefetch unit 20 that has received a prefetching instruction from the prefetch notification unit 24 prefetches the next entry 34D, and updates the future time stored in the future time storage

38. With this structure, a certain margin can always be secured between the future time and the current time.

Transmission Processing

Figure 18:
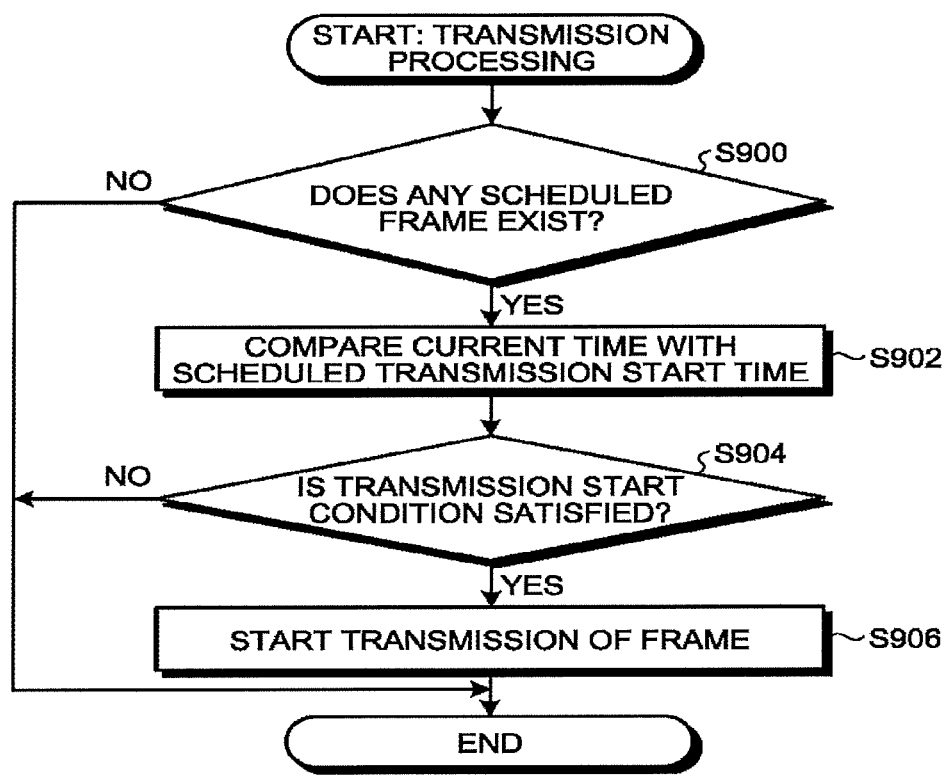
FIG. 18 is a detailed flowchart of transmission processing.
Figure 19:
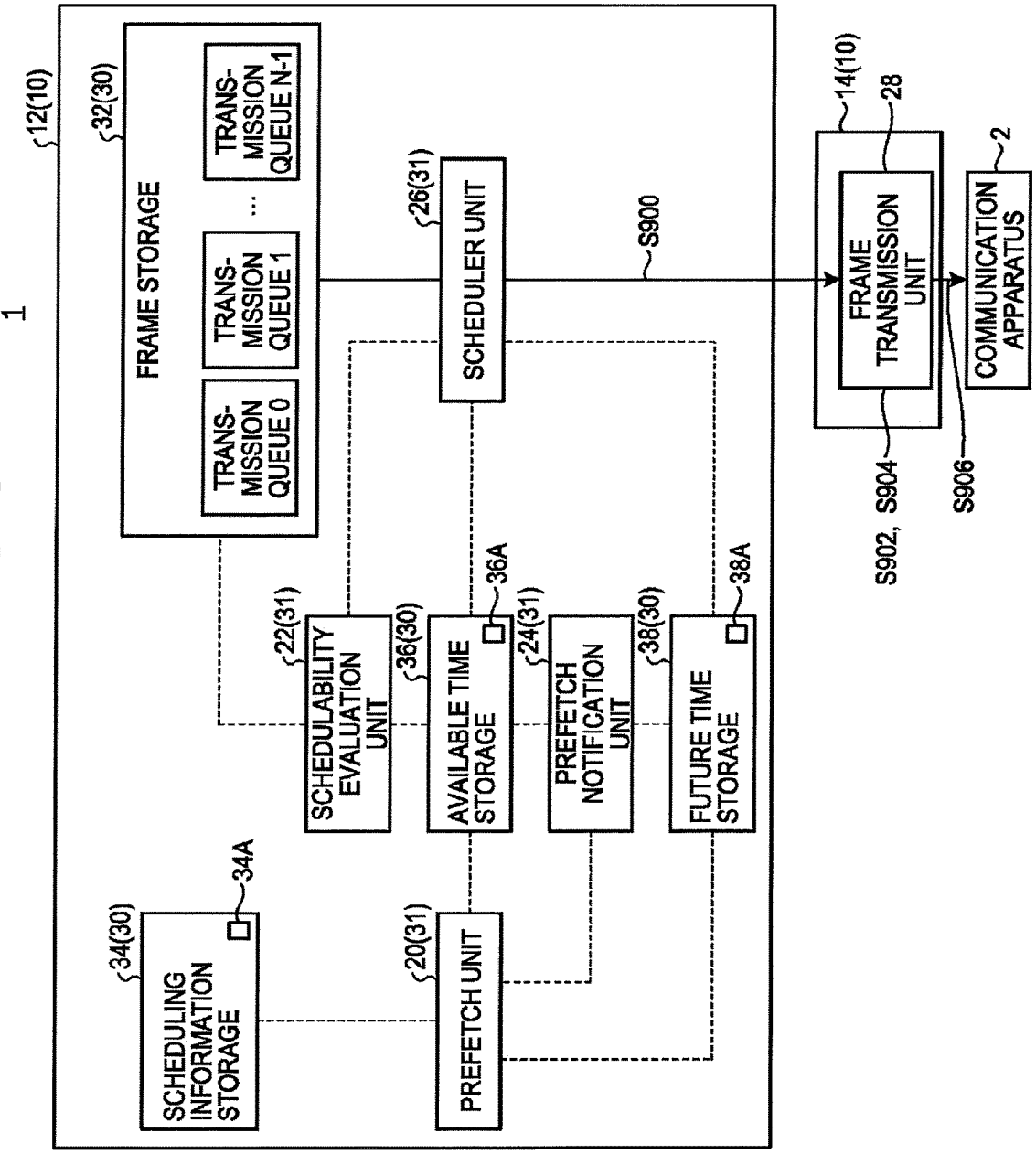
FIG. 19 is a schematic diagram illustrating a flow of the transmission processing.

FIG. 18 is a detailed flowchart of the transmission processing at Step S102 (see FIG. 4). FIG. 19 is a schematic diagram illustrating a flow of the transmission processing.

The frame transmission unit 28 determines whether any scheduled frame exists (Step S900). For example, the frame transmission unit 28 performs determination at Step S900, by determining whether it has received a notification of the frame for which scheduling has been completed and the scheduled transmission start time from the scheduler unit 26. The frame transmission unit 28 may buffer the frame and the scheduled transmission start time received from the scheduler unit 26.

When no scheduled frame exists (No at Step S900), the present routine is ended. By contrast, when any scheduled frame exists (Yes at Step S900), the process proceeds to Step S902.

At Step S902, the frame transmission unit 28 compares the current time with the scheduled transmission start time (Step S902). The current time used in the frame transmission unit 28 is same as the current time used in the host 12. The frame transmission unit 28 determines whether a result of comparison at Step S902 satisfies the transmission start condition (Step S904). An explanation of the transmission start condition is omitted herein, because it has been described above. For example, the frame transmission unit 28 determines whether the current time agrees with the scheduled transmission start time.

When the transmission start condition is satisfied (Yes at Step S904), the frame transmission unit 28 starts transmission of the frame, for the frame for which the scheduled transmission start time has been scheduled (Step S906).

For example, the frame transmission unit 28 starts transmission of the frame, when the current time agrees with the scheduled transmission start time. As another example, the frame transmission unit 28 may start transmission of the frame, when the current time has passed the scheduled transmission start time. The frame transmission unit 28 may start transmission of the frame, when the current time has passed the scheduled transmission start time and the time difference between the current time and the scheduled transmission start time is equal to or smaller than the predetermined value.

The frame transmission unit 28 may cancel transmission of the frame, when the current time has passed the scheduled transmission start time and the time difference between the current time and the scheduled transmission start time is larger than the predetermined value. In this case, the frame transmission unit 28 may perform any exception processing for the frame for which transmission has been canceled. Specifically, the frame transmission unit 28 may discard the frame for which transmission has been canceled, or put the frame again into the transmission queue of the frame storage 32. In this case, the frame transmission unit 28 may notify the upper application of information relating to the frame for which transmission has been canceled.

Thereafter, the present routine is ended. The transmission device 14 repeatedly performs the transmission processing illustrated in FIG. 18. Specifically, after negative determination is made at Step S900 (No at Step S900), negative determination is made at Step S904 (No at Step S904), or the processing at Step S906 is ended, the process returns to Step S900 again, to repeatedly perform the process from Step S900 to Step S906. This structure enables the transmission device 14 to repeatedly perform the transmission processing continuously.

As described above, the information processing apparatus 10 according to the present embodiment includes the prefetch unit 20 and the scheduler unit 26. The prefetch unit 20 prefetches the entry 34D corresponding to the maintaining timing coming in the future after the current time, in the transmission scheduling information 34A including one or more entries 34D each providing the transmission possible/impossible state (gate state) of each of one or more transmission queues and the maintaining timing of the transmission possible/impossible state. The scheduler unit 26 schedules the scheduled transmission start time of the frame retained in the transmission queue and waiting for transmission, on the basis of the prefetched entry 34D.

As described above, the information processing apparatus 10 according to the present embodiment has the structure in which the scheduler unit 26 schedules the scheduled transmission start time of the frame, on the basis of the entry 34D prefetched with the prefetch unit 20, in the transmission scheduling information 34A.

Accordingly, the information processing apparatus 10 according to the present embodiment enables scheduling for transmission timing control with high accuracy.

In addition, the frame transmission unit 28 starts transmission of the frame, on the basis of the scheduled transmission start time scheduled with the scheduler unit 26. This structure enables the information processing apparatus 10 according to the present embodiment to achieve strict transmission control, on the basis of the transmission scheduling information 34A, in addition to the effect described above. Specifically, the information processing apparatus 10 according to the present embodiment is capable of guaranteeing the transmission timing of data requiring real-time communication, in addition to the effect described above.

In addition, the information processing apparatus 10 according to the present embodiment is capable of achieving at least part of the functions (prefetch unit 20, schedulability evaluation unit 22, prefetch notification unit 24, and scheduler unit 26) of the processor 31 with software.

With this structure, the information processing apparatus 10 according to the present embodiment is capable of providing the information processing apparatus 10 capable of being flexibly compatible with improvement and changes, in comparison with the case of achieving all the functions of the processor 31 with hardware. In addition, the information processing apparatus 10 according to the present embodiment is capable of achieving complicated scheduling processing, and achieving reduction in difficulty in design and implementation, and reduction in required hardware resources. The information processing apparatus 10 according to the present embodiment also enables combination of any traffic shaping algorithm (such as Credit Eased Shaper of IEEE 802.1Qav) and transmission control by gate control of the IEEE 802.1Qbv standard.

In addition, the information processing apparatus 10 according to the present embodiment has the structure in which the prefetch unit 20 prefetches the entry 34D, the scheduler unit 26 schedules the scheduled transmission start time of the frame, and the frame transmission unit 20 transmits the frame. With this structure, the information processing apparatus 10 according to the present embodiment is capable of clearly separating the timing to prefetch the entry 34D, the timing to schedule the scheduled transmission start time, and the timing to actually transmit the frame from each other, and implementing them individually.

This structure enables the information processing apparatus 10 according to the present embodiment to achieve both securement of flexibility in implementation and strict transmission timing control.

In addition, each of the transmission queues is retained in the frame storage 32 provided in the host 12. This structure enables flexible change of the size of each of the transmission queues and the number of transmission queues as desired.

The information processing apparatus 10 according to the present embodiment enables achievement of the functions of the frame transmission unit 28 with hardware. With this structure, the information processing apparatus 10 according to the present embodiment is capable of controlling the transmission timing with higher accuracy, in comparison with the case of achieving the frame transmission unit 28 with software.

Specific Example

The following is an explanation of information processing performed with the information processing apparatus 10 according to the present embodiment, with a specific example. The present specific example illustrates the case where the transmission scheduling information is a gate control list provided in the IEEE 802.1Qbv, as an example, but the present invention is not limited thereto. In the same manner, the present specific example illustrates the case of using the gate control list 34B as an example of the gate control list, but the present invention is not limited thereto.

Transmission Scheduling Information

First, the following is an explanation of an example of the transmission scheduling information 34A. The transmission scheduling information 34A is, for example, information as illustrated in FIG. 2.

As explained above with reference to FIG. 2, in the example illustrated in FIG. 2, the transmission scheduling information 34A includes the gate control list 34B and the other parameters 34C.

In the example illustrated in FIG. 2, the transmission scheduling information 34A is formed of eight entries 34D (entry 34D0 to entry 34D7), and the eight entries 34D are provided with respective list indexes of 0 to 7. As described above, the mark "o" expressed in the gate state indicates "valid" (open) indicating that transmission is possible, and the mark "C" indicates "invalid" (close) indicating that transmission is impossible.

For example, the gate state "CCCCCCCo" of the entry 34D7 with the list index "7" in FIG. 2 indicates the transmission possible/impossible state (open or close) of each of the transmission queues in the frame storage 32. As described above, the present embodiment illustrates the case where the frame storage 32 includes eight transmission queues (transmission queue 0 to transmission queue 7). Accordingly, the gate state "CCCCCCCo" of the entry 34D7 with the list index "7" indicates that transmission queue 1 to transmission queue 7 are invalid (close), and transmission queue 0 is valid (open).

Specifically, in this case, the gate state indicates that only the transmission queue 0 is provided with permission for transmission.

The example illustrated in FIG. 2 illustrates the case where only one transmission queue is valid (open: o) in the gate state of each entry 34D. However, in a more general case, a plurality of transmission queues may be valid (open: o) in the gate state of each entry 34D.

In addition, the example illustrated in FIG. 2 illustrates the case where all the time intervals included in the respective entries 34D are set to the same value (2,500 nanoseconds). However, in a more general case, time intervals having values different from each other among the entries 34D may be set. FIG. 2 illustrates the case where the gate control list 34B includes the eight entries 34D, as an example. However, the number of entries 34D included in the gate control list 34B is not limited to eight.

In addition, FIG. 2 illustrates the case of including eight transmission queues, in accordance with the IEEE 802.1Qbv standard. However, transmission queues of any number may be supposed.

Periodicity of Gate State

Figure 20:
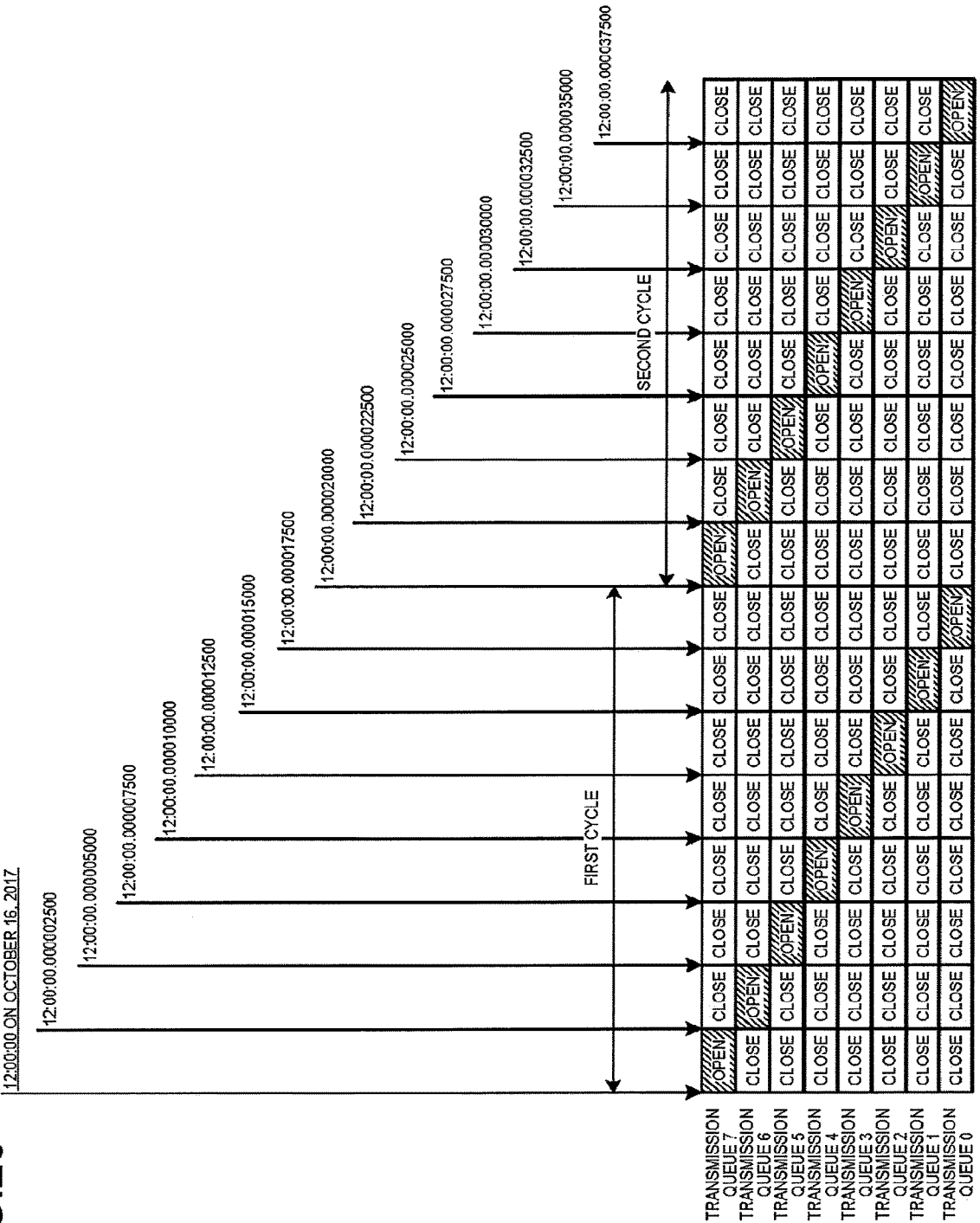
FIG. 20 is a diagram illustrating an example of typical periodicity of a gate state.
Figure 21:
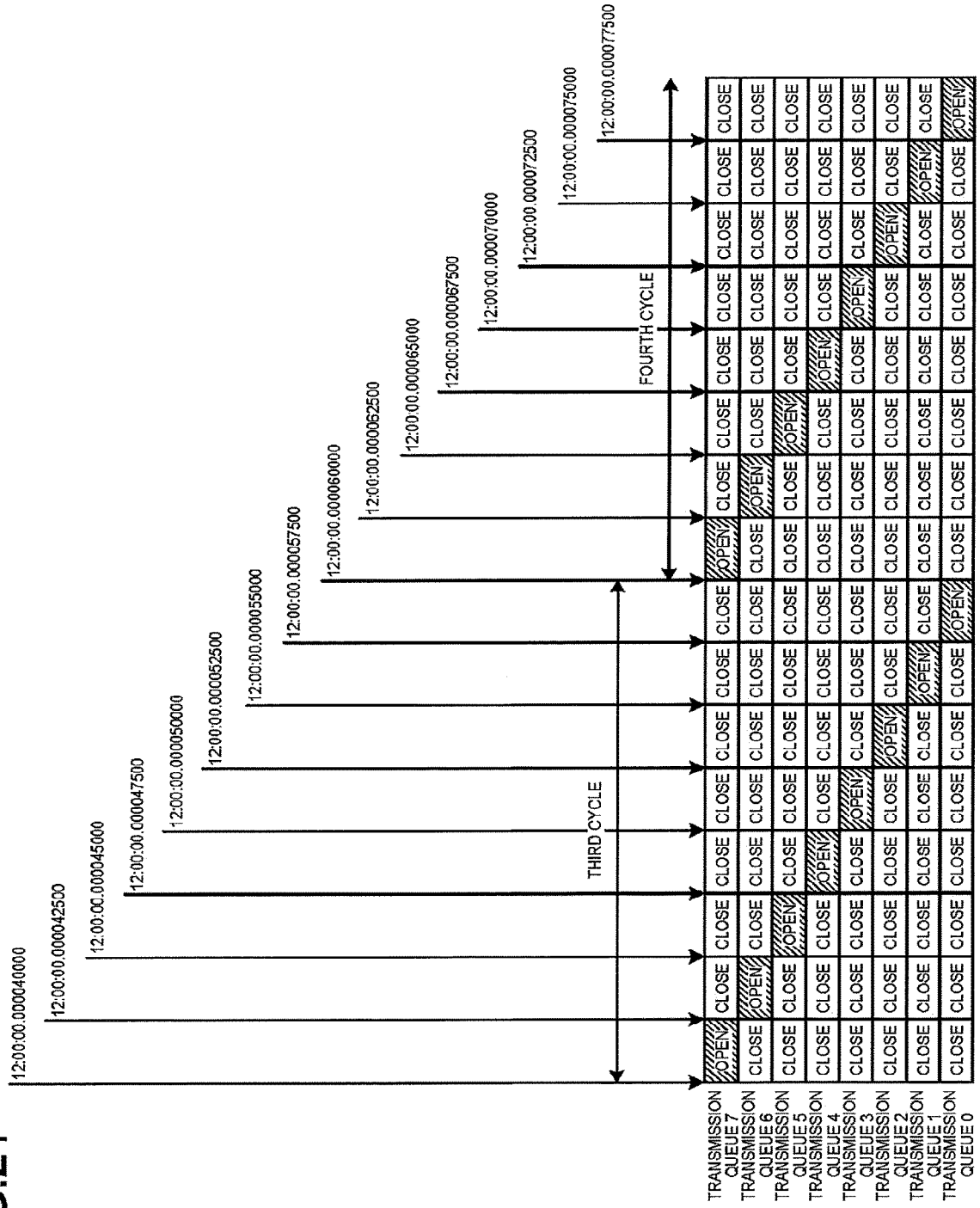
FIG. 21 is a diagram illustrating an example of typical periodicity of the gate state.

The following is an explanation of periodicity of the gate state. FIG. 20 and FIG. 21 are diagrams illustrating examples of typical periodicity of the gate state. The periodicity of the gate state is defined, on the basis of the transmission scheduling information 34A. For example, FIG. 20 is defined on the basis of the transmission scheduling information 34A illustrated in FIG. 2, and illustrates an example of the gate state in the first cycle and the second cycle of each of the transmission queues. The start time of each of the cycles can be determined with the gate control start time (12:00:00 on Oct. 16, 2017) and the gate control cycle time (20 microseconds) included in the transmission scheduling information 34A in FIG. 2.

The start time of the nth cycle can be expressed with the following Expression (1).

$$\text{Start time of the } n\text{th cycle} = \text{gate control start time} + (n-1) \times \text{gate control cycle time} \quad \text{Expression (1)}$$

In Expression (1), n is an integer of 1 or more.

In the example of FIG. 20, the start time of the first cycle is 12:00:00 on Oct. 16, 2017 designated as the gate control start time. The start time of the second cycle is 12:00:00.000020000 that is the time 20 microseconds after the gate control start time.

FIG. 21 illustrates an example of the gate state of the third cycle and the fourth cycle of each of the transmission queues. The start time of the third cycle is 12:00:00.000040000 that is the time 40 microseconds after the gate control start time. The start time of the fourth cycle is 12:00:00.000060000 that is the time 60 microseconds after the gate control start time.

When transmission processing of each of the cycles is started, the gate state of each of the transmission queues is determined, on the basis of the order set in the entry 34D of the gate control list 34B. In the example of FIG. 20, during the period of 2,500 nanoseconds from the start time (12:00:00) of the first cycle, the transmission possible/impossible states of the respective transmission queues are determined with the gate state (oCCCCCCC) of the list index "0". Thereafter, during the period of 2,500 nanoseconds from 12:00:00.000002500, the transmission possible/impossible states of the respective transmission queues are determined with the gate state (CoCCCCCC) of the list index "1".

In addition, during the period of 2,500 nanoseconds from 12:00:00.000005000, the transmission possible/impossible states of the respective transmission queues are determined with the gate state (CCoCCCCC) of the list index "2".

As described above, the gate state of each of the transmission queues and the time interval of each of the states are determined, in accordance with the order from the list index "0" to the list index "7" indicated in the gate control list 34B.

Lastly, in the example of FIG. 20, during the period of 2,500 nanoseconds from 12:00:00.000017500, the transmission possible/impossible states of the respective transmission queues are determined with the gate state (CCCCCCCo) of the list index "7", and the first cycle is ended.

Prefetching and Scheduling Processing

The following is an explanation of the prefetching processing and the scheduling processing in a typical operation scenario.

Figure 22:
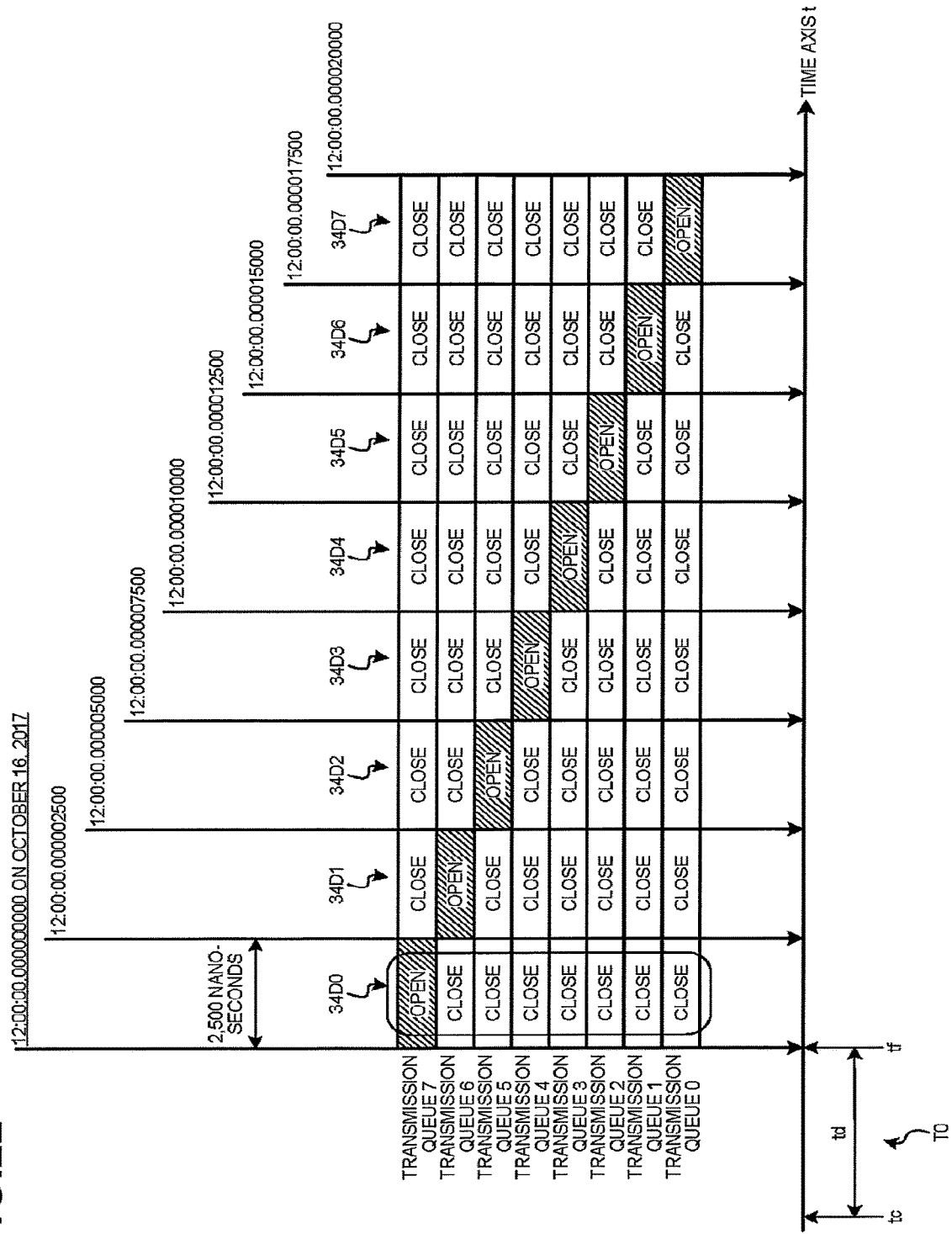
FIG. 22 is a diagram illustrating a state immediately after initialization.

FIG. 22 is a diagram illustrating the current time tc, the future time tf, and the time difference td between the current time tc and the future time tf (see timing T0), at the time immediately after initialization. FIG. 23 is a diagram illustrating the current time, the future time, the values of the transmission possible time, the values of the required transmission time, the scheduled frame, and the scheduled transmission start time thereof, at the time immediately after initialization.

In initialization, the prefetch unit 20 performs initialization processing explained with reference to FIG. 6 and FIG. 7. In the example illustrated in FIG. 22 and FIG. 23, the prefetch unit 20 sets the gate control start time included in the transmission scheduling information 34A, as the future time tf, and assigns the transmission possible time of 2,500 nanoseconds to the transmission queue 7.

Specific Example 1 of Scheduling Processing

Figure 24:
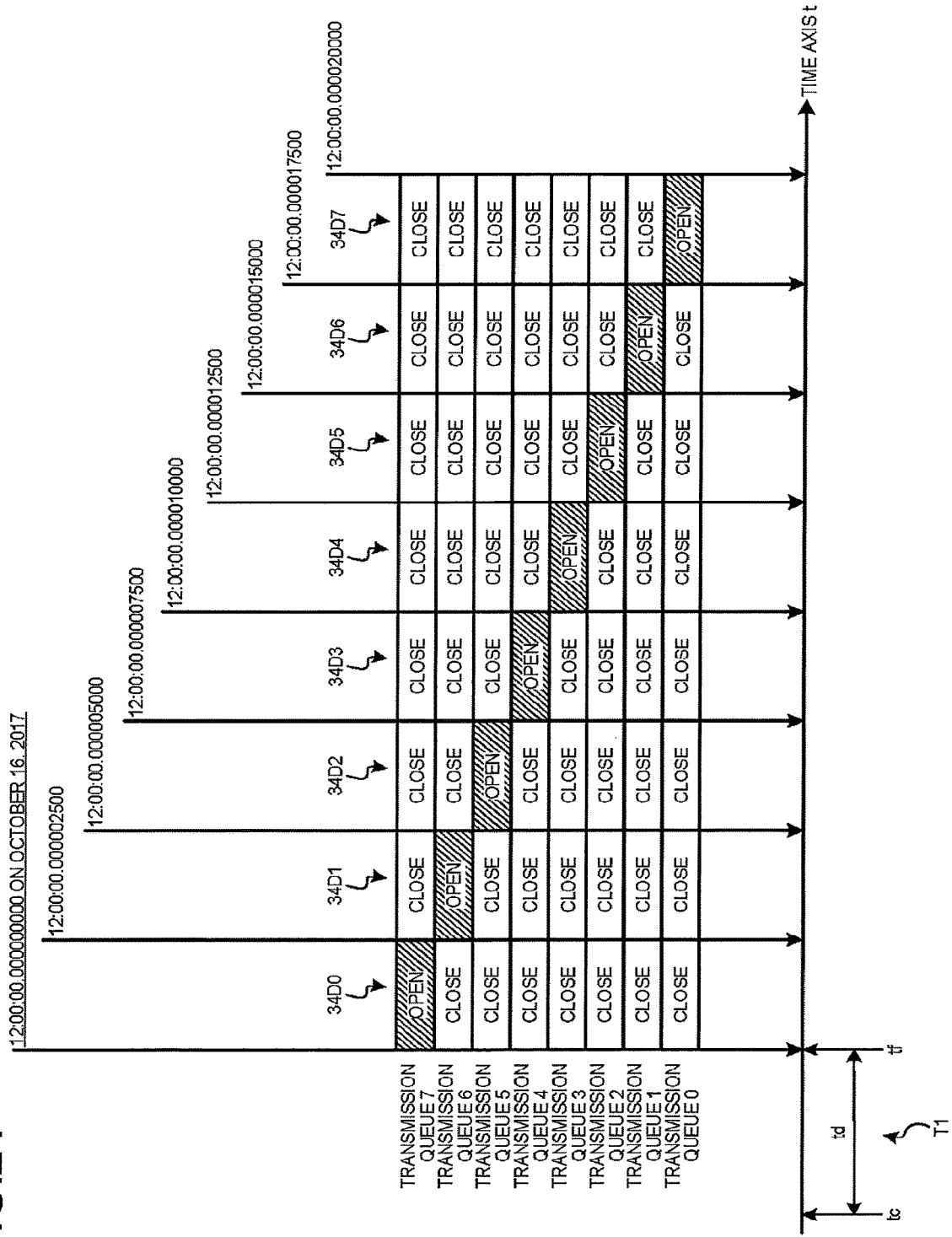
FIG. 24 is a diagram illustrating a state at the time 0.001 second after initialization.

FIG. 24 is a diagram illustrating the current time tc, the future time tf, and the time difference td between the current time tc and the future time tf (see timing T1), at the time 0.001 second after initialization. FIG. 25 is a diagram illustrating the current time, the future time, the values of the transmission possible time, the values of the required transmission time, the scheduled frame, and the scheduled transmission start time thereof, at the time 0.001 second after initialization. FIG. 25 illustrates an example of the case where a frame f0 with the required transmission time of 1,000 nanoseconds is written to the transmission queue 7 at the time 0.001 second after initialization.

In the example illustrated in FIG. 25, the required transmission time of the frame f0 is equal to or smaller than the transmission possible time of the transmission queue 7. Accordingly, the schedulability evaluation unit 22 determines that scheduling of the scheduled transmission start time of the frame f0 is possible (see reference numeral 60 in FIG. 25). As a result, the scheduler unit 26 schedules the future time (12:00:00.000000000 on Oct. 16, 2017) at the time 0.001 second after initialization, as the scheduled transmission start time of the frame f0.

FIG. 26 is a diagram illustrating the current time tc, the future time tf, and the time difference td between the current time tc and the future time tf (see timing T2), at the time 0.002 second after initialization. FIG. 27 is a diagram illustrating the current time, the future time, the values of the transmission possible time, the values of the required transmission time, the scheduled frame, and the scheduled transmission start time thereof, at the time 0.002 second after initialization. FIG. 27 illustrates an example at the time 0.002 second after initialisation and after the frame f0 has been scheduled.

In the scheduling, the schedulability evaluation unit 22 and the scheduler unit 26 perform the determination processing, the scheduling processing, and the first post processing explained with reference to FIG. 10 to FIG. 15.

Specific Example 2 of Scheduling Processing

Figure 28:
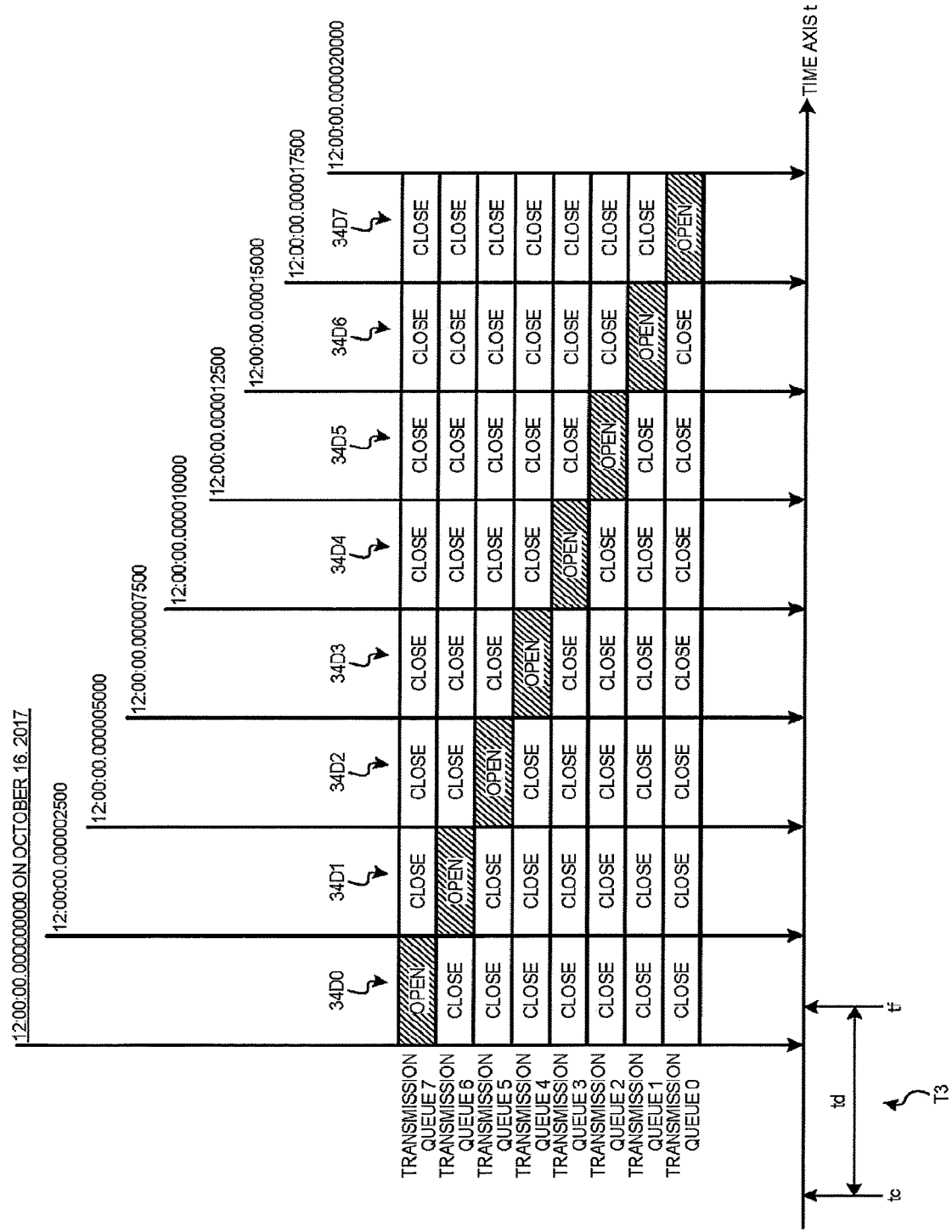
FIG. 28 is a diagram illustrating a state at the time 0.003 second after initialization.

FIG. 28 is a diagram illustrating the current time tc, the future time tf, and the time difference td between the current time tc and the future time tf (see timing T3), at the time 0.003 second after initialization. FIG. 29 is a diagram illustrating the current time, the future time, the values of the transmission possible time, the values of the required transmission time, the scheduled frame, and the scheduled transmission start time thereof, at the time 0.003 second after initialization. FIG. 29 illustrates an example of the case where a frame f1 with the required transmission time of 1,200 nanoseconds is written to the transmission queue 7 at the time 0.003 second after initialization.

In the example of FIG. 29, the required transmission time of the frame f1 is equal to or smaller than the transmission possible time of the transmission queue 7 (see reference numeral 62). Accordingly, the schedulability evaluation unit 22 determines that scheduling of the scheduled transmission start time of the frame f1 is possible. As a result, the scheduler unit 26 schedules the future time (12:00:00.000001000 on Oct. 16, 2017) at the time 0.003 second after initialization, as the scheduled transmission start time of the frame f1.

FIG. 30 is a diagram illustrating the current time tc, the future time tf, and the time difference td between the current time tc and the future time tf (see timing T4), at the time 0.004 second after initialization. FIG. 31 is a diagram illustrating the current time, the future time, the values of the transmission possible time, the values of the required transmission time, the scheduled frames, and the values of the scheduled transmission start time thereof, at the time 0.004 second after initialization. FIG. 31 illustrates an example at the time 0.004 second after initialization and after the frame f1 has been scheduled.

In the scheduling, the schedulability evaluation unit 22 and the scheduler unit 26 perform the determination processing, the scheduling processing, and the first post processing explained with reference to FIG. 10 to FIG. 15.

Specific Example of Clearing the Transmission Possible Time to Zero

Figure 32:
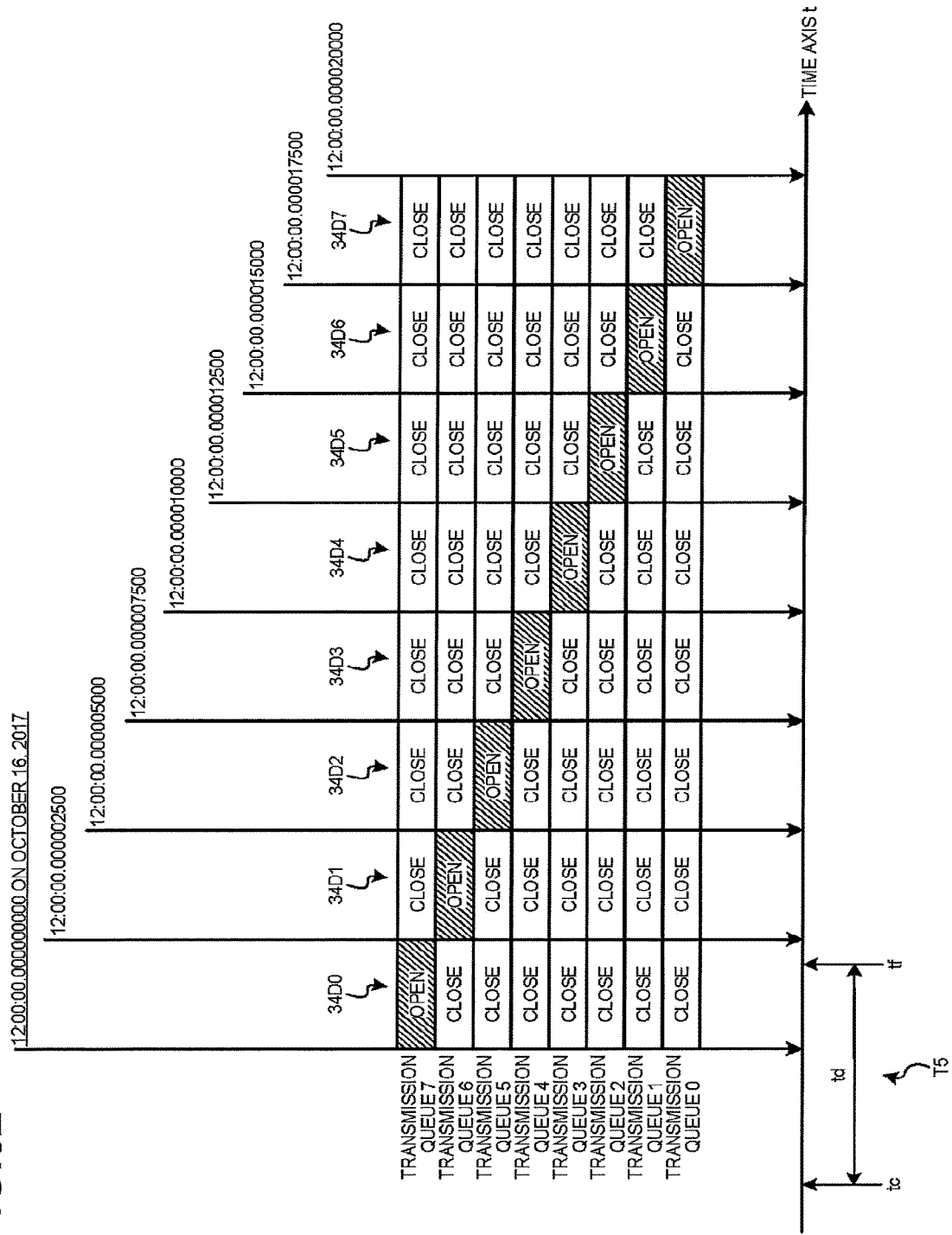
FIG. 32 is a diagram illustrating a state at the time 0.005 second after initialization.

FIG. 32 is a diagram illustrating the current time tc, the future time tf, and the time difference td between the current time tc and the future time tf (see timing T5), at the time 0.005 second after initialization. FIG. 33 is a diagram illustrating the current time, the future time, the values of the transmission possible time, the values of the required transmission time, the scheduled frames, and the values of the scheduled transmission start time thereof, at the time 0.005 second after initialization. FIG. 33 illustrates an example of the case where a frame f2 with the required transmission time of 1,500 nanoseconds is written to the transmission queue 7 at the time 0.005 second after initialization.

In the example of FIG. 33, the required transmission time of the frame f2 is larger than the transmission possible time of the transmission queue 7. Accordingly, the schedulability evaluation unit 22 determines that scheduling of the scheduled transmission start time of the frame f2 is impossible.

FIG. 34 is a diagram illustrating the current time tc, the future time tf, and the time difference td between the current time tc and the future time tf (see timing T6), at the time 0.006 second after initialization. FIG. 35 is a diagram illustrating the current time, the future time, the values of the transmission possible time, the values of the required transmission time, the scheduled frames, and the values of the scheduled transmission start time thereof, at the time 0.006 second after initialization. FIG. 35 illustrates an example at the time 0.006 second after initialization and after the transmission possible time of the transmission queue 7 has been cleared to "0". In the zero clear processing, the schedulability evaluation unit 22 performs a series of processes including the processing of changing the transmission possible time to zero, explained with reference to FIG. 10 and FIG. 11.

Specific Example 1 of Prefetching Processing

FIG. 36 is a diagram illustrating the current time tc, the future time tf, and the time difference td between the current time tc and the future time tf (see timing T7), at the time 0.007 second after initialization. FIG. 37 is a diagram illustrating the current time, the future time, the values of the transmission possible time, the values of the required transmission time, the scheduled frames, and the values of the scheduled transmission start time thereof, at the time 0.007 second after initialization. FIG. 37 illustrates an example at the time 0.007 second after initialization and after the entry 34D1 of the list index "1" has been prefetched in the gate control list 34B.

In prefetching processing, the prefetch unit 20 and the prefetch notification unit 24 perform a series of processes explained with reference to FIG. 8 and FIG. 9.

In the example illustrated in FIG. 36 and FIG. 37, the prefetch unit 20 updates the future time to 12:00:00.000002500 on Oct. 16, 2017, and assigned the transmission possible time of 2,500 nanoseconds to the transmission queue 6.

Specific Example 3 of Scheduling Processing

FIG. 38 is a diagram illustrating the current time tc, the future time tf, and the time difference td between the current time tc and the future time tf (see timing T8), at the time 0.008 second after initialization. FIG. 39 is a diagram illustrating the current time, the future time, the values of the transmission possible time, the values of the required transmission time, the scheduled frames, and the values of the scheduled transmission start time thereof, at the time 0.008 second after initialization. FIG. 39 illustrates an example of the case where a frame f3 with the required transmission time of 1,000 nanoseconds is written to the transmission queue 6 at the time 0.008 second after initialization.

In the example of FIG. 39, the required transmission time of the frame f3 is equal to or smaller than the transmission possible time of the transmission queue 6. Accordingly, the schedulability evaluation unit 22 determines that scheduling of the frame f3 is possible. As a result, the scheduler unit 26 schedules the future time (12:00:00.000002500 on Oct. 16, 2017) at the time 0.008 second after initialization, as the scheduled transmission start time of the frame f3.

Figure 40:
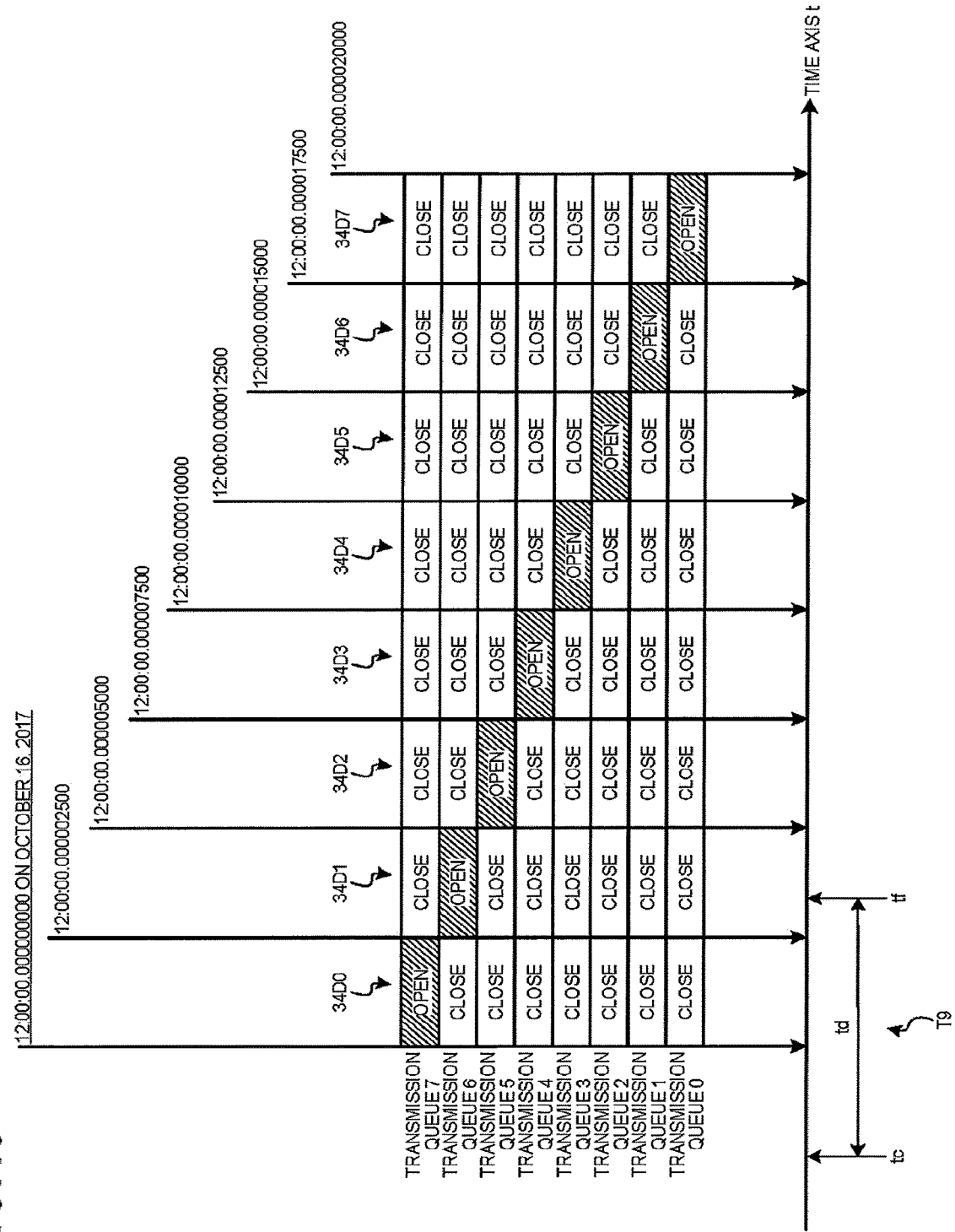
FIG. 40 is a diagram illustrating a state at the time 0.009 second after initialization.

FIG. 40 is a diagram illustrating the current time tc, the future time tf, and the time difference td between the current time tc and the future time tf (see timing T9), at the time 0.009 second after initialization. FIG. 41 is a diagram illustrating the current time, the future time, the values of the transmission possible time, the values of the required transmission time, the scheduled frames, and the values of the scheduled transmission start time thereof, at the time 0.009 second after initialization. FIG. 41 illustrates an example at the time 0.009 second after initialization and after the frame f3 has been scheduled.

In the scheduling, the schedulability evaluation unit 22 and the scheduler unit 26 perform the determination processing, the scheduling processing, and the first post processing explained with reference to FIG. 10 to FIG. 15.

Specific Example 4 of Scheduling Processing

FIG. 42 is a diagram illustrating the current time tc, the future time tf, and the time difference td between the current time tc and the future time tf (see timing T10), at the time 0.010 second after initialization. FIG. 43 is a diagram illustrating the current time, the future time, the values of the transmission possible time, the values of the required transmission time, the scheduled frame, and the scheduled transmission start time thereof, at the time 0.010 second after initialization. FIG. 43 illustrates an example of the case where a frame f4 with the required transmission time of 1,500 nanoseconds is written to the transmission queue 6 at the time 0.010 second after initialization.

In the example of FIG. 43, the required transmission time of the frame f4 is equal to the transmission possible time of the transmission queue 6. Accordingly, the schedulability evaluation unit 22 determines that scheduling of the scheduled transmission start time of the frame f4 is possible. As a result, the scheduler unit 26 schedules the future time (12:00:00.000003500 on Oct. 16, 2017) at the time 0.010 second after initialization, as the scheduled transmission start time of the frame f4.

FIG. 44 is a diagram illustrating the current time tc, the future time tf, and the time difference td between the current time tc and the future time tf (see timing T11), at the time 0.011 second after initialization. FIG. 45 is a diagram illustrating the current time, the future time, the values of the transmission possible time, the values of the required transmission time, the scheduled frames, and the values of the scheduled transmission start time thereof, at the time 0.011 second after initialization. FIG. 45 illustrates an example at the time 0.011 second after initialization and after the frame f4 has been scheduled.

In the scheduling, the schedulability evaluation unit 22 and the scheduler unit 26 perform the determination processing, the scheduling processing, and the first post processing explained with reference to FIG. 10 to FIG. 15.

Specific Example 2 of Prefetching Processing

Figure 46:
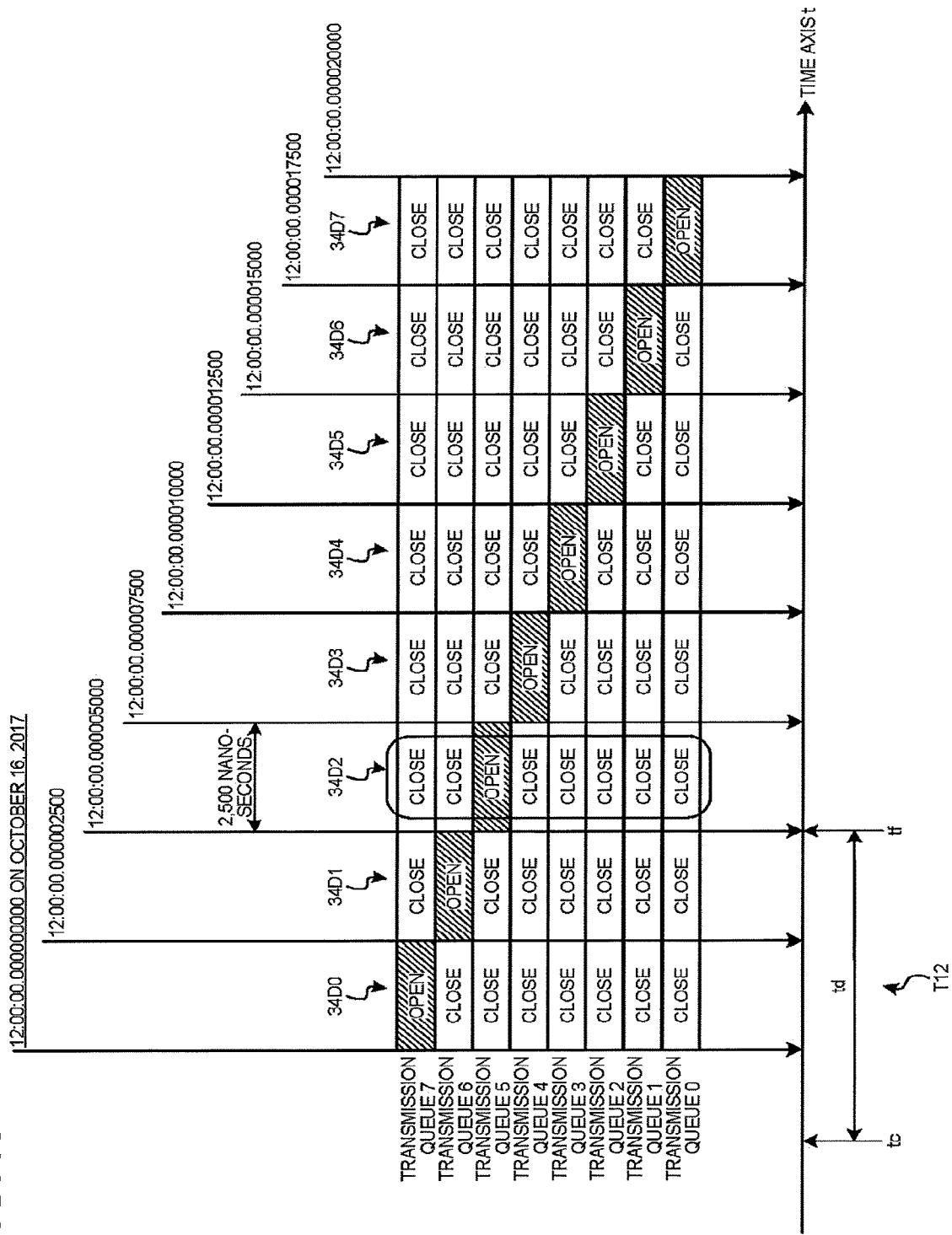
FIG. 46 is a diagram illustrating a state at the time 0.012 second after initialization.

FIG. 46 is a diagram illustrating the current time tc, the future time tf, and the time difference td between the current time tc and the future time tf (see timing T12), at the time 0.012 second after initialization. FIG. 47 is a diagram illustrating the current time, the future time, the values of the transmission possible time, the values of the required transmission time, the scheduled frames, and the values of the scheduled transmission start time thereof, at the time 0.012 second after initialization. FIG. 47 illustrates an example at the time 0.012 second after initialization and after the entry 34D2 of the list index "2" has been prefetched in the gate control list 34B.

In prefetching processing, the prefetch unit 20 and the prefetch notification unit 24 perform a series of processes explained with reference to FIG. 8 and FIG. 9.

Figure 48:
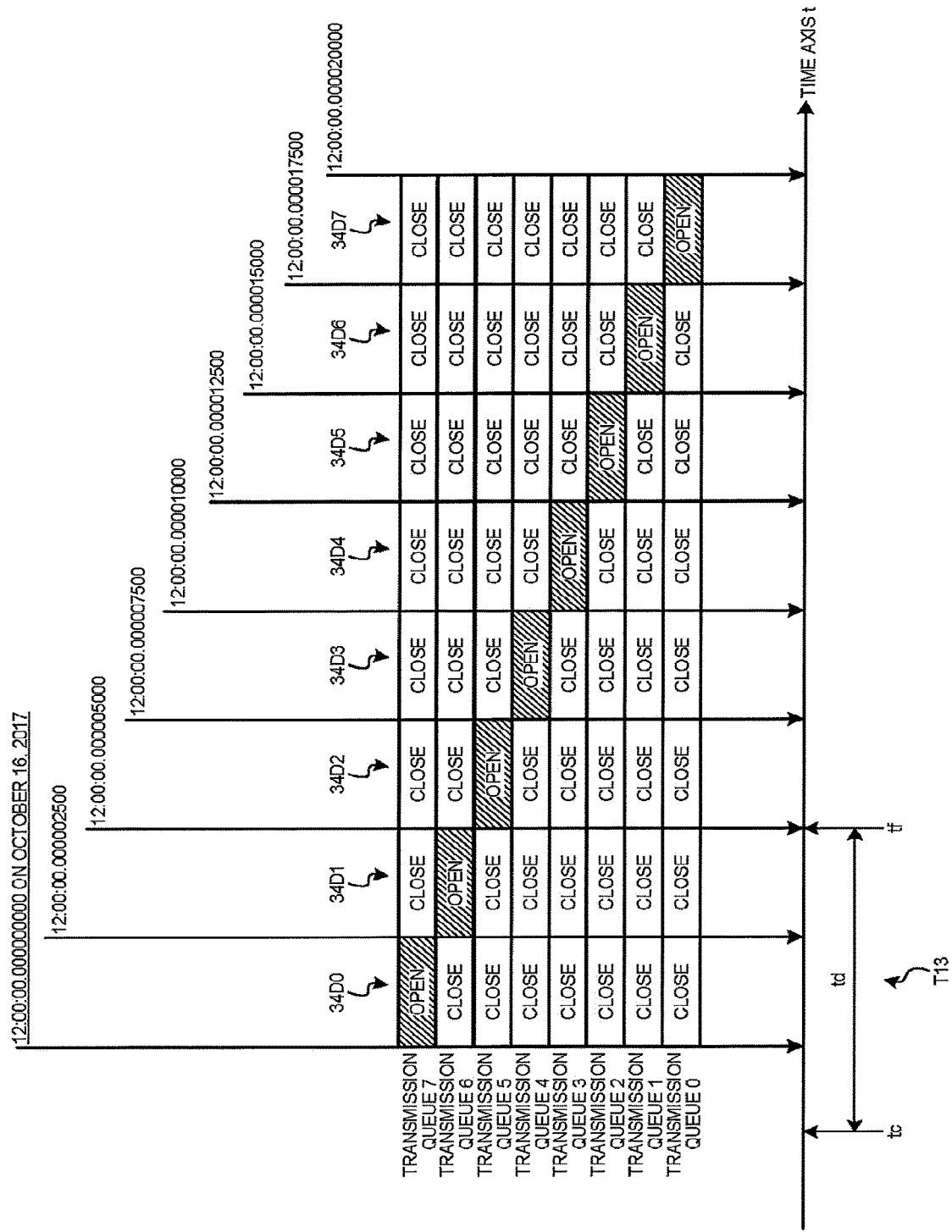
FIG. 48 is a diagram illustrating a state at the time 0.013 second after initialization.

Specific Example of the Case where No Frame for which Scheduling is Possible Exists FIG. 48 is a diagram illustrating the current time tc, the future time tf, and the time difference td between the current time tc and the future time tf (see timing T13), at the time 0.013 second after initialization. FIG. 49 is a diagram illustrating the current time, the future time, the values of the transmission possible time, the values of the required transmission time, the scheduled frames, and the values of the scheduled transmission start time thereof, at the time 0.013 second after initialization. FIG. 49 illustrates an example at the time 0.013 second after initialization and in which no frame for which scheduling is possible exists.

In the example illustrated in FIG. 49, the transmission possible time of the transmission queue 7 is zero see reference numeral 74). Accordingly, the scheduler unit 26 cannot schedule the frame f2 retained in the transmission queue 7.

In addition, the transmission possible time of 2,500 nanoseconds is assigned to the transmission queue 5. Accordingly, sufficient transmission possible time is left for the transmission queue 5. However, because no frames are retained in the transmission queue 5, no new frame can be scheduled.

Accordingly, at the time 0.013 second after initialization, no frame for which scheduling is possible exists.

Specific Example of the Case where Update of the Future Time is Stopped

Figure 50:
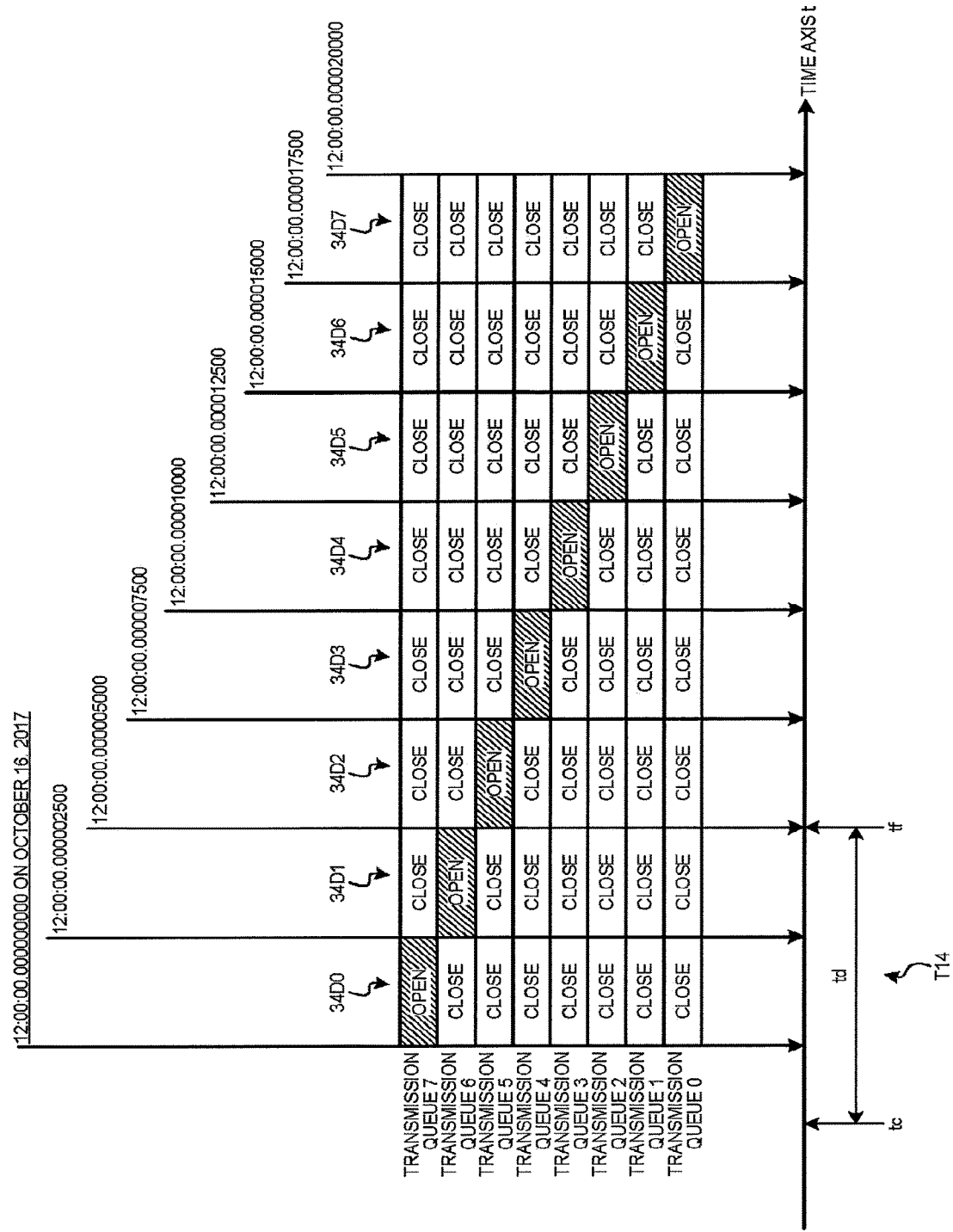
FIG. 50 is a diagram illustrating a state at the time 0.014 second after initialization.

FIG. 50 is a diagram illustrating the current time tc, the future time tf, and the time difference td between the current time tc and the future time tf (see timing T14), at the time 0.014 second after initialization. FIG. 51 is a diagram illustrating the current time, the future time, the values of the transmission possible time, the values of the required transmission time, the scheduled frames, and the values of the scheduled transmission start time thereof, at the time 0.014 second after initialization. FIG. 51 illustrates an example at the time 0.014 second after initialization and the case where update of the future time is stopped.

The future time is updated to a proper value, when scheduling of a new frame is performed or prefetching of the entry 34D in the transmission scheduling information 34A is performed. Accordingly, when the state in which neither scheduling nor prefetching processing is performed continues, update of the future time is stopped.

In the example illustrated in FIG. 51, because neither scheduling of a new frame nor prefetching of the entry 34D has been performed after the time 0.014 second after initialization, update of the future time is completely stopped.

Figure 52:
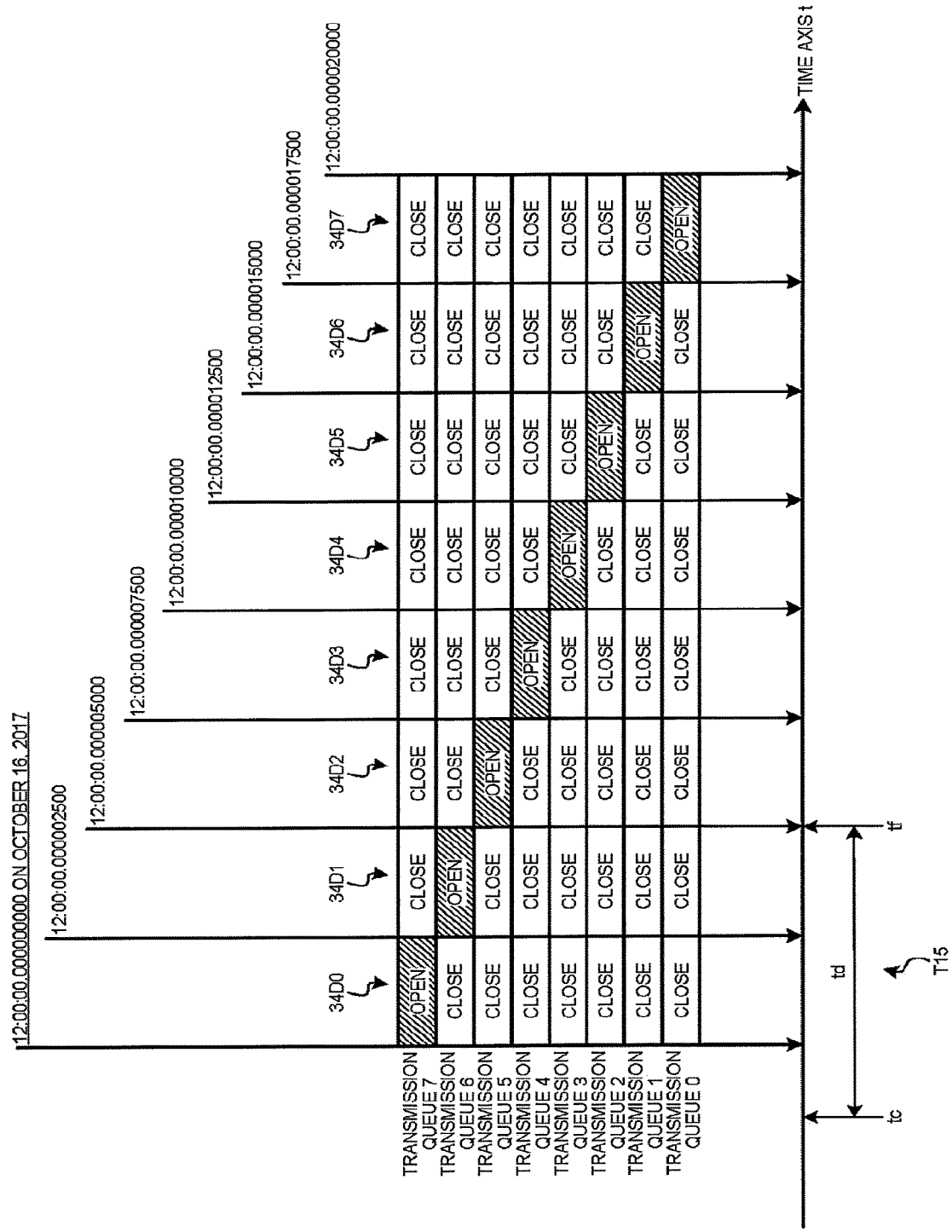
FIG. 52 is a diagram illustrating a state at the time 0.015 second after initialization.
Figure 54:
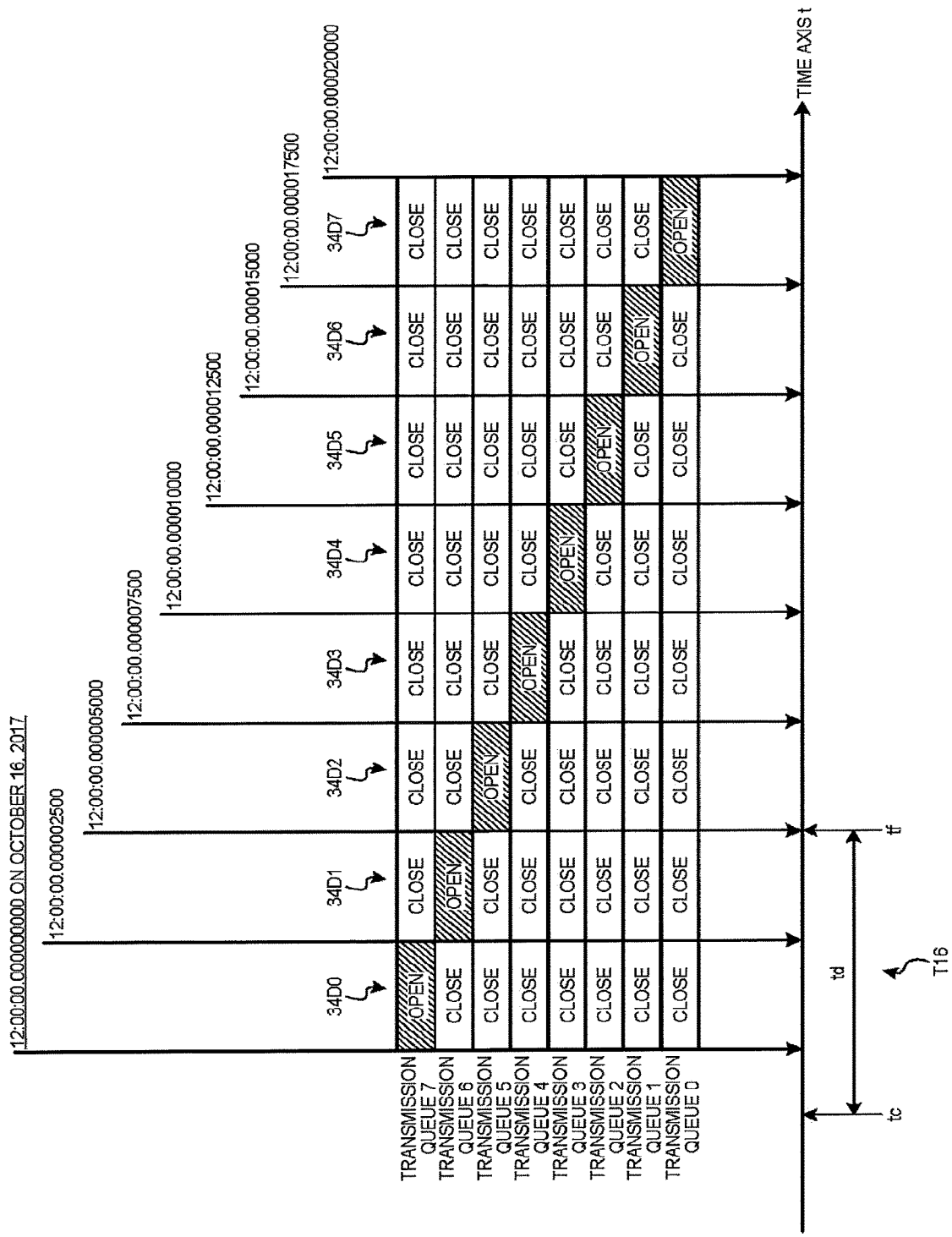
FIG. 54 is a diagram illustrating a state at the time 0.016 second after initialization.
Figure 56:
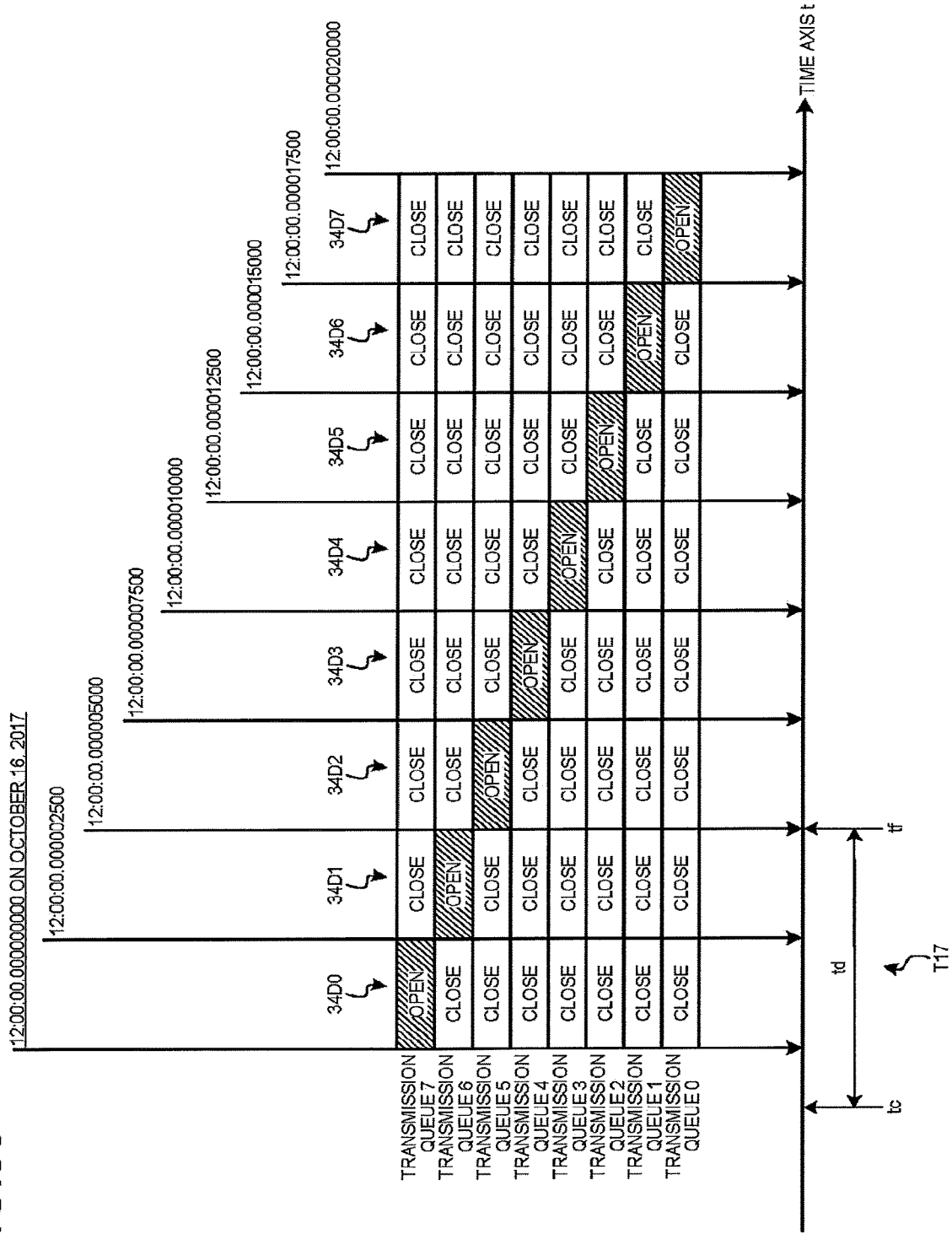
FIG. 56 is a diagram illustrating a state at the time 0.017 second after initialization.

FIG. 52 is a diagram illustrating the current time tc, the future time tf, and the time difference td between the current time tc and the future time tf (see timing T15), at the time 0.015 second after initialization. FIG. 53 is a diagram illustrating the current time, the future time, the values of the transmission possible time, the values of the required transmission time, the scheduled frames, and the values of scheduled transmission start time thereof, at the time 0.015 second after initialization. FIG. 54 is a diagram illustrating the current time tc, the future time tf, and the time difference td between the current time tc and the future time tf (see timing T16), at the time 0.016 second after initialization. FIG. 55 is a diagram illustrating the current time, the future time, the values of the transmission possible time, the values of the required transmission time, the scheduled frames, and the values of the scheduled transmission start time thereof, at the time 0.016 second after initialization. FIG. 56 is a diagram illustrating the current time tc, the future time tf, and the time difference td between the current time tc and the future time tf (see timing T17), at the time 0.017 second of initialization. FIG. 57 is a diagram illustrating the current time, the future time, the values of the transmission possible time, the values of the required transmission time, the scheduled frames, and the values of the scheduled transmission start time thereof, at the time 0.017 second after initialization.

FIG. 53, FIG. 55, and FIG. 57 illustrate respective examples of the cases where update of the future time is stopped at the time 0.015 second after initialization, 0.016 second after initialization, and 0.017 second after initialization, respectively. In the examples of FIG. 53, FIG. 55, and FIG. 57, with advance of the current time, the current time is gradually coming closer to the future time. As a result, the time difference between the current time and the future time is being gradually reduced.

Specific Example of the Case where the Time Difference Between the Current Time and the Future Time has been Reduced FIG. 58 is a diagram illustrating the current time tc, the future time tf, and the time difference td between the current time tc and the future time tf (see timing T18), at the time 0.999985 second after initialization. FIG. 59 is a diagram illustrating the current time, the future time, the values of the transmission possible time, the values of the required transmission time, the scheduled frames, and the values of the scheduled transmission start time thereof, at the time 0.999985 second after initialization. FIG. 59 illustrates an example of the case where the threshold of the time difference between the current time and the future time is set to 20 microseconds.

As described above, any value may be set as the threshold of the time difference. In the example of FIG. 59, the time difference between the current time (11:59:59.999985000 on Oct. 16, 2017) and the future time (12:00:00.000005000 on Oct. 16, 2017) has a value equal to or smaller than the threshold (20 microseconds). This state causes the state of satisfying the condition for performing the second post processing to forcibly reduce the transmission possible time of the transmission queue.

Specific Example 1 of Second Post Processing

Figure 60:
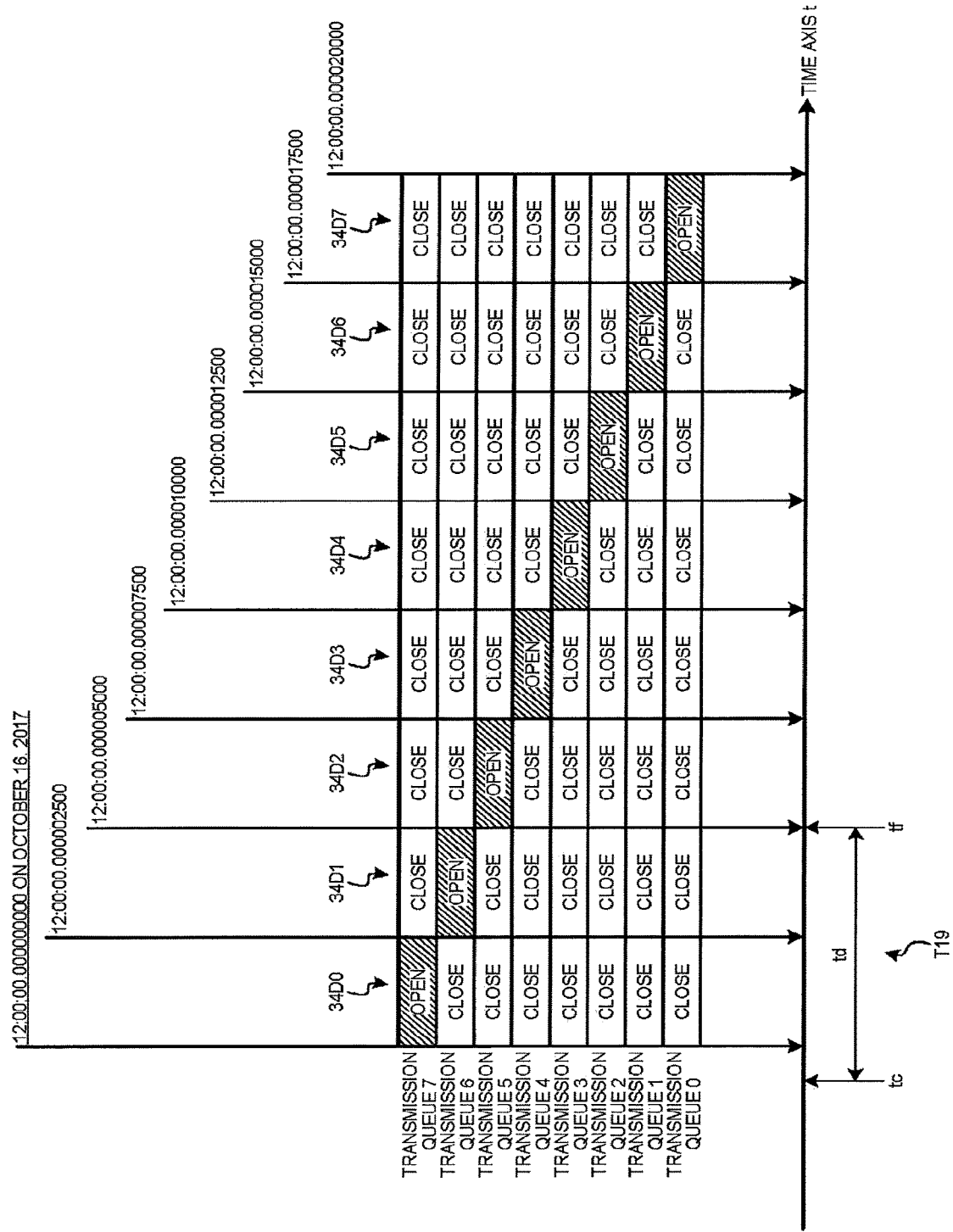
FIG. 60 is a diagram illustrating a state at the time 0.999986 second after initialization.

FIG. 60 is a diagram illustrating the current time tc, the future time tf, and the time difference td between the current time tc and the future time tf (see timing T19), at the time 0.999986 second after initialization. FIG. 61 is a diagram illustrating the current time, the future time, the values of the transmission possible time, the values of the required transmission time, the scheduled frames, and the values of the scheduled transmission start time thereof, at the time 0.999986 second after initialization. FIG. 61 illustrates an example of the second post processing to forcibly reduce the transmission possible time of the transmission queue 5 at the time 0.999986 second after initialization.

In the example of FIG. 61, the time difference (0.000019000 second=19 microseconds) between the current time and the future time has a value equal to or smaller than the threshold (20 microseconds). Accordingly, the prefetch notification unit 24 performs the processing of reducing the transmission possible time. As described above, the value used for subtraction may be any value satisfying the condition that the transmission possible time of each of the transmission queue is reduced to zero before the current time reaches the future time. In the example illustrated in FIG. 61, the transmission possible time assigned to the transmission queue 5 is reduced by the difference (1 microsecond) between the time difference (20 microseconds) at the time 0.999985 second after initialization and the time difference (19 microseconds) at the time 0.999996 second after initialization. As a result the transmission possible time of the transmission queue 5 is updated to 0.000001500.

In the second post processing to reduce the transmission possible time of the transmission queue, the prefetch notification unit 24 performs a series of processes explained with reference to FIG. 16 and FIG. 17.

Specific Example 2 of Second Post Processing

Figure 62:
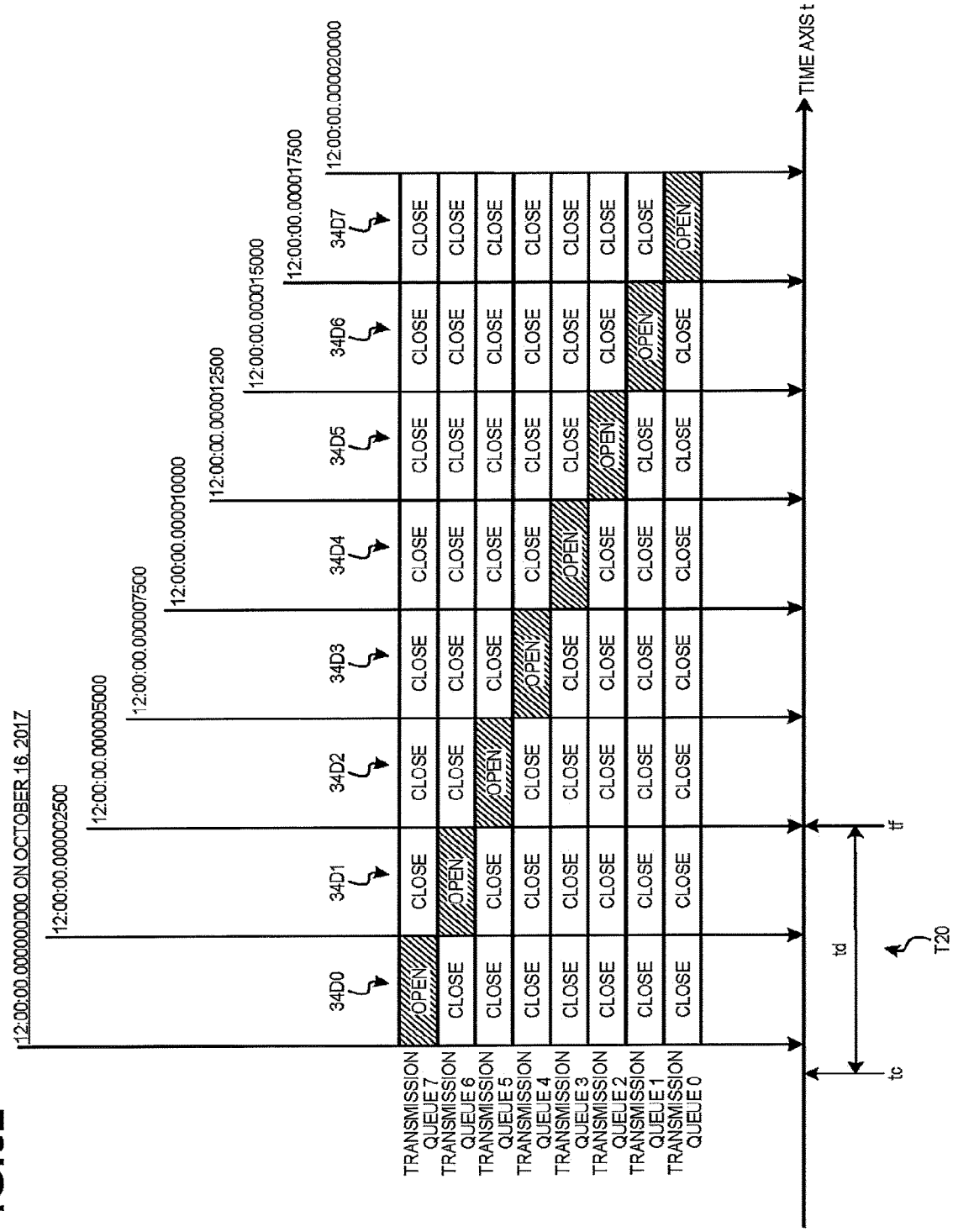
FIG. 62 is a diagram illustrating a state at the time 0.999987 second after initialization.

FIG. 62 is a diagram illustrating the current time tc, the future time tf, and the time difference td between the current time tc and the future time tf (see timing T20), at the time 0.999987 second after initialization. FIG. 63 is a diagram illustrating the current time, the future time, the values of the transmission possible time, the values of the required transmission time, the scheduled frames, and the values of the scheduled transmission start time thereof, at the time 0.999987 second after initialization. FIG. 63 illustrates an example of the second post processing to forcibly reduce the transmission possible time of the transmission queue 5 at the time 0.999987 second after initialization.

In the example of FIG. 63, the time difference (0.000018000 second=18 microseconds) between the current time and the future time has a value equal to or smaller than the threshold (20 microseconds). Accordingly, the prefetch notification unit 24 forcibly reduces the transmission possible time assigned to the transmission queue 5. In the example, the prefetch notification unit 24 reduces the transmission possible time assigned to the transmission queue 5 by the difference (1 microsecond) between the time difference (19 microseconds) at the time 0.999986 second after initialization and the time difference (18 microseconds) at the time 0.999987 second after initialization. As a result, the prefetch notification unit 24 updates the transmission possible time of the transmission queue 5 to 0.000000500.

In the second post processing to reduce the transmission possible time of the transmission queue, the prefetch notification unit 24 performs a series of processes explained with reference to FIG. 16 and FIG. 17.

Specific Example 3 of Second Post Processing

Figure 64:
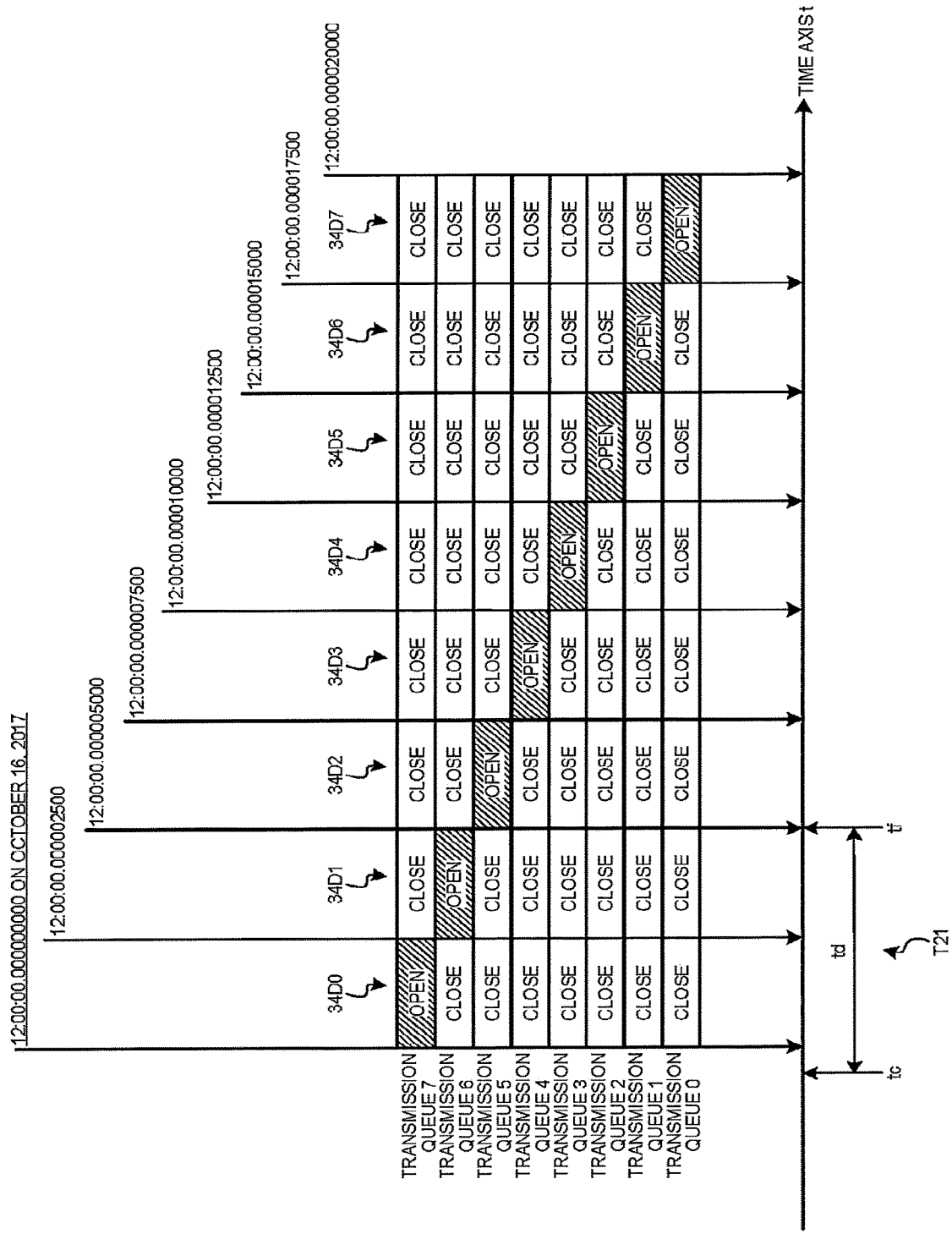
FIG. 64 is a diagram illustrating a state at the time 0.9999875 second after initialization.

FIG. 64 is a diagram illustrating the current time tc, the future time tf, and the time difference td between the current time tc and the future time tf (see timing T21), at the time 0.9999875 second after initialization. FIG. 65 is a diagram illustrating the current time, the future time, the values of the transmission possible time, the values of the required transmission time, the scheduled frames, and the values of the scheduled transmission start time thereof, at the time 0.9999875 second after initialization. FIG. 65 illustrates an example of the processing to forcibly reduce the transmission possible time of the transmission queue 5 at the time 0.9999875 second after initialization.

In the example of FIG. 65, the time difference (0.000017500 second=17.5 microseconds) between the current time and the future time has a value equal to or smaller than the threshold (20 microseconds). Accordingly, the prefetch notification unit 24 forcibly reduces the transmission possible time assigned to the transmission queue 5. In the example, the prefetch notification unit 24 reduces the transmission possible time assigned to the transmission queue 5 by the difference (0.5 microsecond) between the time difference (18 microseconds) at the time 0.999987 second after initialization and the time difference (17.5 microseconds) at the time 0.9999875 second after initialization. As a result, the prefetch notification unit 24 updates the transmission possible time of the transmission queue 5 to 0.000000000.

In the second post processing to reduce the transmission possible time of the transmission queue, the prefetch notification unit 24 performs a series of processes explained with reference to FIG. 16 and FIG. 17.

Specific Example 3 of Prefetching Processing

Figure 66:
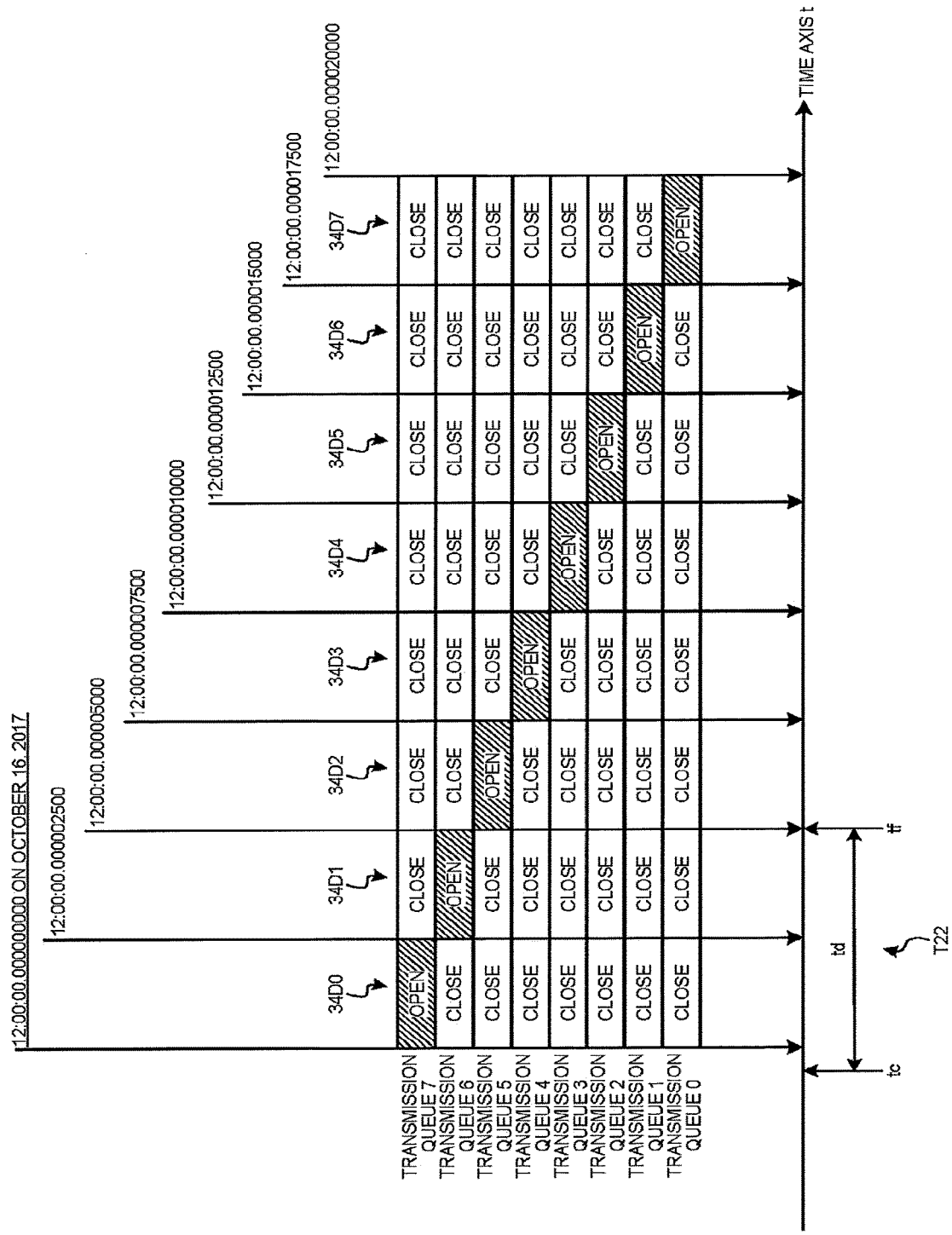
FIG. 66 is a diagram illustrating a state at the time 0.999988 second after initialization.

FIG. 66 is a diagram illustrating the current time tc, the future time tf, and the time difference td between the current time tc and the future time tf (see timing T22), at the time 0.999988 second after initialization. FIG. 67 is a diagram illustrating the current time, the future time, the values of the transmission possible time, the values of the required transmission time, the scheduled frames, and the values of the scheduled transmission start time thereof, at the time 0.999988 second after initialization. FIG. 67 illustrates an example at the time 0.999988 second after initialization and after the transmission possible time of the transmission queue 5 is reduced to zero.

In the example illustrated in FIG. 67, all the values of the transmission possible time assigned to the respective transmission queues are set to zero. This state satisfies the condition for prefetching the next entry 34D.

FIG. 68 is a diagram illustrating the current time tc, the future time tf, and the time difference td between the current time tc and the future time tf (see timing T23), at the time 0.9999885 second after initialization. FIG. 69 is a diagram illustrating the current time, the future time, the values of the transmission possible time, the values of the required transmission time, the scheduled frames, and the values of scheduled transmission start time thereof, at the time 0.9999885 second after initialization. FIG. 69 illustrates an example at the time 0.9999885 second after initialization and after the entry 34D3 of the list index of "3" in the gate control list 34B of the transmission scheduling information 34A is prefetched at the time 0.9999885 second after initialization.

In the prefetching processing, the prefetch unit 20 and the prefetch notification unit 24 perform a series of processes explained with reference to FIG. 8 and FIG. 9.

In the example of FIG. 68 and FIG. 69, the prefetch unit 20 updates the future time to 12:00:00.000007500 on Oct. 16, 2017, and assigns the transmission possible time of 2,500 nanoseconds to the transmission queue 4.

Specific Example 5 of Scheduling Processing

Figure 70:
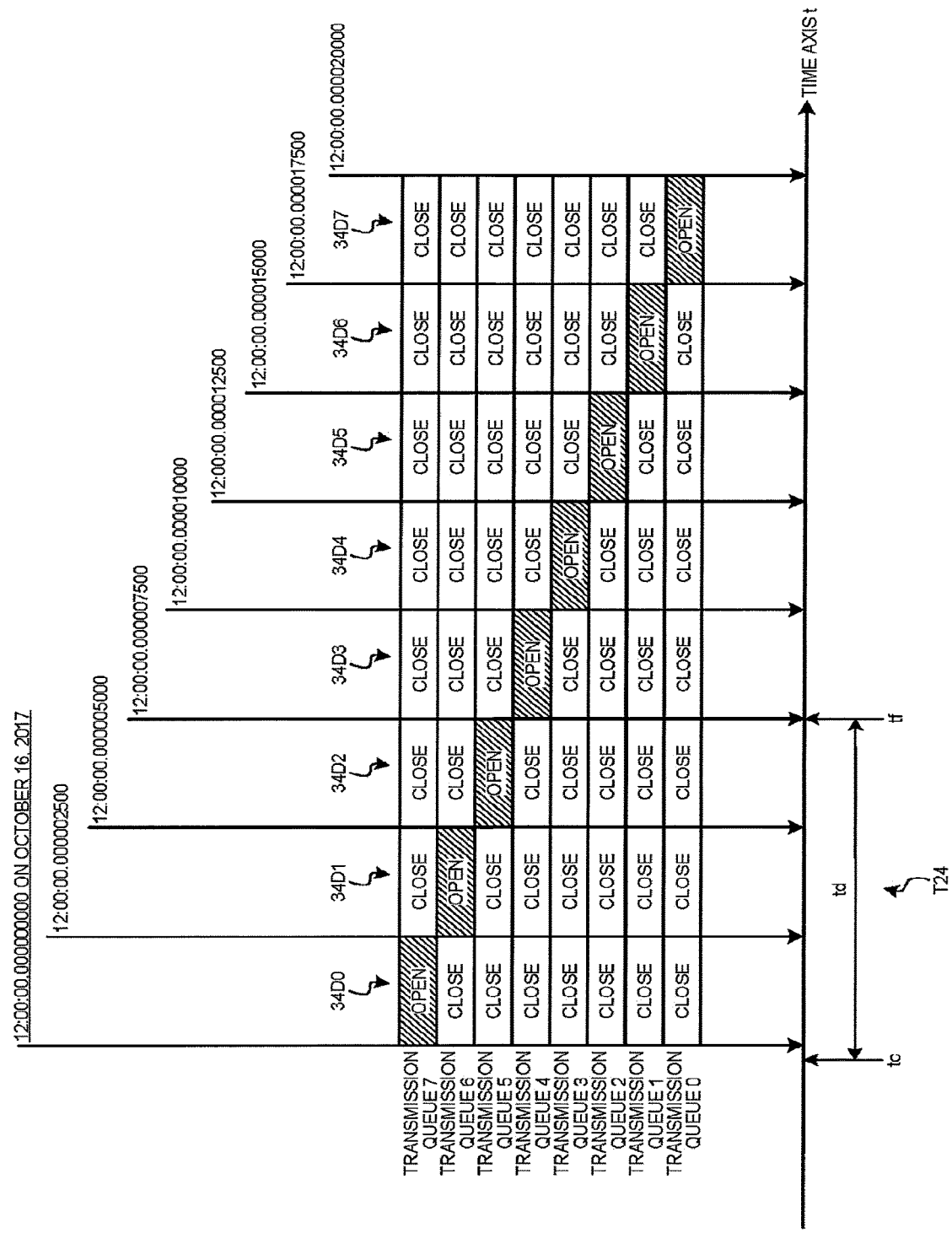
FIG. 70 is a diagram illustrating a state at the time 0.999989 second after initialization.

FIG. 70 is a diagram illustrating the current time tc, the future time tf, and the time difference td between the current time tc and the future time tf (see timing I24), at the time 0.999989 second after initialization. FIG. 71 is a diagram illustrating the current time, the future time, the values of the transmission possible time, the values of the required transmission time, the scheduled frame, and the scheduled transmission start time thereof, at the time 0.999989 second after initialization. FIG. 71 illustrates an example of the case where a frame f5 with the required transmission time of 1,000 nanoseconds is written to the transmission queue 4 at the time 0.999989 second after initialization.

In the example of FIG. 71, the time difference (0.000018500 second=18.5 microseconds) between the current time and the future time has a value equal to or smaller than the threshold (20 microseconds). Accordingly, the prefetch notification unit 24 forcibly reduces the transmission possible time assigned to the transmission queue 4. In the example, the prefetch notification unit 24 reduces the transmission possible time assigned to the transmission queue 4 by the difference (0.5 microsecond) between the time difference (19 microseconds) at the time 0.9999885 second after initialization and the time difference (18.5 microseconds) at the time 0.999989 second after initialization. As a result, the prefetch notification unit 24 updates the transmission possible time of the transmission queue 4 to 0.000002000.

In the example illustrated in FIG. 71, the required transmission time of the frame f5 is equal to or smaller than the transmission possible time of the transmission queue 4 (see reference numeral 80). Accordingly, the schedulability evaluation unit 22 determines that scheduling of the frame f5 is possible. As a result, the scheduler unit 26 schedules the future time (12:00:06.000007500 on Oct. 16, 2017) at the time 0.999969 second after initialization, as the scheduled transmission start time of the frame f5.

Figure 72:
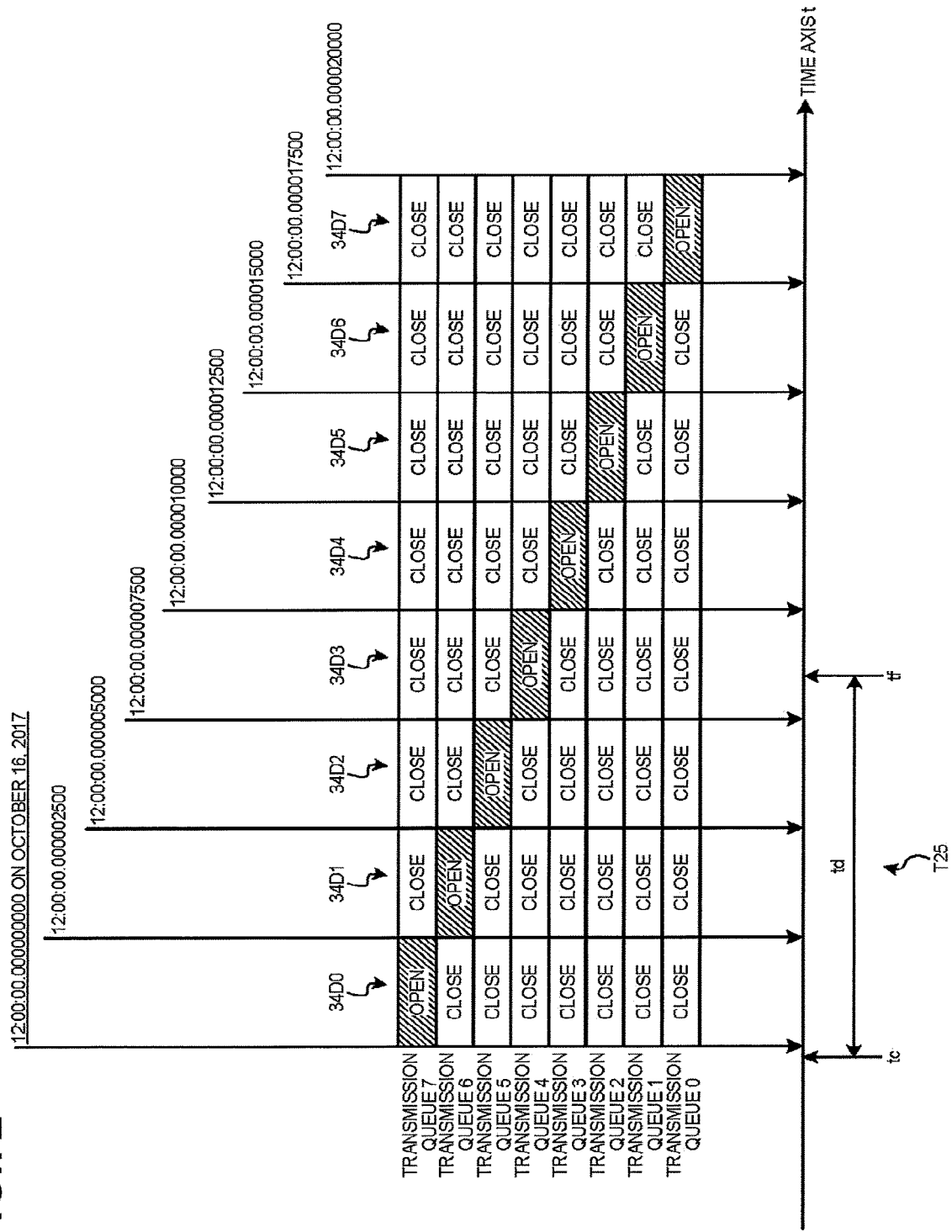
FIG. 72 is a diagram illustrating a state at the time 0.9999895 second after initialization.

FIG. 72 is a diagram illustrating the current time tc, the future time tf, and the time difference td between the current time tc and the future time tf (see timing T25), at the time 0.9999895 second after initialization. FIG. 73 is a diagram illustrating the current time, the future time, the values of the transmission possible time, the values of the required transmission time, the scheduled frame, and the scheduled transmission start time thereof, at the time 0.9999895 second after initialization. FIG. 73 illustrates an example at the time 0.9999895 second after initialization and after the frame f5 has been scheduled.

In the scheduling, the schedulability evaluation unit 22 and the scheduler unit 26 perform the determination processing, the scheduling processing, and the first post processing explained with reference to FIG. 10 to FIG. 15.

As explained above with specific examples, the information processing apparatus 10 according to the present embodiment has the structure in which the scheduler unit 26 schedules scheduled transmission start time of the frame, on the basis of the entry 34D prefetched with the prefetch unit 20, in the transmission scheduling information 34A.

Accordingly, the information processing apparatus 10 according to the present embodiment enables scheduling for transmission timing control with high accuracy. Specifically, the information processing apparatus 10 according to the present embodiment is capable of achieving transmission control by dynamic scheduling, on the basis of the transmission scheduling information 34A.

Figure 74:
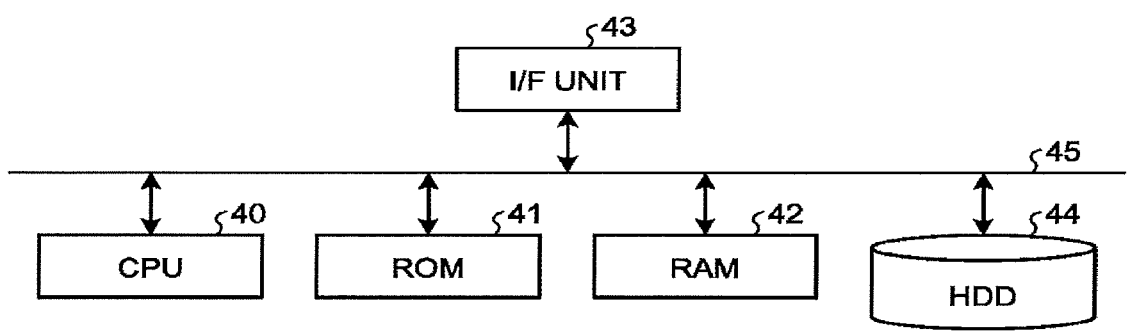
FIG. 74 is a hardware configuration diagram.

The following is an explanation of an example of a hardware configuration of the information processing apparatus 10 according to the present embodiment. FIG. 74 is an example of a hardware configuration diagram of the information processing apparatus 10 according to the present embodiment.

The information processing apparatus 10 according to the present embodiment includes a control device, such as a CPU 40, storage devices, such as a Read Only Memory (ROM) 41, a Random Access Memory (RAM) 42, and a hard disk drive (HDD) 44, an I/F unit 43 serving as an interface with the various devices, and a bus 45 connecting the units, and has a hardware configuration using an ordinary computer.

In the information processing apparatus 10 according to the present embodiment, the CPU 40 reads a computer program from the ROM 41 onto the RAM 42, and executes the program, to achieve the units described above on the computer.

The program executed with the information processing apparatus 10 according to the present embodiment to perform the processes described above may be stored in the HDD 44. As another example, the program executed with the information processing apparatus 10 according to the present embodiment to perform the processes described above may be incorporated in advance in the ROM 41 to be provided.

The program executed with the information processing apparatus 10 according to the present embodiment to perform the processes described above may also be stored in a computer-readable storage medium, such as a CD-ROM, a CD-R, a memory card, a digital versatile disc (DVD), and a flexible disk (FD), as a file of the form that can be installed or executed, to be provided as a computer program product. The program executed with the information processing apparatus 10 according to the present embodiment to perform the processes described above may also be stored on a computer connected to a network, such as the Internet, and provided by being downloaded through the network. The program executed with the information processing apparatus 10 according to the present embodiment to perform the processes described above may also be provided or distributed through a network, such as the Internet.

While certain embodiments have been described, these embodiments have been presented by way of example only, and are not intended to limit the scope of the inventions. Indeed, the novel embodiment described herein may be embodied in a variety of other forms; furthermore, various omissions, substitutions and changes in the form of the embodiment described herein may be made without departing from the spirit of the inventions. The accompanying claims and their equivalents are intended to cover such forms or modifications as would fall within the scope and spirit of the inventions.

What is claimed is:

1. An information processing method comprising:
    prefetching a scheduling entry corresponding to a future time period in advance from scheduling information including a first starting time and one or more scheduling entries, each entry at least containing a transmission state and an interval for each of one or more transmission queues;
    determining a second starting time of transmission for each of one or more frames waiting for transmission in each transmission queue, based on the scheduling entry and the first starting time;
    performing a notification to prefetch a next entry from the scheduling information;
    prefetching the next entry when the notification is received; and
    at a future time that is a first future time or a second future time,
    sending the notification based on an available time for transmission for each and every transmission queue at the first future time, which is a prospective time to schedule future transmission, or
    sending the notification based on the available time of each transmission queue at the second future time, and a time difference between a current time and the second future time.

2. The information processing method according to claim 1, further comprising:
    starting transmission of a frame, based on the second starting time of transmission.

3. The information processing method according to claim 1, further comprising:

evaluating each frame waiting for transmission in each transmission queue and determining one or more schedulable frames, if any exist, and scheduling the second starting time of transmission for a first schedulable frame of the one or more schedulable frames.

4. The information processing method according to claim 1, further comprising:

updating the future time, which is a prospective time to schedule future transmission, and an available time for transmission for each transmission queue at the future time, on the basis of the scheduling entry.

5. The information processing method according to claim 1, further comprising:

updating the future time and the available time of each transmission queue, using a required amount of time to transmit a scheduled frame.

6. The information processing method according to claim 1, further comprising:

updating the available time of each transmission queue, based on a time difference between a current time and the future time.

7. The information processing method according to claim 1, wherein the future time period is specified with the second starting time and an end time of a period for which the transmission state is valid, or the second starting time and a specific amount of time for which the transmission state is valid.

8. The information processing method according to claim 1, wherein the scheduling information includes information provided in IEEE 802.1Qbv standard.

9. A computer program product comprising a non-transitory computer-readable storage medium including programmed instructions, the instructions causing a computer to execute:

prefetching a scheduling entry corresponding to a future time period in advance from scheduling information including a first starting time and one or more scheduling entries, each entry at least containing a transmission state and an interval for each of one or more transmission queues;

determining a second starting time of transmission for each of one or more frames waiting for transmission in each transmission queue, based on the scheduling entry and the first starting time;

performing a notification to prefetch a next entry from the scheduling information;

prefetching the next entry when the notification is received; and at a future time that is a first future time or a second future time, sending the notification based on an available time for transmission for each and every transmission queue at the first future time, which is a prospective time to schedule future transmission, or sending the notification based on the available time of each transmission queue at the second future time, and a time difference between a current time and the second future time.

10. The information processing method according to claim 3, further comprising:

determining whether or not each frame waiting for transmission is schedulable, which means each frame is transmittable within the available time of each corresponding transmission queue at the future time.

11. The information processing method according to claim 3, further comprising:

selecting a schedulable frame from the one or more schedulable frames, and scheduling the second starting time of transmission for the selected frame.

12. An information processing method comprising:

prefetching a scheduling entry corresponding to a future time period in advance from scheduling information including a first starting time and one or more scheduling entries, each entry at least containing a transmission state and an interval for each of one or more transmission queues;

determining a second starting time of transmission for each of one or more frames waiting for transmission in each transmission queue, based on the scheduling entry and the first starting time;

performing a notification to prefetch a next entry from the scheduling information;

prefetching the next entry when the notification is received; and sending the notification based on an available time for transmission for each and every transmission queue at a future time, which is a prospective time to schedule future transmission, and sending the notification based on the available time of each transmission queue at the future time, and a time difference between a current time and the future time.

13. The information processing method according to claim 12, further comprising:

starting transmission of a frame, based on the second starting time of transmission.

14. The information processing method according to claim 12, further comprising:

evaluating each frame waiting for transmission in each transmission queue and determining one or more schedulable frames, if any exist, and scheduling the second starting time of transmission for a first schedulable frame of the one or more schedulable frames.

15. The information processing method according to claim 12, further comprising:

updating the future time, which is a prospective time to schedule future transmission, and an available time for transmission for each transmission queue at the future time, on the basis of the scheduling entry.

16. The information processing method according to claim 12, further comprising:

updating the future time and the available time of each transmission queue, using a required amount of time to transmit a scheduled frame.

17. The information processing method according to claim 12, further comprising:

updating the available time of each transmission queue, based on a time difference between a current time and the future time.

18. The information processing method according to claim 12, wherein the future time period is specified with the second starting time and an end time of a period for which the transmission state is valid, or the second starting time and a specific amount of time for which the transmission state is valid.

19. The information processing method according to claim 12, wherein the scheduling information includes information provided in IEEE 802.1Qbv standard.

20. The information processing method according to claim 14, further comprising:

determining whether or not each frame waiting for transmission is schedulable, which means each frame is transmittable within the available time of each corresponding transmission queue at the future time.

21. The information processing method according to claim 14, further comprising:

selecting a schedulable frame from the one or more schedulable frames, and scheduling the second starting time of transmission for the selected frame.

22. A computer program product comprising a non-transitory computer-readable storage medium including programmed instructions, the instructions causing a computer to execute:

prefetching a scheduling entry corresponding to a future time period in advance from scheduling information including a first starting time and one or more scheduling entries, each entry at least containing a transmission state and an interval for each of one or more transmission queues;

determining a second starting time of transmission for each of one or more frames waiting for transmission in each transmission queue, based on the scheduling entry and the first starting time;

performing a notification to prefetch a next entry from the scheduling information;

prefetching the next entry when the notification is received; and sending the notification based on an available time for transmission for each and every transmission queue at a future time, which is a prospective time to schedule future transmission, and sending the notification based on the available time of each transmission queue at the future time, and a time difference between a current time and the future time.

* * * * *